United States Patent [19]
Nakayama et al.

[11] Patent Number: 5,732,001
[45] Date of Patent: Mar. 24, 1998

[54] CALCULATOR WITH STEPWISE DISPLAY OF LINEAR EQUATIONS

[75] Inventors: Hitoshi Nakayama; Syuji Uemura, both of Yamatokoriyama, Japan

[73] Assignee: Sharp Kabushiki Kaisha, Osaka, Japan

[21] Appl. No.: 521,932

[22] Filed: Aug. 31, 1995

[30] Foreign Application Priority Data

Sep. 13, 1994 [JP] Japan .................................. 6-219165
Oct. 31, 1994 [JP] Japan .................................. 6-266866

[51] Int. Cl.$^6$ .............................. G06F 3/00; G06F 13/00
[52] U.S. Cl. ............... 364/710.03; 364/700; 364/709.01; 364/710.14
[58] Field of Search ............... 364/710.03, 700, 364/709.01, 710.14; 395/500; 434/188

[56] References Cited

U.S. PATENT DOCUMENTS

| | | | |
|---|---|---|---|
| 3,731,269 | 5/1973 | Judson et al. | 340/15.5 |
| 3,971,924 | 7/1976 | Ozawa et al. | 235/156 |
| 4,225,932 | 9/1980 | Hirano et al. | 364/710 |
| 4,954,977 | 9/1990 | Colombat | 364/710.03 |
| 5,039,603 | 8/1991 | Pocius | 434/188 |
| 5,519,646 | 5/1996 | Uemura et al. | 364/709.12 |

FOREIGN PATENT DOCUMENTS 2-176 849-A  7/1990  Japan.
4-297 948-A  10/1992  Japan.

*Primary Examiner*—Reba I. Elmore
*Assistant Examiner*—Monica Lewis
*Attorney, Agent, or Firm*—David G. Conlin; Milton Oliver

[57] ABSTRACT

An improved educational calculator permits sequential display of equations as transformations are made to solve the equations.

First simultaneous linear equations are entered, and each time an advance key is depressed, process equations, obtained by transforming the equations step by step to reach their answers, are successively displayed on a liquid-crystal display screen. Each time a return key is depressed, the process equations are successively displayed from the answers to the equations in a reverse manner. The problem-solving method is selected through the entry of a solution key among the addition and subtraction method, the substitution method and the equivalence method, which are learned in the junior high school. The sequential display mode of the process equations can be switched between the automatic sequential display and the display on the basis of each entry of the advance key and the return key. Thus, it is possible to learn step by step the respective processes of the problem-solving methods of simultaneous linear equations. Even if there is an error in the answers found by the user, it is possible for the user to confirm at which step of the transformations he has erred, by operating the advance key and the return key. Thus, it becomes possible to provide educational equipment for junior high students that has superior effects of learning.

22 Claims, 49 Drawing Sheets

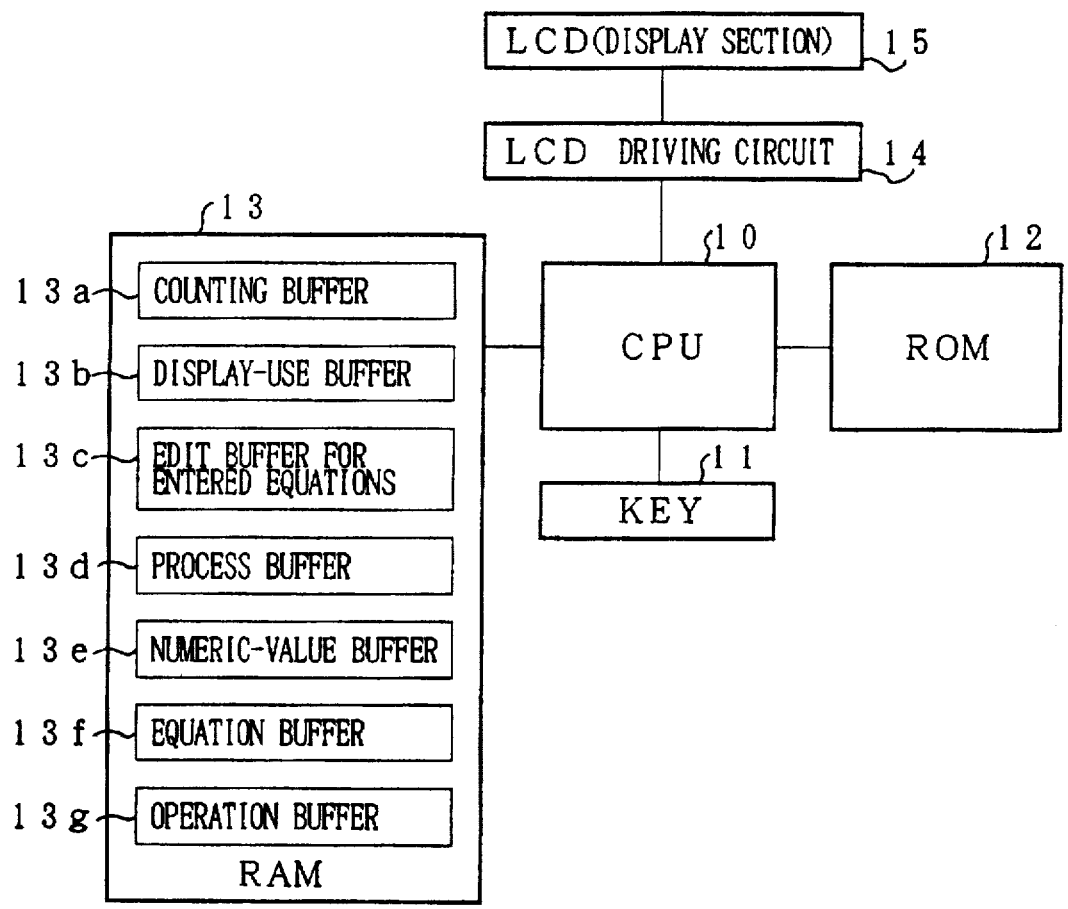

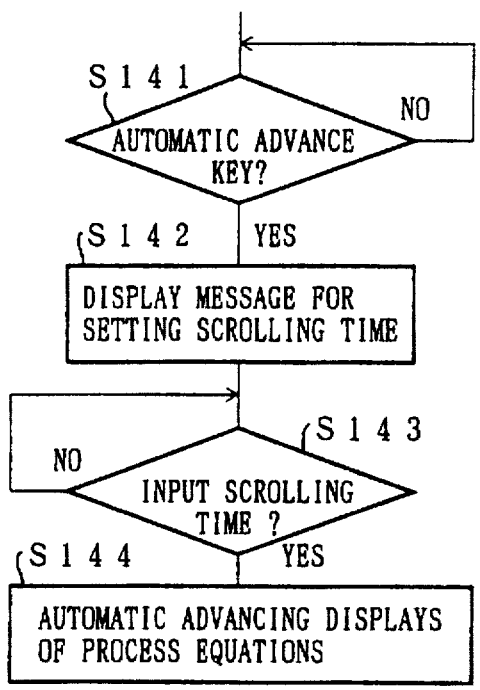 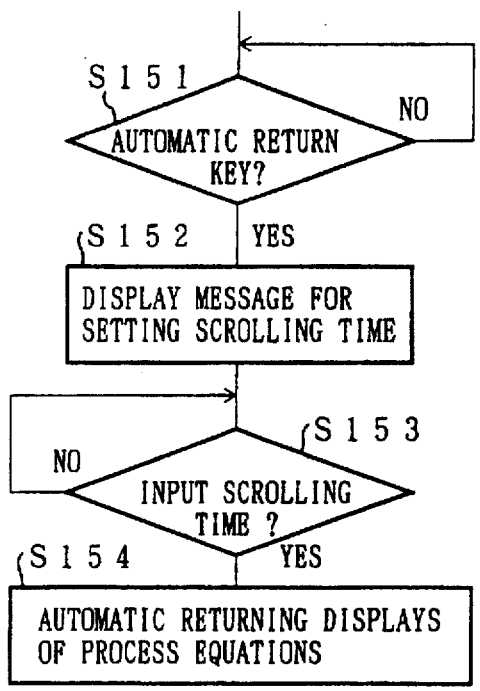
FIG. 23 (a)     FIG. 23 (b)

F I G. 2 4 (a)
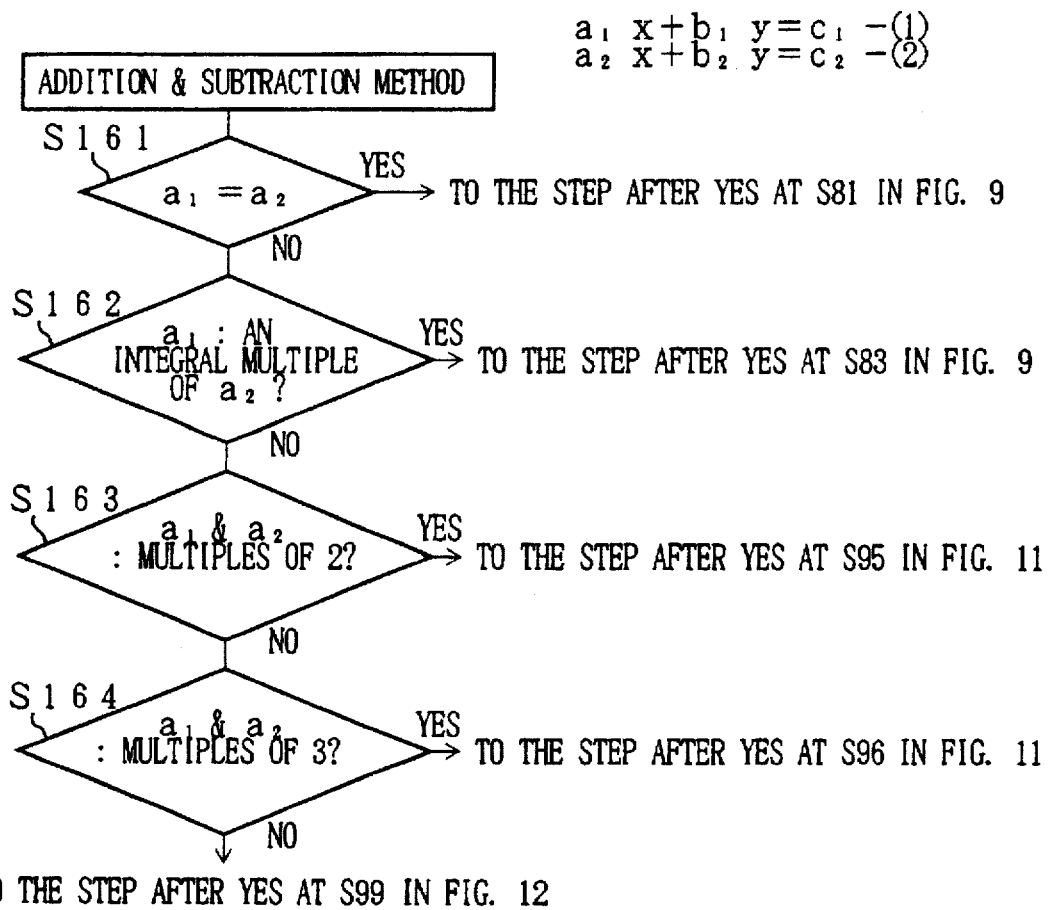
TO THE STEP AFTER YES AT S99 IN FIG. 12
F I G. 2 4 (b)
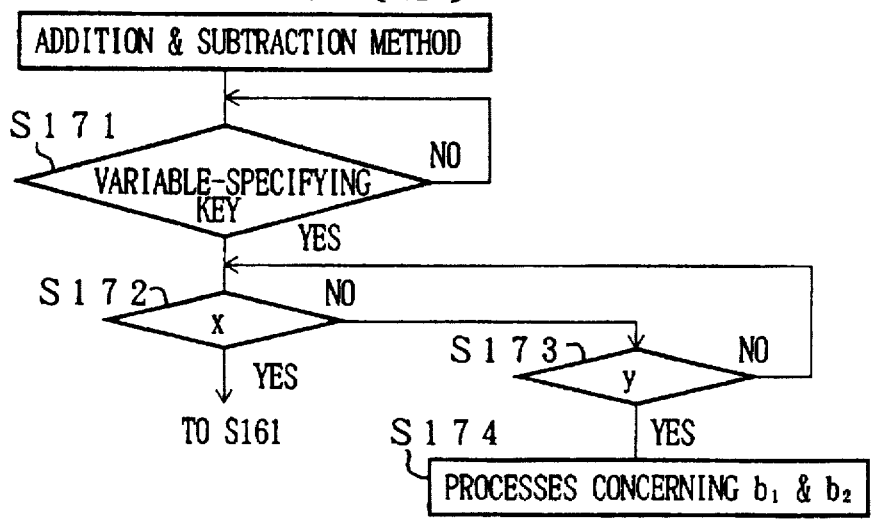

FIG. 41

| KEY ENTRY | STACK | DISPLAY | |
|---|---|---|---|
| | −<br>+<br>÷<br>×<br> | 5 + 4 × 3 ÷ 2 − 1 | j 1 |
| ⇩ | | | |
| STEP KEY | −<br>+<br>÷<br> <br> | 5 + 4 × 3 ÷ 2 − 1<br>5 + 1 2 ÷ 2 − 1 | j 2 |
| ⇩ | | | |
| STEP KEY | −<br>+<br> <br> <br> | 5 + 4 × 3 ÷ 2 − 1<br>5 + 1 2 ÷ 2 − 1<br>5 + 6 − 1 | j 3 |
| ⇩ | | | |
| STEP KEY | −<br> <br> <br> <br> | 5 + 4 × 3 ÷ 2 − 1<br>5 + 1 2 ÷ 2 − 1<br>5 + 6 − 1<br>1 1 − 1 | j 4 |

KEY ENTRY | STACK | DISPLAY

Stack (top to bottom): −, +, ÷, ×

Display k1: 5 + 4 × 3 ÷ 2 − 1

VIEW KEY

Display k2:
5 + 4 × 3 ÷ 2 − 1
5 + 1 2 ÷ 2 − 1
5 + 6 − 1
1 1 − 1
1 0

FIG. 46
| KEY ENTRY | STACK | DISPLAY |
|---|---|---|
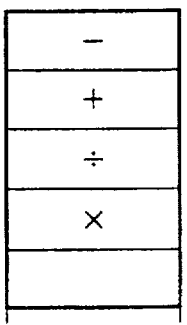
5 + 4 × 3 ÷ 2 − 1    p1
⇩
STEP KEY 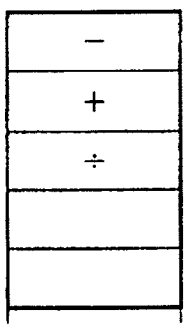
5 + 4 × 3 ÷ 2 − 1
        (1)    p2
⇩
STEP KEY 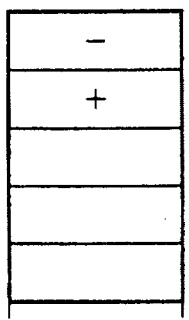
5 + 4 × 3 ÷ 2 − 1
    (1)    (2)    p3
⇩
STEP KEY 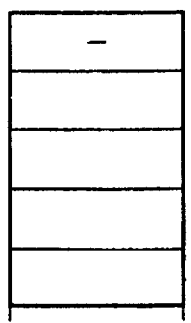
5 + 4 × 3 ÷ 2 − 1
(3)    (1)    (2)    p4

FIG. 47

KEY ENTRY STACK DISPLAY

| − |
| + |
| ÷ |
| × |
|   |

5 + 4 × 3 ÷ 2 − 1  q1

⇩

VIEW KEY

|   |
|   |
|   |
|   |
|   |

5 + 4 × 3 ÷ 2 − 1
  (3)  (1)  (2)  (4)  q2

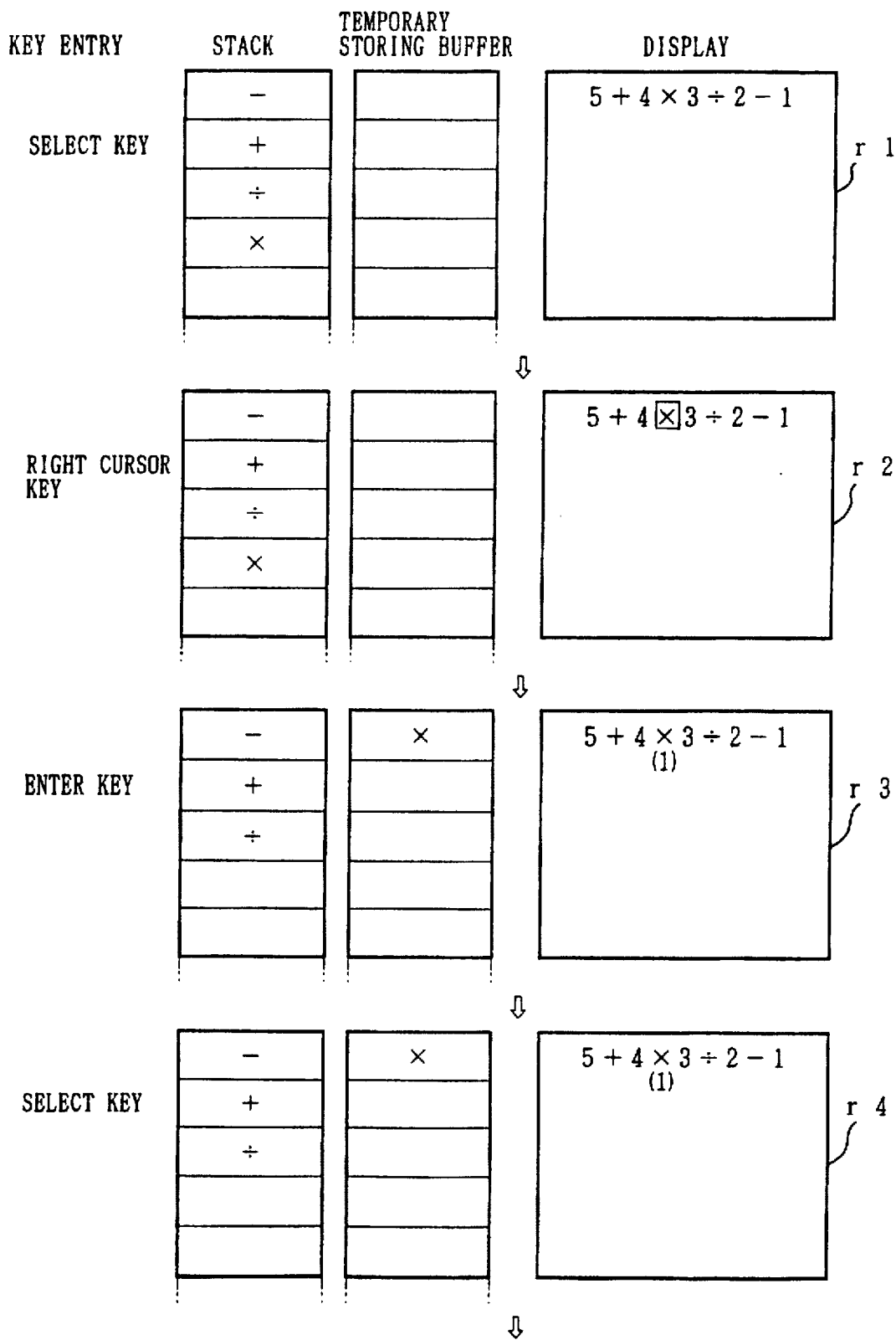

F I G. 4 9
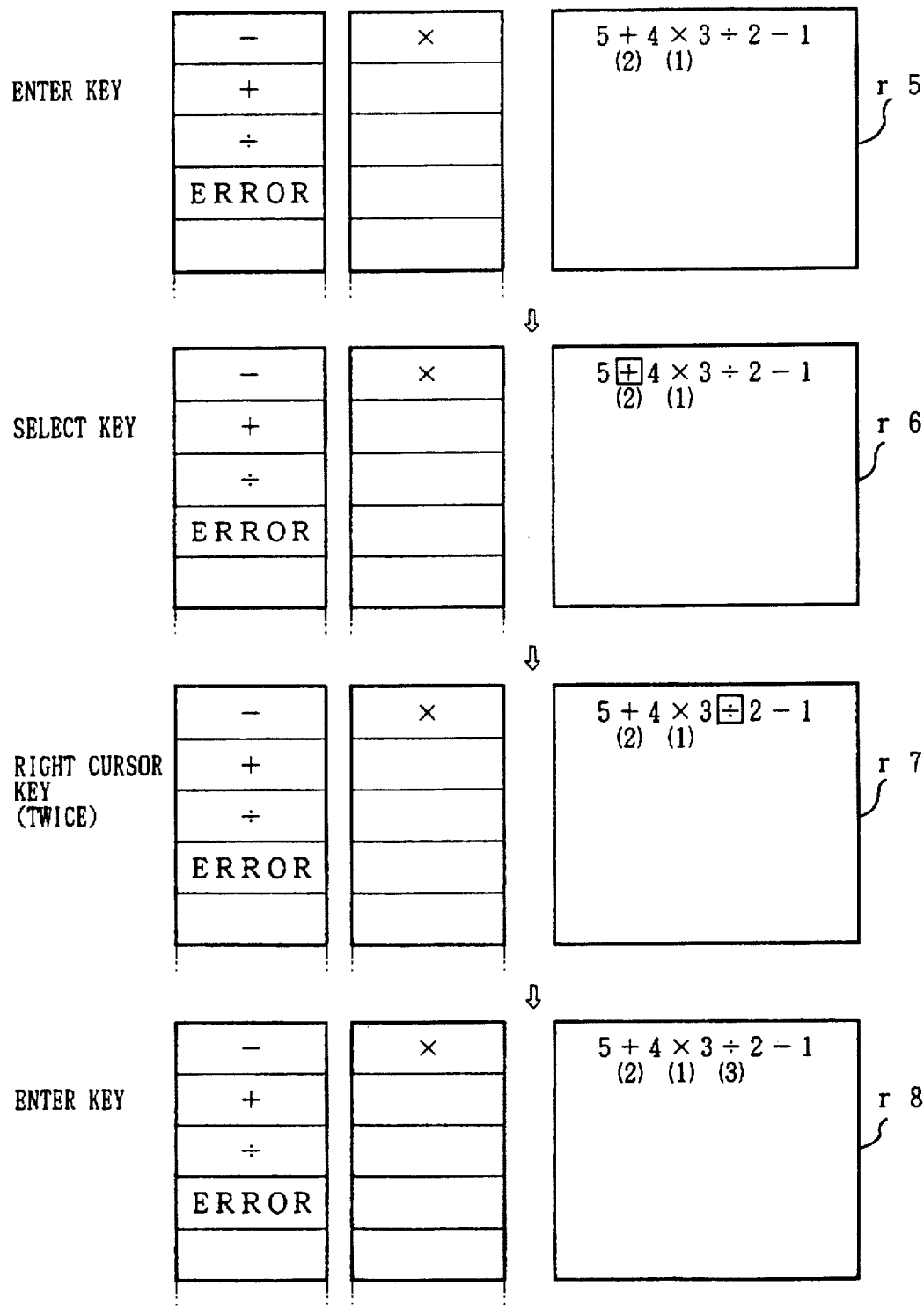

FIG. 5 2 PRIOR ART $$\begin{cases} a_1 x + b_1 y = c_1 \\ a_2 x + b_2 y = c_2 \end{cases} \qquad \begin{cases} 2x + 3y = 4 \\ 5x + 6y = 7 \end{cases}$$

| KEY ENTRY | DISPLAY | NOTE |
|---|---|---|
| 52 — [2ndF] [CA] 2 [ENT] | $b_1$ ?  0. | |
| 53 — 3 [ENT] | $c_1$ ?  0. | |
| 54 — 4 [ENT] | $a_2$ ?  0. | |
| 5 [ENT] | $b_2$ ?  0. | |
| 6 [ENT] | $c_2$ ?  0. | |
| 7 [ENT] | X   $-1.$ | x |
| [ENT] | Y   $2.$ | y |
| [ENT] | d   $-3.$ | Z |

CALCULATOR WITH STEPWISE DISPLAY OF LINEAR EQUATIONS

FIELD OF THE INVENTION

The present invention relates to compact or portable electronic desktop calculators and concerns, more particularly, electronic calculators intended to be used as educational equipment by which elementary and junior high students can self-learn how to solve arithmetic or mathematics questions by using its function for carrying out calculations on process equations that are transformed step by step to show processes for obtaining a solution.

BACKGROUND OF THE INVENTION

Conventionally, electronic desktop calculators have been widely used, which in response to entries of numeric values, carry out basic four calculations or various designated functional calculations and thereby display the results. For example, FIG. 51 shows an electronic desktop calculator 50 which is provided with a display section 51 that displays an entered numeric value or a result while updating the display each time any key is operated. Further, some types of the calculators have a plurality of display sections which enable simultaneous displays concerning entered numeric values, symbols of operation, results and other factors.

For example, Japanese Laid-Open Patent Publication, No. 176849/1990 (Tokukaihei 2-176849), has proposed an electronic desktop calculator which is provided with a plurality of display sections, display driving sections, memories and other sections and which thus, for example, allows the user to call for a numeric value during an ongoing operation from the memory so as to easily confirm the value, or allows the user to simultaneously confirm numbers used in the operation even during an operation including parentheses.

Moreover, Japanese Laid-Open Patent Publication, No. 297948/1992 (Tokukaihei 4-297948), has proposed an electronic desktop calculator which is provided with display sections used respectively for numbers to be operated, numbers for operation, result of operation, and four basic symbols of operation, and which is thus capable of displaying the contents and result of operation in an easily comprehensible manner by displaying the contents of key instructions that are made during an operation process on these corresponding display sections.

Furthermore, Japanese Laid-Open Patent Publication, No. 24639/1973 (Tokukaishou 48-24639), has proposed a data display apparatus which displays three lines of operation equations that have been inputted from an electronic desktop calculator on the cathode ray tube of a television receiver, and which further displays lines between the operands and answers in order to explain the contents of operations more clearly.

In all the three examples of proposition, the contents of a sequence of key instructions are displayed on display areas that have been preliminarily allocated, and an answer is directly displayed without displaying the processes of an operation, that is, without displaying transformed states of an equation and other states that are required before obtaining the answer, which is in common with these examples.

This is because these conventional electronic desktop calculators are not intended to meet the demand that it is possible to improve learning effects by displaying the process that is required before obtaining an answer. For this reason, in the conventional electronic desktop calculators, an effective operation method which makes the operation time shortest is adopted.

One specific example of such an operation method will be explained as follows:

Conventional electronic apparatuses only display the result of an operation in the same manner as that of an electronic desktop calculator 50 having a function-calculating function shown in FIG. 51; therefore, for example, in the case of simultaneous linear equations, results are obtained through effective calculations using determinants.

More specifically, let us assume that the following simultaneous equations with two variables are to be solved:

$$"a_1x+b_1y=c_1$$
$$a_2x+b_2y=c_2"$$

In order to find the solutions of (x, y) in the case of $(a_1, b_1, c_1)=(2, 3, 4)$ and $(a_2, b_2, c_2)=(5, 6, 7)$, the following quadratic determinants are used.

$$x = \frac{\begin{vmatrix} c_1 & b_1 \\ c_2 & b_2 \end{vmatrix}}{\begin{vmatrix} a_1 & b_1 \\ a_2 & b_2 \end{vmatrix}} = \frac{Z_1}{Z} \quad y = \frac{\begin{vmatrix} a_1 & c_1 \\ a_2 & c_2 \end{vmatrix}}{\begin{vmatrix} a_1 & b_1 \\ a_2 & b_2 \end{vmatrix}} = \frac{Z_2}{Z} \qquad \text{[Equation 1]}$$

Here, since $Z=a_1b_2-a_2b_1$, $Z_1=c_1b_2-c_2b_1$ and $Z_2=a_1c_2-a_2c_1$, it is possible to find the solutions of (x, y) by merely calculating Z, $Z_1$, $Z_2$, $Z_1/Z$ and $Z_2/Z$ mechanically based on the values of the respective coefficients.

Next, referring to FIG. 52, an explanation will be given on the entering processes of the electronic desktop calculator 50 for carrying out the above-mentioned operation. In FIG. 52, the column "key entry" indicates actual key entries, the column "display" indicates the contents of display in the display section 51 that correspond to the respective key entries, and the column "note" indicates the correlations between the displayed characters and the characters in the equations. The following (1) through (5) show the sequence of entering processes.

(1) By depressing 2nd F key 52 and CA key 53, the apparatus is brought into a stand-by state where coefficients of the simultaneous equations with two variables are entered.

(2) Depress the numeric value key "2" in order to enter the value of the coefficient $a_1$, and upon depressing ENT key 54, "$b_1$?0." appears on the display section 51, thereby asking the user to enter the next coefficient $b_1$.

(3) Thereafter, in the same manner, the processes to depress the corresponding numeric key and also depress ENT key 54 and the appearance of the subsequent display for urging the entry of the next coefficient are repeated.

(4) After having entered the last coefficient $c_2=7$, there is displayed the solution of x upon depressing of ENT key 54.

(5) Successively, every time ENT key 54 is depressed, the solution of y and the value of the determinant Z are displayed in succession.

Here, in order to erase all the coefficients that have been entered, 2nd F key 52 and CA key 53 are depressed in succession in the same manner as the beginning. Further, if ENT key 54 is depressed during the display of the value of the determinant Z, the apparatus returns to the entered states of the respective coefficients. If ENT key 54 is further depressed in succession, the entered coefficients are successively displayed so that it becomes possible to confirm them.

However, in the above-mentioned conventional electronic desktop calculator, although only the result of an operation is mechanically obtained from entered equations, it is not possible to display the process in the course of the operation, such as transformed states of the equations. Therefore, the conventional electronic desktop calculators, when used as educational equipment for, for example, junior high students, are suitable only for confirming their own answers of calculations. The problem is, however, that they are not useful for teaching how to solve equations.

Moreover, as described above, the problem-solving method that uses determinants and that is adopted by the conventional electronic desktop calculators is not well suited for the contents of current junior high school education. Therefore, in order that proper displays are made for necessary operation processes in response to each of a number of problem-solving methods, it is necessary to make a basic revision of the technology instead of having mere changes in the contents of display.

Meanwhile, in the case of carrying out the basic four calculations, there have been proposed electronic desktop calculators for learning-use which have functions as follows:

(1) Operations are carried out with respect to only one or more operators that are required for indicating operation processes, and the operation processes are displayed without processing the other remaining operators.

(2) The processes from an original equation to the result can be displayed forwardly as well as backwardly step by step; thus, it becomes possible to confirm the processes of the operation.

Upon entry of an equation including a plurality of operators, these functions make it possible to confirm not only the result, but also processes that appear in the middle of the operation. Therefore, this allows mainly elementary and junior high students to learn how to solve arithmetic problems during their self-learning time in arithmetics or mathematics.

However, in the above-mentioned conventional electronic desktop calculators for learning-use, although the user is allowed to know processes in the middle of an operation and the answer thereof, the user himself does not carry out the calculation, but merely confirms the processes in which the calculator proceeds calculations correctly in accordance with the corresponding operation sequence within the basic four calculations.

Moreover, the processes of an operation are shown by displaying the results each of which is obtained by carrying out a corresponding calculation with respect to one specific operator. This method also raises a problem that it is difficult to know which part of operators has been calculated.

SUMMARY OF THE INVENTION

The first objective of the present invention is to provide an electronic desktop calculator which is capable of clearly displaying the processes in the middle of an operation based on each of the various problem-solving methods, thereby allowing the user to comprehend each of the problem-solving methods mainly for simultaneous linear equations.

In order to achieve the first objective, the electronic desktop calculator of the present invention is characterized by the following arrangements.

(1) an operation means for carrying out operations to find answers by transforming equations step by step in accordance with one of various problem-solving methods.

(2) a process equation storage means for temporarily storing process equations each of which is obtained each time the operation means makes each transformation step by step.

(3) an advance key for entering an instruction to make and display each of the step-wise transformations starting from the equations to reach their answers.

(4) a return key for entering an instruction to make and display each of the step-wise transformations starting from the answers to reach the equations.

(5) a control means for controlling operations in the operation means and read-out of the process equations from the process equation storage means so as to update the contents of display each time the advance key or the return key is operated.

With the above-mentioned arrangement, each time the advance key is operated, the control means controls the operation means so that each process equation is made by transforming the equations step by step. The process equation thus made is stored in the process equation storage means, and is displayed, for example, on the liquid-crystal display screen. Each time the advance key is operated, an operation for making the corresponding process equation, a display for the corresponding process equation and a storage of the process equation thus made are repeated until the answers are found.

On the other hand, each time the return key is operated, the control means carries out a controlling operation so that the corresponding process equation, which has been stored in the process equation storage means, is read out and displayed.

Thus, once the process equations have been stored in the process equation storage means, the control means carries out a controlling operation so that, each time the return key or the advance key is operated, the desired process equation is read out from the process equation storage means and is displayed.

With this arrangement, by operating the advance key, the user can confirm processes of the problem-solving method for finding answers of equations step by step while taking these processes into consideration. This makes it possible to improve the effects of learning. Further, by operating the return key, the user can confirm the preceding process equation before having been subjected to the current transformation. This makes, it possible for the user to learn processes of the problem-solving method more firmly by allowing him or her to compare steps before and after the transformation.

Moreover, in the case when the user has found that the answer derived from his or her own calculations is incorrect, he or she can check it out to see at which step of the processes of the problem-solving method he or she made a mistake, by operating the advance key.

Furthermore, since the contents of display are updated each time the advance key or the return key is operated, it is not necessary to provide a large screen that is required for displaying a plurality of process equations all at once. Therefore, the present invention is well suited for compact or portable electronic apparatuses.

The second objective of the present invention is to provide an electronic desktop calculator which, by allowing the user to specify an operator among those used in the basic four calculations, is capable of carrying out an operation with respect to only the operator specified, and is also capable of allocating numbers in accordance with a sequence in which the operation is carried out.

In order to achieve the second objective, the electronic desktop calculator of the present invention is characterized by the following arrangements:

(1) an input means for entering an expression including a plurality of operators.

(2) an order-specifying keys for specifying an operation sequence for the expression that has been entered through the input means.

(3) an operation means for carrying out the operations of the expression in accordance with the operation sequence for the expression that has been specified by the order-specifying keys.

(4) a display means for displaying the result of the operations.

With these arrangements, the expression, which includes a plurality of operators and which has been entered through the input means, is calculated by the operation means, and its operation result is displayed by the display means. In this case, the user can preferably specify the operation sequence through the order-specifying keys with respect to the expression. Thus, the operation is carried out by the operation means in accordance with the sequence that has been specified through the order-specifying keys.

Therefore, rather than merely seeing the result obtained through automatic calculations by the calculator, the user can specify the sequence of operation in which the operation is carried out. That is, the operation is carried out, following the sequence of operation that is intended by the user.

For a fuller understanding of the nature and advantages of the invention, reference should be made to the ensuing detailed description taken in conjunction with the accompanying drawings.

BRIEF DESCRIPTION OF THE DRAWINGS

FIG. 2 is a block diagram showing main parts of a control system in the electronic desktop calculator.

FIG. 3 is an explanatory drawing that shows a sequence in which equations are entered through keys and transitions in the contents of display.

FIG. 23(a) is a flow chart that indicates a sequence of controlling processes for setting a constant period of time in automatic advancing displays of process equations from the equations to the answers; and FIG. 23(b) is a flow chart that indicates a sequence of controlling processes for setting a constant period of time in automatic returning displays of process equations from the answers back to the equations.

FIG. 24(a) is a flow chart showing a sequence of controlling processes by which, when the addition and subtraction method has been specified as the problem-solving method, a check is made to find the conditions with which the equations are transformed in the simplest manner with respect to a variable that has been specified by the user; and FIG. 24(b) is a flow chart showing a sequence of controlling processes which allows the user to specify a variable whose answer is to be preferentially found.

FIG. 41 is an explanatory drawing that shows storage states of stacks and the corresponding contents of display in the case when STEP key is depressed in the NORM mode.

FIG. 46 is an explanatory drawing that shows storage states of stacks and the corresponding contents of display in the case when STEP key is depressed in the NUMB mode.

FIG. 47 is an explanatory drawing that shows storage states of stacks and the corresponding contents of display in the case when VIEW key is depressed in the NUMB mode.

FIG. 48 is an explanatory drawing that shows storage states of stacks and temporary storing buffers, and the corresponding contents of display, in the case when calculations are made by using SELECT key, cursor keys, ENTER key and other keys in the NUMB mode.

FIG. 49 is an explanatory drawing that shows storage states that follow the states explained by reference to FIG. 48.

FIG. 52 is an explanatory drawing that shows a sequence of key entries by which coefficients of simultaneous linear equations are entered to the conventional electronic desktop calculator.

DESCRIPTION OF THE EMBODIMENTS
[EMBODIMENT 1]

Referring to FIGS. 1 through 21 and FIG. 26, the following description will discuss one embodiment of the present invention.

(1) Appearance of the electronic desktop calculator

Figure 1:
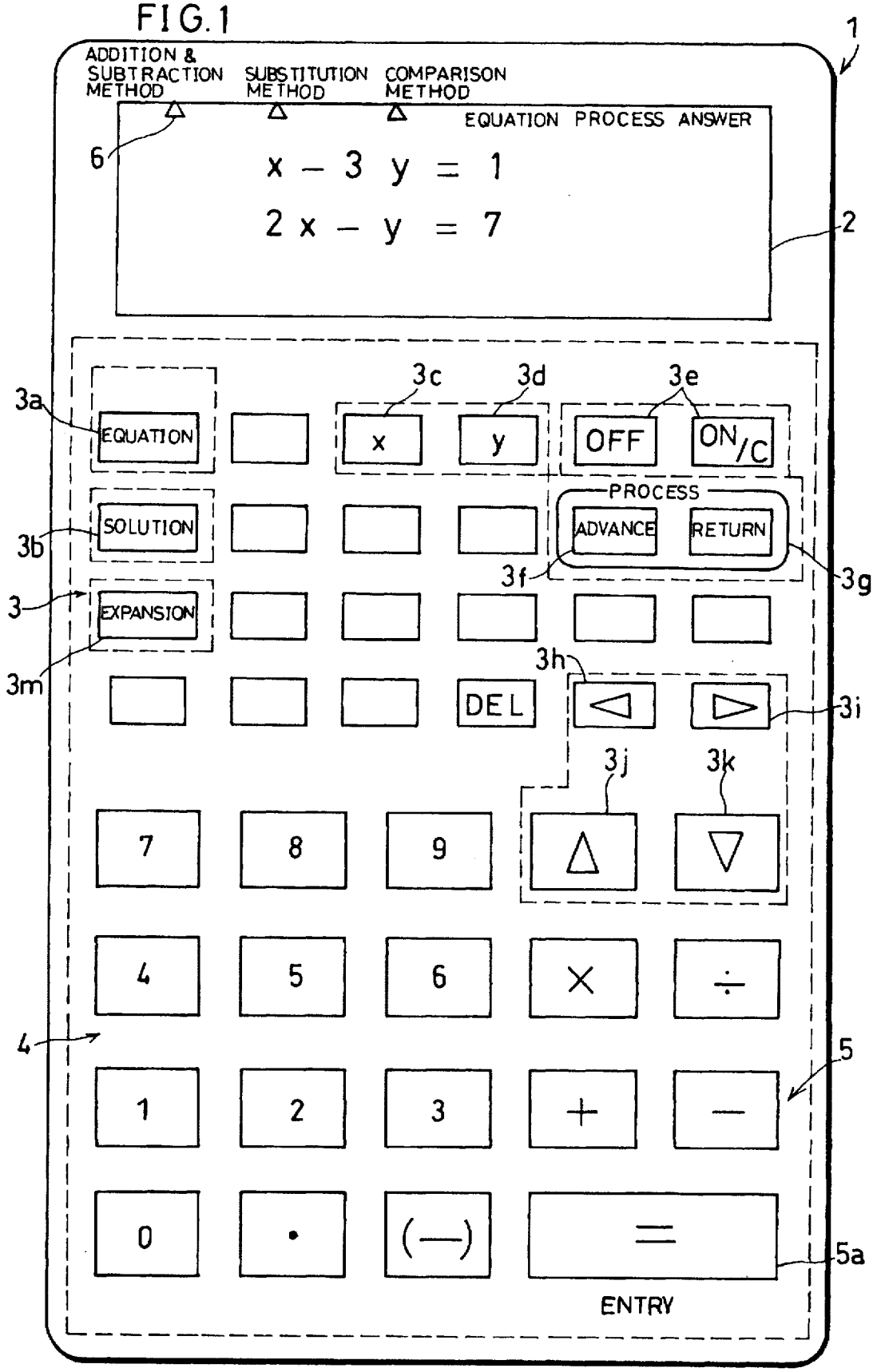
FIG. 1 is a schematic plan view that shows an appearance of an electronic desktop calculator in accordance with the present invention.

The electronic desktop calculator 1 of the present invention, which is shown in FIG. 1 in its appearance, is provided with a liquid-crystal display screen 2, a group of function keys 3 used for selecting various functions, a group of numeric value keys 4 used for entering numeric values, and a group of operation keys 5 for basic four calculations that include an equal-sign key 5a.

The liquid-crystal display screen 2 displays equations and processes in the course of operations, for example, in their two line portions. Further, along the outside edge of the liquid-crystal display screen 2, there are displayed kinds of problem-solving methods that are to be learned through the electronic desktop calculator 1. For example, in the present embodiment, assuming that the device is used as educational equipment for junior high students, characters that indicate three kinds of problem-solving methods of the addition and subtraction method, the substitution method and the equivalence method are printed on the outside edge of the liquid-crystal display screen 2, and solution-recognition marks 6 are displayed along the inside edge of the liquid-crystal display screen 2 so that the problem-solving method that is currently being used can be recognized. These solution-recognition marks 6 may be displayed as one mark that can shift so as to indicate one of the printed characters of the problem-solving methods, or may be displayed as three marks near the respective characters of the problem-solving methods, one of which is allowed to flicker when specified.

Moreover, along the inside edge of the liquid-crystal display screen 2, for example, at the upper end portion thereof, are displayed respective characters of "equation", which indicates equations first entered are currently being displayed, "process", which indicates transformations are currently being made from the equations, and "answer", which indicates answers as the result of the operation are currently being displayed. These displays are provided in accordance with the contents of the current display. Here, equations, which are obtained from transformations of the equations in the course of the operations from the first equations to the answers, are hereinafter referred to as "process equations".

The group of function keys 3 include an equation key 3a, a solution key 3b, an x-key 3c, a y-key 3d, power keys 3e, an advance key 3f, a return key 3g, a left shift key 3h, a right shift key 3i, an upward shift key 3j, a downward shift key 3k, and a function-expanding key 3m.

The equation key 3a activates the input mode for equations. The solution key 3b selects the solution of equations. The x-key 3c and the y-key 3d are used to enter the variable x and the variable y. The power keys 3e include an OFF key and an ON/C key for the power source. The advance key 3f advances step-wise transformations of the equations step by step. The return key 3g returns the step-wise transformations of the equations step by step from the answers back to the equations. The left shift key 3h, the right shift key 3i, the upward shift key 3j and the downward shift key 3k allow a cursor, which indicates an input position for figures and symbols on the liquid-crystal display screen 2, to shift downward and upward as well as rightward and leftward. The function-expanding key 3m changes the role of a key for entering an instruction for a certain function to another role for entering an instruction for another function.

Additionally, the advance key 3f and the return key 3g respectively correspond to an advance key and a return key that are described in claim 1, and the solution key 3b corresponds to a solution-specifying key that is described in claim 2. Further, the x-key 3c and the y-key 3d are also allowed to function as solution-variable specifying keys described in claim 8, when they are depressed together with the function-expanding key 3m at the same time.

Meanwhile, after the input mode for equations is ready, the above-mentioned displays of "equation", "process" and "answer" are controlled, following the key entries of the advance key 3f and the return key 3g. In other words, upon entering through the advance key 3f or the return key 3g, the display "process" appears, and upon entering through the equation key 5a, the display "answer" appears. Moreover, when the equation key 5a is depressed during any display of equations or any process equation, the results of operations can be displayed immediately.

(2) Arrangements of control system

As shown in the schematic block diagram of FIG. 2, the control system of the electronic desktop calculator 1 is constituted of a CPU (Central Processing Unit) 10, a group of keys 11, a ROM 12, a RAM 13, an LCD (Liquid Crystal Display) driving circuit 14 and an LCD (Liquid Crystal Display Section) 15 including the aforementioned liquid-crystal display screen 2. The group of keys 11, the ROM 12, the RAM 13 and the LCD driving circuit 14 are connected to the CPU 10, and the LCD 15 is connected to the LCD driving circuit 14.

The group of keys 11 include the group of function keys 3, the group of numeric value keys 4 and the group of operation keys 5 for basic four calculations, and any depression of these keys is recognized by the CPU 10. In addition to reading of key inputs, the CPU 10 controls the following processes: transformations of equations and the operations thereof in accordance with any specified problem-solving method; storing and reading of data in and from various buffers, which will be described later; and displays of the contents of the operations. Thus, the CPU 10 functions as an operation means and a control means that are described in claim 1.

The ROM 12 stores programs for controlling operations so that process equations are made in accordance with the respective problem-solving methods, various constants, and other data. Further, to the RAM 13 are allocated a counting buffer 13a, a display-use buffer 13b, an edit buffer 13c, a plurality of process buffers 13d, a numeric-value buffer 13e, an equation buffer 13f, which will be described later, and an operation buffer 13g.

The counting buffer 13a temporarily stores the number of times in which transformations of equations have been made. The display-use buffer 13b temporarily stores display data that are required when the LCD driving circuit 14 drives the LCD 15. The edit buffer 13c temporarily stores equations that have been inputted through the group of keys 11. The process buffers 13d successively store process equations that have been made in accordance with any specified problem-solving method. The numeric-value buffer 13e temporarily stores coefficients of inputted equations and coefficients of process equations made as described above in the manner in which the positions of the coefficients can be specified in the respective equations and process equations. The operation buffer 13g temporarily stores the results of operations that the CPU 10 has carried out after reading out the coefficients stored in the numeric-value buffer 13e, in order to transform the equations or process equations currently being displayed.

Additionally, the LCD driving circuit 14 corresponds to a display control means described in claim 5, the counting buffer 13a corresponds to a storage means for the number of transformations described in claim 3, the process buffers 13d correspond to a process-equation storage means described in claim 1, and the numeric-value buffer 13e corresponds to a numeric-value storage means described in claim 4.

The number of the process buffers 13d is determined so as to be equal to the maximum number of required process equations, that is, so as to provide some spare capacity, if the storage capacity of the RAM 13 is large enough. However, if the storage capacity of the RAM 13 is not large enough, it may be arranged so that process equations are cleared in succession in the order of their age upon filled state of the storage capacity that is maintained for the process buffers 13d, in order to allow new process equations to be stored.

Moreover, the following pointers are provided in the RAM 13:

NOW . . . a pointer which indicates a position in the process buffer 13d at which a process equation, which is currently being displayed, is stored.

FIRST . . . a pointer which indicates a position in the process buffer 13d at which a process equation that has been first made or a process equation that is the closest to the process equation that was first made (in the case where the process equation first made has been cleared) is stored.

LAST . . . a pointer which indicates a position in the process buffer 13d at which a process equation that has been lastly made is stored.

Additionally, when the user has inputted new equations, respective pointers are cleared.

(3) Entering of equations

In the above-mentioned arrangement, when an equation is entered, the x-key 3c, the y-key 3d, the group of numeric-value keys 4 and the group of operation keys 5 for the basic four calculations are selectively depressed in the order as the equation is viewed by the user. For example, if the key entries are carried out in the order as shown in (1) of FIG. 3, the display "x−3y=1" appears in the upper row of the liquid-crystal display screen 2, while the cursor 20, which is flickering, is shifted backward every time a character or a symbol is entered. In (1) of FIG. 3, the flickering cursor 20 is displayed at the back of the number "1". Moreover, when the cursor 20 is shifted onto a character or a symbol that has been entered, it also remains flickering at the current position.

Next, as shown in (2) of FIG. 3, when the downward shift key 3k is depressed, the cursor 20 is shifted onto the leading place in the lower row in the liquid-crystal display screen 2. Successively, when key entries are conducted in the order as shown in (3) of FIG. 3, the display "2x−y=7" appears in the lower row in the liquid-crystal display screen 2. The solution-discrimination mark 6 is displayed so as to indicate a problem-solving method that has been specified.

Additionally, when the leftward shift key 3h is depressed, the cursor 20, which is located in the upper row or the lower row in the liquid-crystal display screen 2, is shifted leftward, and when the rightward shift key 3i is depressed, it is shifted rightward. When the upward shift key 3j is depressed, it is shifted onto the leading place in the upper row.

The following description will discuss a sequence of controlling processes that are taken when equations are entered.

Figure 6:
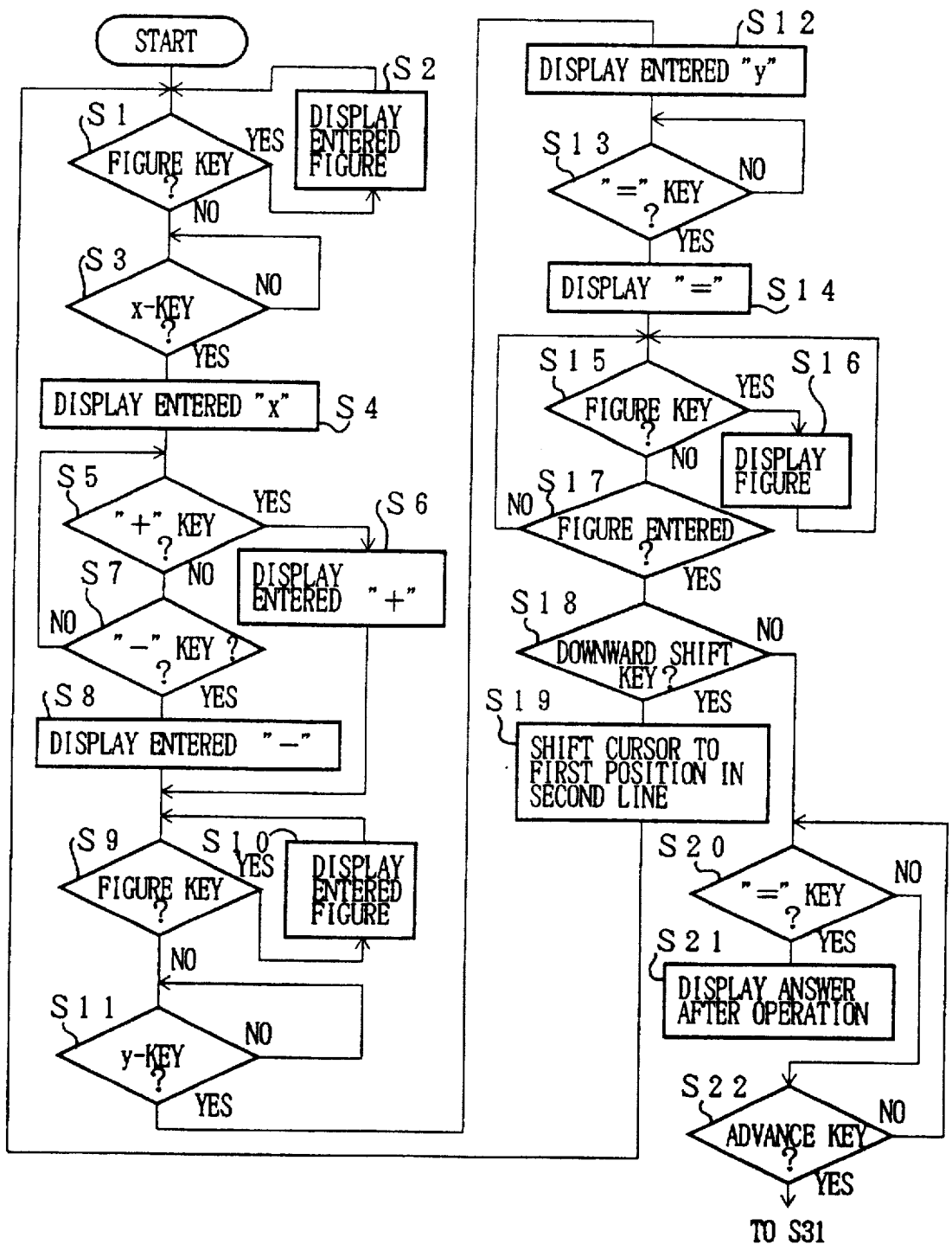
FIG. 6 is a flow chart that shows a sequence of controlling processes by which equations are entered.

As shown in FIG. 6, when the equation key 3a is depressed at the start, the input mode for equations is ready, and at Step (hereinafter, referred to as S) 1, a judgement is made as to whether or not any of the group of numeric-value keys 4 has been depressed. If any of the group of numeric-value keys 4 has been depressed, the figure thus entered is displayed (S2), and the sequence returns to S1. If none of the group of numeric keys 4 is depressed at S1, a judgement is made as to whether or not the x-key 3c has been depressed (S3). If the x-key 3c has been depressed, the character x is displayed in the liquid-crystal display screen 2 (S4).

Next, a judgement is made as to whether or not the key "+" of the group of operation keys 5 for the basic four calculations has been depressed (S5). If the key "+" has been depressed, the symbol "+" is displayed on the liquid-crystal display screen 2 (S6), and the sequence proceeds to S9. If the key "+" has not been depressed, a judgement is made as to whether or not the key "−" has been depressed (S7). If the key "−" has been depressed at S7, the sequence proceeds to S8, and if the key "−" has not been depressed, the sequence returns to S5.

At S9, a judgement is made as to whether or not any of the group of numeric-value keys 4 has been depressed again. If any of the group of numeric-value keys 4 has been depressed, the figure thus entered is displayed (S10), and the sequence returns to S9. If none of the group of numeric-value keys 4 is depressed at S9, a judgement is made as to whether or not the y-key 3d has been depressed (S11). If the y-key 3d has been depressed, the character "y" is displayed on the liquid-crystal display screen 2 (S12). Next, a judgement is made as to whether or not the equation key 5a has been depressed (S13). If the equation key 5a has been depressed, the symbol "=" is displayed on the liquid-crystal display screen 2 (S14). At S15 and S16, the same processes as S9 and S10 are carried out. At S17, it is confirmed that any of the numeric-value keys 4 has been depressed at S15 and that the corresponding numeric value has been entered. At the time of S17, the entering processes of the first equation of simultaneous linear equations have been completed.

Next, at S18, a judgement is made as to whether or not the downward shift key 3k, which shifts the cursor displayed on the liquid-crystal display screen 2 to the lower row, has been depressed. If the downward shift key 3k has been depressed, the cursor is shifted to the leading position of the lower row of the liquid-crystal display screen 2 (S19), and the sequence returns to S1. Here, the second equation is entered through the same key-entering processes as described above. After the second equation has been entered, a judgement is made as to whether or not the equation key 5a has been depressed (S20). If the equation key 5a has been depressed, the operations are carried out and the answers are displayed on the liquid-crystal display screen 2 (S21). The operations in response to depression of the equation key 5a are carried out by using determinants in the same manner as conventionally done, and the answers are displayed immediately.

If the equation key 5a is not depressed at S20, a judgement is made as to whether or not the advance key 3f has been depressed (S22). If the advance key 3f is not depressed, the sequence returns to S20, and if the advance key 3f has been depressed, the sequence proceeds to S31, which will be described below.

(4) Processes in which the advance key is used

If the advance key 3f is depressed after original equations have been entered, the first process equations which are given by transforming the equations by one step, or the first process equations which are the original equations with which information suggesting how to make the first transformation is displayed, are formed, and are stored in one of the process buffers 13d. Then, pointer FIRST, pointer NOW and pointer LAST are allocated to the process buffer 13d in which the first process equations have been stored.

Figure 4:
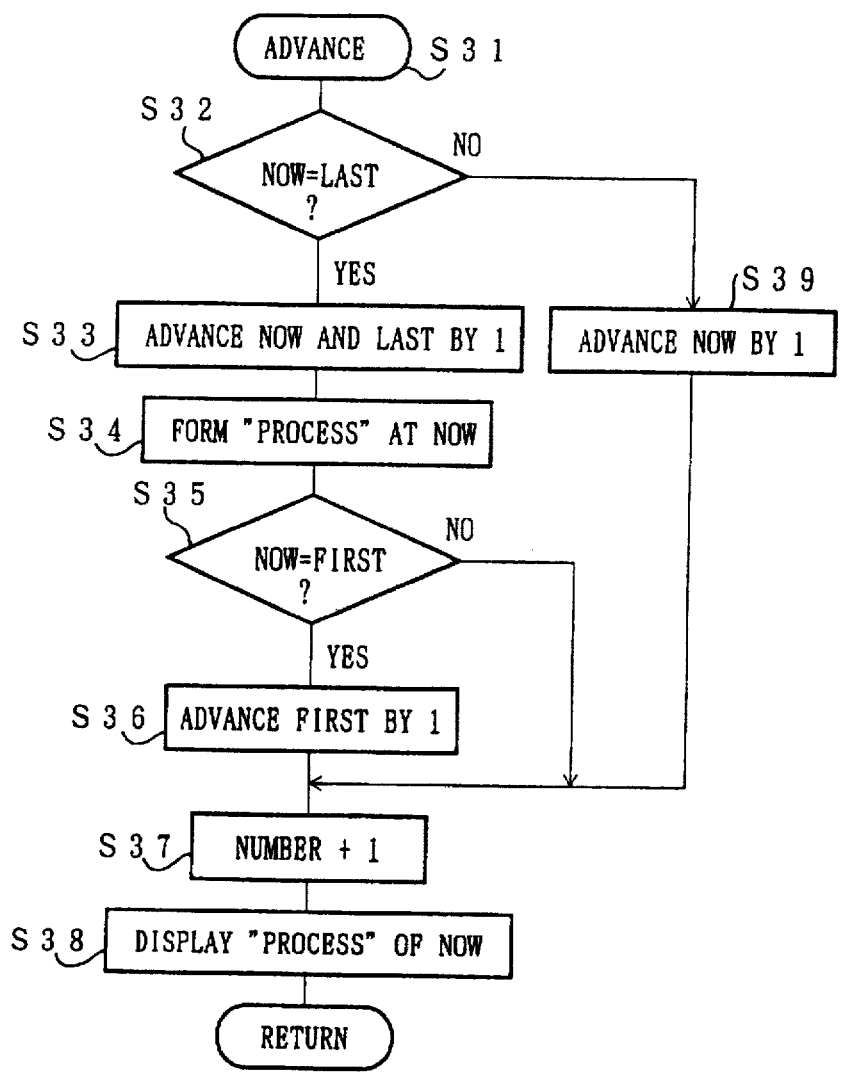
FIG. 4 is a flow chart that shows a sequence of controlling processes by which the contents of display are updated to proceed to the next step of transformation through the operation of an advance key.

Next, as shown FIG. 4, when the advance key 3f is depressed (S31) so as to call for displays of process equations in the next step, a judgement is made as to whether or not pointer NOW and pointer LAST are the same at this time, that is, a judgement is made as to whether or not the process buffer 13d storing the process equations being currently displayed on the liquid-crystal display screen 2 is the same process buffer 13d that stores the process equations that were lastly made (S32). If pointer NOW and pointer LAST are the same, the next process equations are not formed (S33). Therefore, pointer NOW and pointer LAST are advanced by one step, and the next process equations are formed on a new process buffer 13d (S34).

Then, a judgement is made as to whether or not pointer NOW and pointer FIRST have become equal to each other (S35). If pointer NOW and pointer FIRST are equal to each other, this situation means that all the process buffers 13d are filled with process equations. Therefore, it is necessary to clear the first process equations from the process buffer 13d so as to store the next process equations therein. Thus, pointer FIRST is advanced by one step (S36).

In contrast, if pointer NOW and pointer FIRST are not equal to each other, this situation means that an empty process buffer 13d is still available, and the sequence therefore proceeds to S37 by skipping over S36.

At S37, since the next process equations are formed at S34, the number of times to be stored in the counting buffer 13a is incremented by one, and the process equations formed at S34, that is, the process equations corresponding to pointer NOW, are displayed on the liquid-crystal display screen 2 (S38), and the sequence returns to S31.

In contrast, if pointer NOW and pointer LAST are not equal to each other at S32, this situation means that the next process equations have already been stored in the process buffer 13d, and pointer NOW is thus simply advanced by one step (S39). Thereafter, in the same manner as described above, after the number of times to be stored in the counting buffer 13a has been incremented by one (S37), the next process equations are displayed (S38).

As described above, for example, as shown in (1) of FIG. 21, the inputted equations are stored in the edit buffer 13c, and are also displayed on the liquid-crystal display screen 2. Further, each time the advance key 3f is depressed, the number of times to be stored in the counting buffer 13a is incremented by one. At the same time, as shown in (2) through (4), each time process equations are transformed step by step, the resulting process equations are stored in the process buffer 13d, and displays on the liquid-crystal display screen 2 are updated.

(5) Processes in which the return key is used

Figure 5:
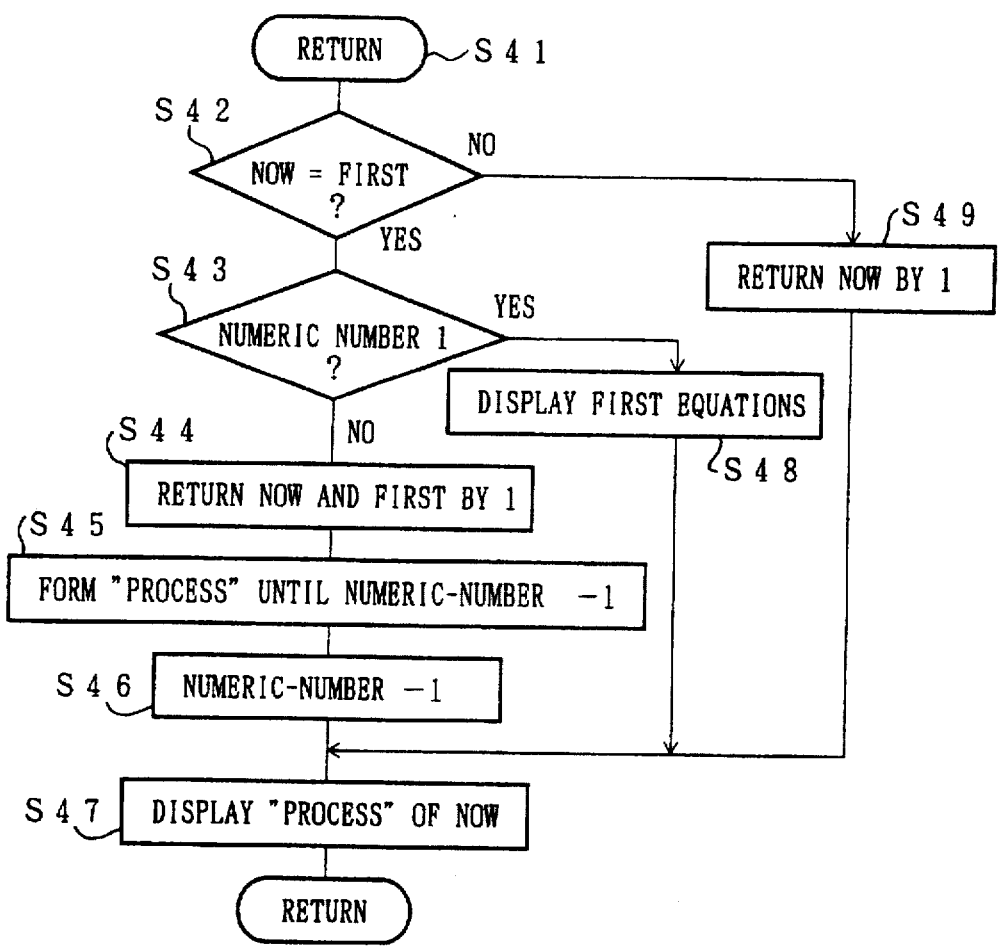
FIG. 5 is a flow chart that shows a sequence of controlling processes by which the contents of display are returned to the preceding step of transformation through the operation of a return key.

Next, as shown in FIG. 5, when an instruction is given by depressing the return key 3g (S41) so as to make the sequence return to the preceding step, a judgement is made as to whether or not pointer NOW and pointer FIRST are the same at this point of time (S42). If pointer NOW and pointer FIRST are the same, a judgement is made as to whether or not the number stored in the counting buffer 13a is one (S43).

If the number of times is one at S43, this situation means that process equations, which are derived from one step of transformation applied to the equations first entered by the user, are currently being displayed on the liquid-crystal display screen 2. Therefore, in response to the entry of the return-key 3g in S41, the original equations are read out from the edit buffer 13c, and are displayed on the liquid-crystal display screen 2 (S48). In this case, as shown in (7) of FIG. 21, the number of times to be stored in the counting buffer 13a becomes zero.

In contrast, if the number of times is not one at S43, this situation means that the process buffer 13d corresponding to pointer FIRST stores process equations which are derived from transformations of two times or more, that is, means that the process equations, which are derived from only one step of transformation, has already been erased. Therefore, pointer NOW and pointer FIRST are returned one step back at S44, and the process equations of the preceding step are formed from the original equations (S45). At this time, by reference to the number of times stored in the counting buffer 13a, the CPU 10 is allowed to recognize that this is achieved by transforming the original equations the predetermined number of times (the number of times −1). Thereafter, one is subtracted from the number of times stored in the counting buffer 13a (S46), and the process equations, formed at S45, are displayed on the liquid-crystal display screen 2 (S47).

If pointer NOW and pointer FIRST are not equal to each other at S42, this situation means that the process equations of the preceding step still exist. Therefore, the sequence proceeds to S47, after returning pointer NOW one step back at S49.

Figure 21:
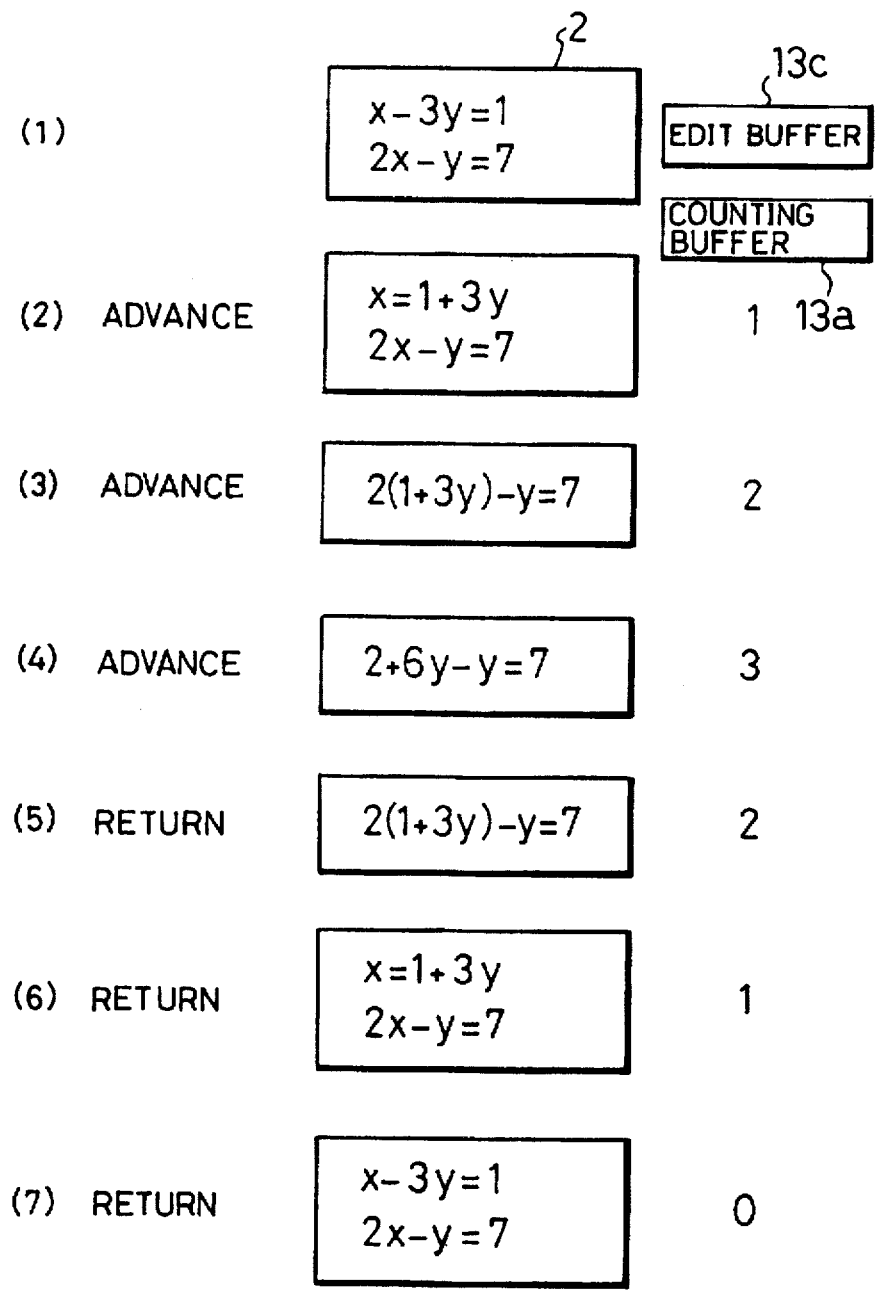
FIG. 21 is an explanatory drawing that shows correlations between displays of process equations and the number of times thereof that has been stored in a counting buffer.

As described above, for example, as shown in (5) through (7) of FIG. 21, each time the return key 3g is depressed one time, the number of time, stored in the counting buffer 13a, is decreased one by one. At the same time, since pointer NOW is returned one by one, the contents of display of the liquid-crystal display screen 2 are returned backward in a manner as shown from (3) through (2) to (1) of FIG. 21.

(6) Specifying methods of problem solving

As described earlier, assuming that the device is used as educational equipment for junior high students, the present embodiment makes it possible to select one of the three kinds of methods of problem solving that include the addition and subtraction method, the substitution method and the equivalence method, in response to depression of the solution key 3b.

Figure 7:
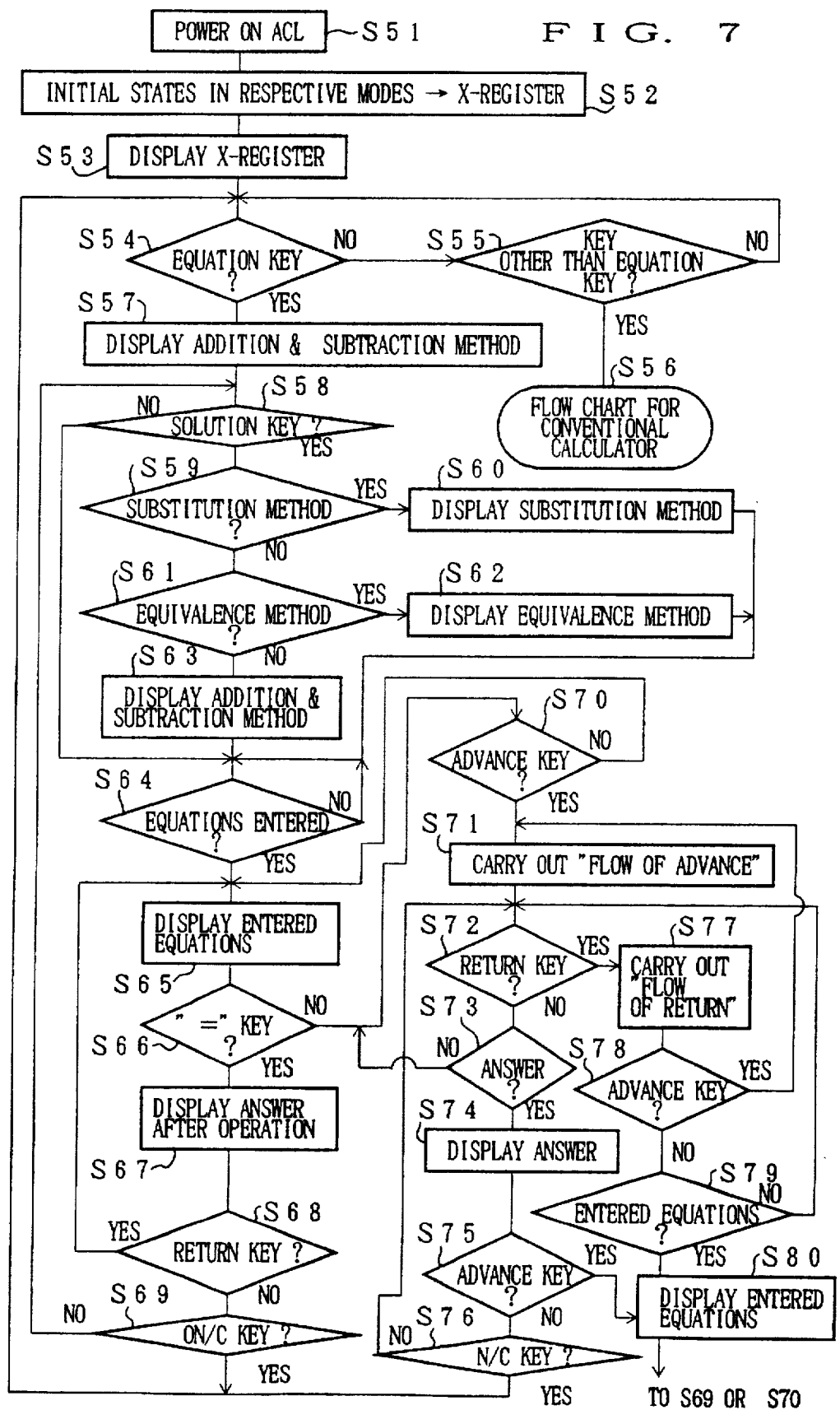
FIG. 7 is a flow chart that shows a sequence of controlling processes by which a problem-solving method is specified through the operation of a solution key as well as a sequence of controlling processes by which operation processes are carried out in accordance with the specified problem-solving method in relation to various key operations.

Referring to FIG. 7, the following description will discuss a controlling sequence used for specifying the method of problem solving. Upon depression of the "ON/C" key of the power-source keys 3e (S51), the power source is first turned on. At S52, data in relation to an initial state immediately after turning on the power source are stored in an X register, not shown, that is connected to the CPU 10. For example, if the initial state is represented by FIG. 0 that is displayed on the liquid-crystal display screen 2, the data for displaying 0 are stored in the X register. At S53, the contents of the X register are displayed.

In the case when a key other than the equation key 3a is depressed at S54 or S55, processes, which follow the conventional flow chart, are carried out (S56). When the equation key 3a is depressed at S54, the sequence enters a mode for displaying the method of problem solving that is used most frequently (S57). Since the addition and subtraction method is normally used most frequently, the present embodiment has a setting so that the addition and subtraction method is displayed most preferentially. Thus, the liquid-crystal display screen 2 displays the solution-recognition mark 6 that indicates the addition and subtraction method.

When the solution key 3b is depressed at S58, another mode for displaying a method of problem solving other than the addition and subtraction method appears. At S59 through S63, every time the solution key 3b is depressed, the display mode is changed in succession from the addition and subtraction method to the substitution method, from the substitution method to the equivalence method, or from the equivalence method to the addition and subtraction method. Accordingly, the solution-recognition mark 6 is also shifted in succession on the liquid-crystal display screen 2, so as to indicate the addition and subtraction method, the substitution method, or the equivalence method.

After completion of the instruction for the method of problem solving, the sequence enters a stand-by state for entries of equations at S64. At S65, entered equations are displayed, and upon depression of the equation key 5a at S66, the answers are found by the conventional operation method using determinants at S67, and the answers are displayed. Next, when the return key 3g is depressed at S68, the sequence returns to S65, thereby displaying the original equations that have been stored in the edit buffer 13c.

If neither the return key 3g is depressed at S68, nor the "ON/C" key is depressed at S69, the sequence returns to S58. If the "ON/C" key is depressed at S69, data are cleared from the display-use buffer 13b, the edit buffer 13c and other memories, and the sequence returns to the initial state at S54.

In the meantime, after the equations have been displayed at S65, the sequence proceeds to S70 through S66, and if the advance key 3f is depressed at S70, the processes of S31 through S39 for displaying process equations, which are discussed by reference to FIG. 4, are carried out at S71. When the advance key 3f is depressed repeatedly, the sequence proceeds through S72 to S73 where the answers are found, and at S74, the answers are displayed. If the advance key 3f is further depressed at S75, the sequence proceeds to S80, which will be described later, thereby displaying the original equations. When the "ON/C" key is depressed at S76 to which the sequence has proceeded after passing through S75, data are cleared from the counting buffer 13a, the display-use buffer 13b, the edit buffer 13c, the process buffer 13d and other memories, and the sequence returns to the initial state at S54.

When the return key 3g is depressed at S72 while certain process equations are being displayed at S71, the processes of S41 through S49, which display the process equations in the reversed manner toward the original equations as has been described by reference to FIG. 5, are carried out. Moreover, when the return key 3g is depressed while the answers are being displayed at S74, the process equations are of course displayed in the reversed manner from the answers. Furthermore, when the advance key 3f is depressed at S78 while certain process equations, which have been attained at S77 by returning from the answers, are being displayed, the process of S71 is carried out.

When the return key 3g is depressed repeatedly at S77, the sequence proceeds through S78 to S79, where a check is made to see that the original equations have been recovered, and at S80, the original equations are displayed. From this state, the processes of S70 and thereafter may be repeated again, or the process of S58 and thereafter may be repeated by depressing the "ON/C" key at S69 in order to respecify the method of problem solving.

(7) Process displays using the addition and subtraction method

Next, an explanation will be given on a sequence of controlling processes for displaying process equations that have been transformed by using the addition and subtraction method. In the electronic desktop calculator 1 of the present invention, process equations are formed after finding conditions under which equations can be transformed most easily, in the same manner as taught in junior high schools, and the subsequent displays are made. This makes it possible to improve the utility of the device as educational equipment.

Figure 9:
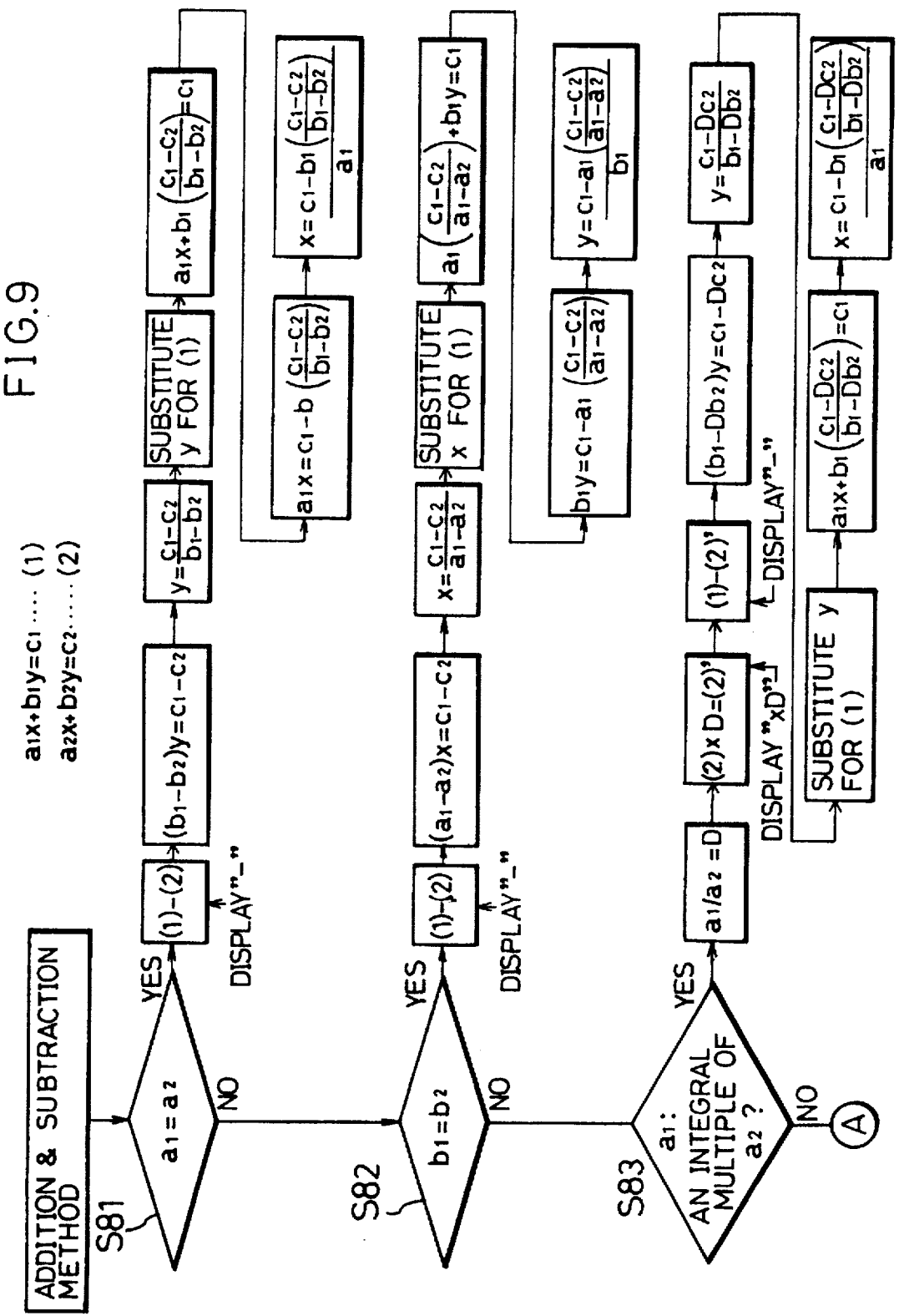
FIG. 9 is a flow chart showing respective parts of a sequence of controlling processes by which, when the addition and subtraction method has been specified as the problem-solving method, a check is made to find the conditions with which the equations are transformed in the simplest manner and a sequence of controlling processes by which, when the conditions with which the equations are transformed in the simplest manner have been found, the corresponding operation processes are carried out.

Let us suppose that simultaneous linear equations with two variables (1) and (2) are given as shown in FIG. 9. First, a judgement is made as to whether or not coefficients $a_1$ and $a_2$ of x are equal to each other (S81). If the coefficients $a_1$ and $a_2$ are equal to each other, the condition for providing the simplest transformation has already been found so that the symbol "−" is displayed on the liquid-crystal display screen 2 as "information for giving a suggestion as to transformation" that is described in claim 6, and the method of problem solving of (1)−(2) is given to the user. Thereafter, every time the user depresses the advance key 3f, there are given the corresponding step-wise displays wherein transformations are conducted as shown in FIG. 9 by eliminating x so as to find the answer of y and substituting the answer of y into the equation (1), until the answer of x is found.

If $a_1=a_2$ does not hold at S81, a judgement is made as to whether or not the coefficients $b_1$ and $b_2$ of y are equal to each other (S82). If the coefficients $b_1$ and $b_2$ are equal to each other, it can be said that the condition for providing the simplest transformation has been found at this step. Then, every time the user depresses the advance key 3f, the process equations on the next step are displayed in the same manner as those in the case of $a_1=a_2$.

If $b_1=b_2$ does not hold at S82, either, a judgement is made as to whether or not $a_1$ is an integral multiple of $a_2$, which will find the condition for providing the second simplest transformation (S83). If the coefficient $a_1$ is an integral multiple of $a_2$, it can be said that the condition for providing the simplest transformation has been found at this step. Thus, $a_1/a_2=D$ is found, and by displaying the figure "x D" on the liquid-crystal display screen 2, the user is informed of the method of problem solving "(2)×D". Thereafter, every time the user depresses the advance key 3f, there are given the corresponding step-wise displays wherein transformations are conducted as shown in FIG. 9 by eliminating x so as to find the answer of y and substituting the answer of y into the equation (1), until the answer of x is found.

Figure 10:
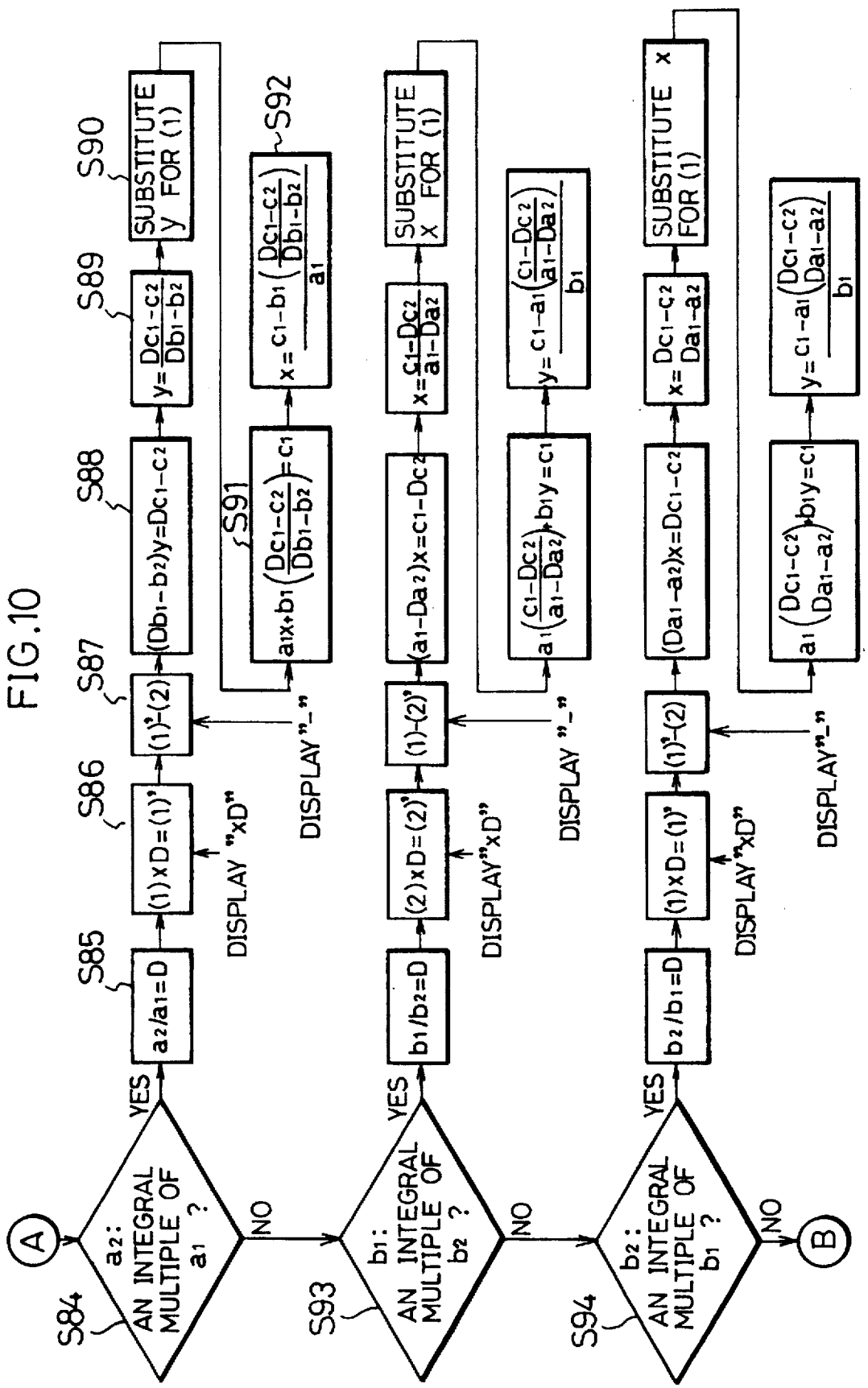
FIG. 10 is a flow chart showing, one part of a sequence of controlling processes that follows the sequence of controlling processes shown in FIG. 9.

If the coefficient $a_1$ is not an integral multiple of $a_2$, either, a judgement is made as to whether or not $a_2$ is an integral multiple of $a_1$ as shown in FIG. 10 (S84). The following description will discuss in detail a case where $a_2$ is an integral multiple of $a_1$ by reference to the specific example of FIG. 8.

Figure 8:
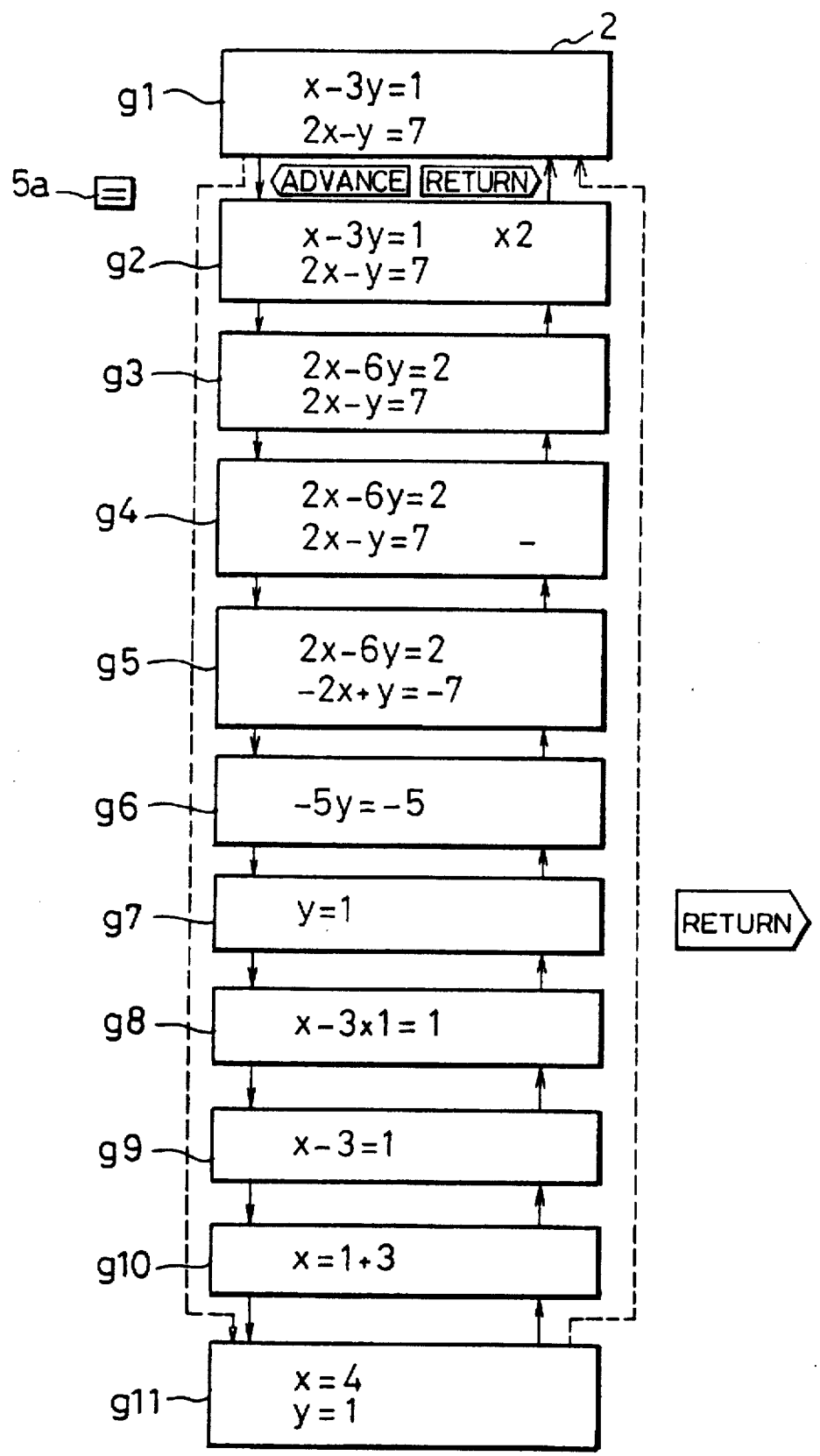
FIG. 8 is an explanatory drawing that shows sequential displays of process equations that are obtained by transforming equations step by step using the addition and subtraction method.

As shown in g1 of FIG. 8, let us assume that equations, x−3y=1 (equation (1)) and 2x−y=7 (equation (2)), are entered by the user. If it is recognized at S84 that $a_2$ is an integral multiple of $a_1$, $a_2/a_1=D$ is found at S85, and as shown in g2 of FIG. 8, by displaying the figure "×2" on the liquid-crystal display screen 2, the user is informed of the method of problem solving "(1)×D".

Next, the operation of (1)×D is carried out at S86, and as shown g3 of FIG. 8, equation (1)', which has a transformed state of 2x−6y=2, is displayed on the liquid-crystal display screen 2. Successively, as shown in S87 as well as g4 of FIG. 8, by displaying the symbol "−" on the liquid-crystal display screen 2, the user is informed of the method of problem solving "(1)'−(2)". In this case, as shown in g5 of FIG. 8, the display may be given as a form wherein the plus and minus symbols of equation (2) are reversed. At S88, as shown in g6 of FIG. 8, the equation is transformed so as to include only y, and the result of the transformation is displayed. At S89, the answer of y is found, and the answer of y is displayed as shown in g7 of FIG. 8.

At S90, as shown in g8 of FIG. 8, equation (1) into which the answer of y is substituted is displayed. At S91, as shown in g9 of FIG. 8, a calculation is carried out between the answer of y and the coefficient of equation (1), and the resulting equation is displayed. At S92, as shown in g10 of FIG. 8, the equation is transformed so as to include only x in the left term and the result is displayed. Thus, as shown in g11 of FIG. 8, both the answers of x and y are displayed.

As described earlier, when the equation key 5a is depressed while the equations are being displayed as shown in g1 of FIG. 8, the answers are found immediately, and the display changes from g1 to g11. In this case, if the return key 3g is depressed at g11, the display returns to g1 and process equations are not displayed. If the advance key 3f is depressed during the display of g1, the display makes a step-wise change in such a manner as g2→g3 →g4 ... After the advance key 3f has been kept depressed until the display of the answers appears, it is possible to change the display in the reversed manner from the answers to the original equations by depressing the return key 3g.

In this case, however, if the number of the process buffers 13d is not sufficient to store the respective process equations from g2 to g10, the process equations are cleared, starting with the first one. If the display of the cleared process equation(s) is called for, the desired process equation(s) is displayed after carrying out the sequence of operations from S84 to S92 again, starting with the original equations.

Next, at S84, if the coefficient $a_2$ is not an integral multiple of $a_1$, either, a judgement is made as to whether or not there is an integral multiple relationship between $b_1$ and $b_2$ at S93 and S94. If there is an integral multiple relationship between $b_1$ and $b_2$, the same sequence of processes as S84 through S92 are carried out.

At S93 and S94, if there is not an integral multiple relationship between $b_1$ and $b_2$, either, a judgement is made as to whether or not both $a_1$ and $a_2$ are multiples of 2 (S95). If both $a_1$ and $a_2$ are multiples of 2, E and F are found so as to satisfy $a_1 \times E=a_2 \times F=L.C.M$ (Least Common Multiple), and × E and × F are displayed beside equation (1) and equation (2) respectively so as to inform the user how to solve the problem. Next, when the user depresses the advance key 3f, the symbol "−" is displayed. Then, every time the user depresses the advance key 3f, there is given a series of step-wise displays in which the answer of y is found by eliminating x and the answer of x is found by substituting the answer of y into equation (1).

In contrast, at S95, if neither $a_1$ nor $a_2$ is a multiple of 2, a judgement is made as to whether or not both $a_1$ and $a_2$ are multiples of 3 (S96). If they are multiples of 3, the same processes as those of multiples of 2 are carried out.

If neither $a_1$ nor $a_2$ is a multiple of 3, a judgement is made as to whether or not both $b_1$ and $b_2$ are multiples of 2 or multiples of 3 at S97 and S98. If they are multiples of 2 or multiples of 3, the same processes as those of $a_1$ and $a_2$ are carried out.

Figure 12:
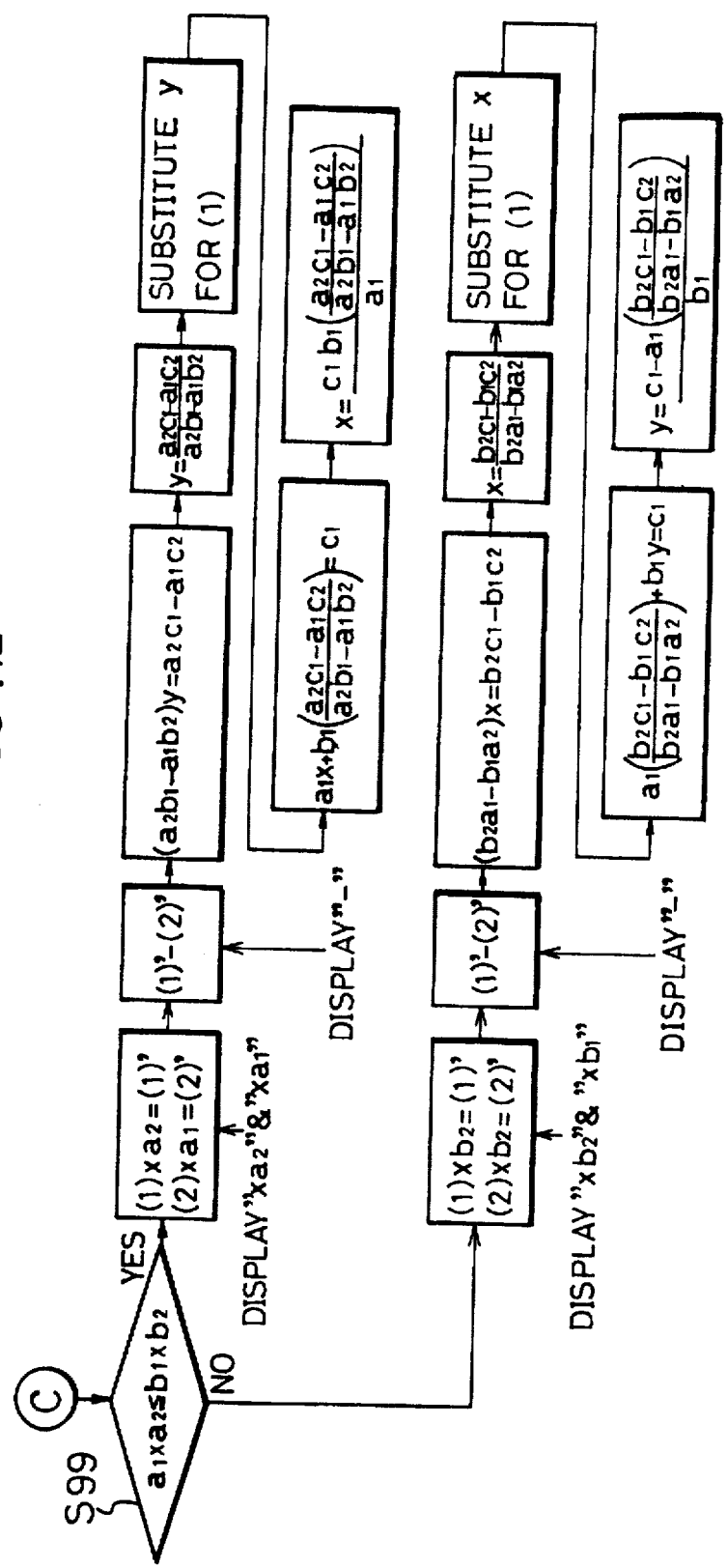
FIG. 12 is a flow chart showing the last part of a sequence of controlling processes that follows the sequence of controlling processes shown in FIG. 11.

At last, if neither $b_1$ nor $b_2$ is a multiple of 2 or a multiple of 3 at S97 and S98, a comparison is made between the value of $a_1 \times a_2$ and the value of $b_1 \times b_2$ at S99 as shown in FIG. 12. Then the coefficients that makes the value smaller are selected, and the values of the coefficients of equation (1) and equation (2) are made coincident with each other by multiplying equation (1) by the coefficient of equation (2) as well as multiplying equation (2) by the coefficient of equation (1). In this case, the displays of "$\times a_2$" and "$\times a_1$" or "$\times b_2$" and "$\times b_1$" are given so as to inform the user how to solve the problem. Next, when the user depresses the advance key 3f, the symbol "−" is displayed. Then, every time the user depresses the advance key 3f, there is given a series of step-wise displays in which the answer of y is found by eliminating x and the answer of x is found by substituting the answer of y into equation (1).

(8) Operations of buffers in process displays

Figure 26:
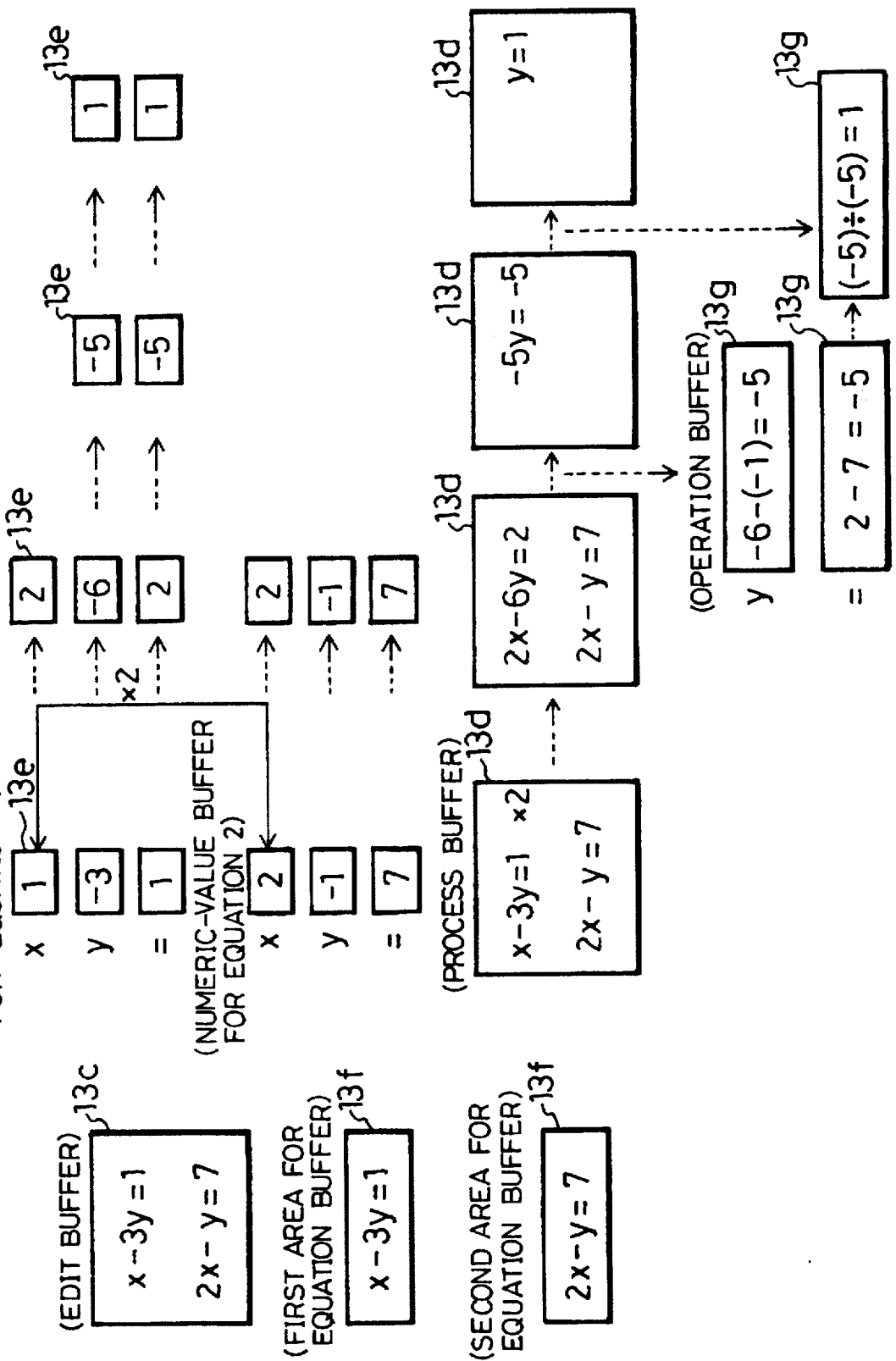
FIG. 26 is an explanatory drawing that shows the contents of storage in the respective buffers when the process equations are made.

Referring to FIG. 26, an explanation will given as to how the buffers 13a through 13g shown in FIG. 2 are used upon entries of equations and during operations of the process equations. Here, for convenience of explanation, it is supposed that the addition and subtraction method is selected as the method of problem solving.

Equations, entered by the user, are first stored in the edit buffer 13c. The CPU 10 reads out the contents of the edit buffer 13c onto the display-use buffer 13b, and controls the LCD driving circuit 14 in accordance with the contents of the display-use buffer 13b, thereby allowing the liquid-crystal display screen 2 to display the equations.

Moreover, the CPU 10 makes a judgement as to whether or not each of the first equation (for example, x−3y=1) and the second equation (for example, 2x−y=7) of the simultaneous linear equations with two variables, which have been entered by the user, has a standard form of ax+by=c. For example, supposing that the first equation has been entered as 2x−3y−x=1, the CPU 10 transforms the equation into the standard form of x−3y=1. Then, as shown in FIG. 26, the first equation, which now has the standard form, is stored in the first area of the equation buffer 13f, and the second equation in the standard form is stored in the second area of the equation buffer 13f.

When the equations in the standard form are stored in the respective areas, their coefficients that correspond to a, b and c in the standard equation are stored in the numeric-value buffer 13e. Here, the storage areas of the numeric buffer 13e are allocated to the respective coefficients of the first equation and the second equation.

Next, when the user depresses the advance key 3f, the CPU 10 stores the number of time, 1, in the counting buffer 13a, and makes comparisons between the corresponding coefficients of the first equation and the second equation so as to make judgements as to the relationships of the corresponding coefficients. For example, as shown in FIG. 26, if the coefficient of x of the second equation is 2 times the coefficient of x of the first equation, the CPU 10 reads out the equations from the edit buffer 13c onto the process buffer 13d as the first display of process equations, and stores "x 2" following the first equation. Thereafter, the display on the liquid-crystal display screen 2 is carried out in accordance with the contents of the process buffer 13d.

When the user further operates the advance key 3f so as to carry out transformations of the equations or process equations, the CPU 10 calls for an operation routine from the ROM 12, and also calls for the coefficients corresponding to the routine from the numeric-value buffer 13e to the operation buffer 13g, thereby carrying out the operations. The results of the operations are returned to the operation buffer 13g. Further, the contents of the numeric-value buffer 13e are updated in accordance with the contents of the operation buffer 13g, and the contents of the process buffer 13d are updated in accordance with the contents of the updated numeric-value buffer 13e.

(9) Process displays using the substitution method

The following description will discuss a sequence of controlling processes for displaying process equations that have been transformed by using the substitution method. In this case also, after finding conditions under which equations can be transformed most easily, process equations are formed and displayed.

Figure 13:
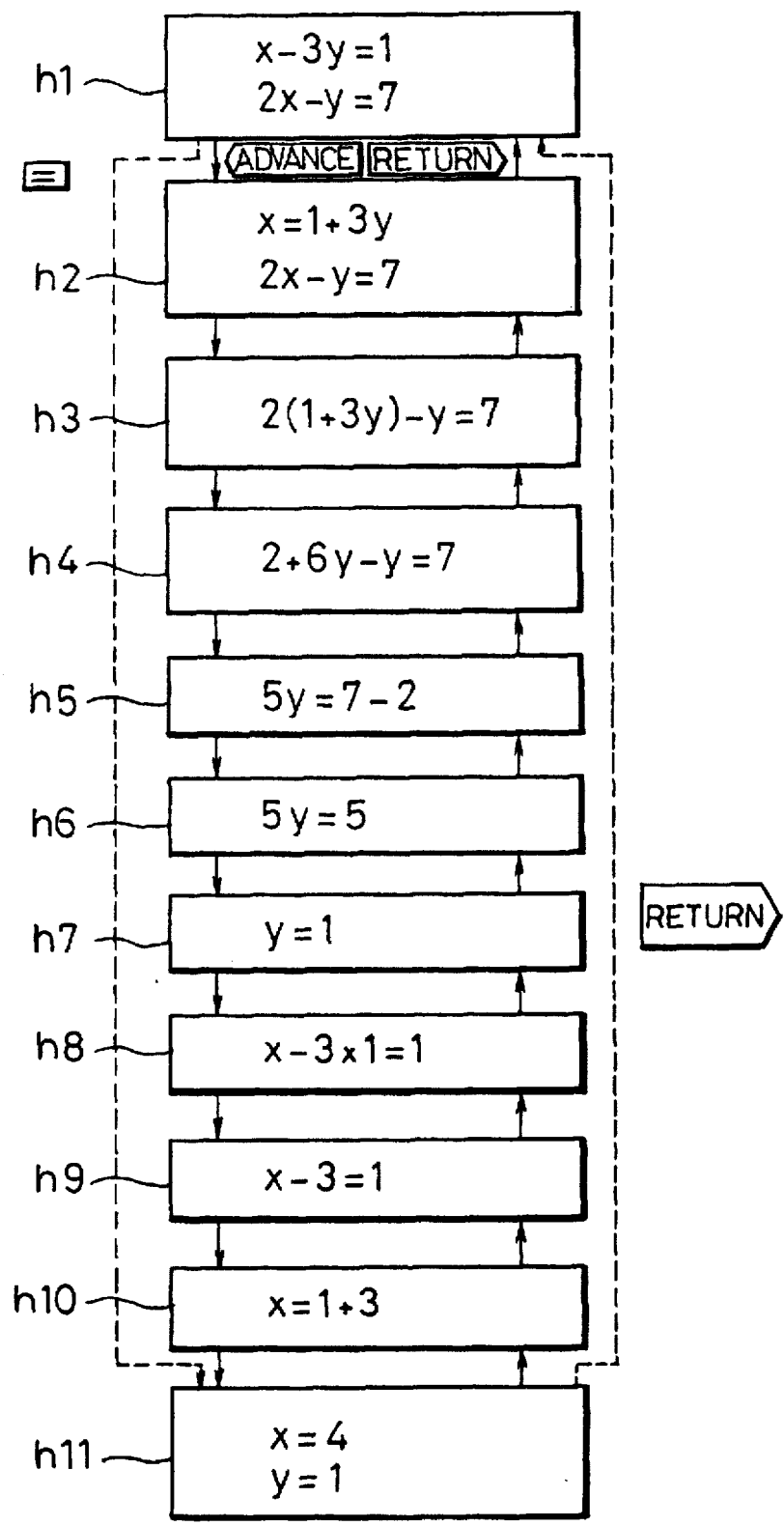
FIG. 13 is an explanatory drawing that shows sequential displays of process equations that are obtained by transforming equations step by Step using the substitution method.
Figure 14:
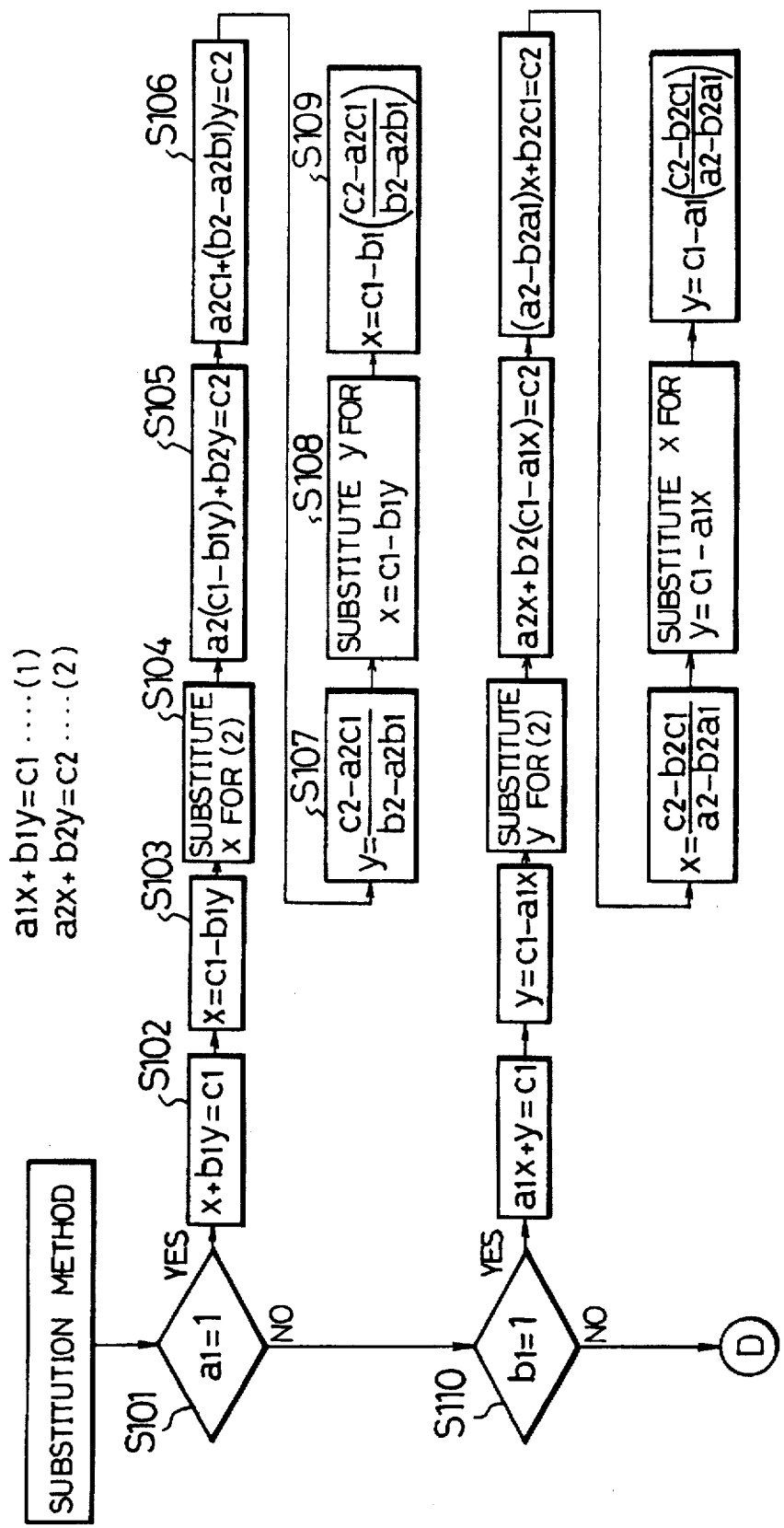
FIG. 14 is a flow chart showing respective parts of a sequence of controlling processes by which, when the substitution method has been specified as the problem-solving method, a check is made to find the conditions with which the equations are transformed in the simplest manner and a sequence of controlling processes by which, when the conditions with which the equations are transformed in the simplest manner have been found, the corresponding operation processes are carried out.

As shown in FIG. 14, let us suppose that general equations (1) and (2) of simultaneous linear equations with two variables are the same as those used in the aforementioned case of the addition and subtraction method, and as shown in h1 in FIG. 13, let us also suppose that equations, entered by the user, are the same as those used in the case of the addition and subtraction method. The user may enter the equations again, or may call for the displays of the first equations at S80 in FIG. 7, after confirming the process equations of the addition and subtraction method. Then the user may make the sequence return to S58 through S69, and may select the display mode for the substitution method successively by depressing the solution key 3b.

First, at S101, a judgement is made as to whether or not the coefficient $a_1$ of equation (1) is 1. With reference to a specific example shown in FIG. 13, the following description will discuss in detail the processes that are carried out when $a_1$ is equal to 1. If $a_1$ is equal to 1 at S101, the condition for providing the simplest transformation has already been found so that it is confirmed at S102 that the equation to be transformed is equation (1), and at S103, an equation having y shifted to its right term is displayed as shown in h2 of FIG. 13. Next, at S105 after passing through S104, an equation, obtained after substitution of the x-value into equation (2), is displayed as shown in h3 of FIG. 13.

Next, as shown in h4 through h6 of FIG. 13, operations are carried out to find the answer of y at S106, and at S107, the answer of y is displayed as shown in h7 of FIG. 13. Successively, as shown in h8 of FIG. 13, at S108, with substitution of the answer of y into the equation of x that has been found at S103, operations are carried out to find the answer of x, as shown in h9 and h10 of FIG. 13. Finally, the answer of x is found at S109, and the answer of x and the answer of y are displayed as shown in h11 of FIG. 13. Next, if $a_1$ is not equal to 1 at S101, a judgement is made as to whether or not the coefficient $b_1$ of y of equation (1) is equal to 1 at S110. If $b_1$ is equal to 1, the answer of y is found after finding the answer of x, by using the same processes as those in S102 through S109.

Figure 15:
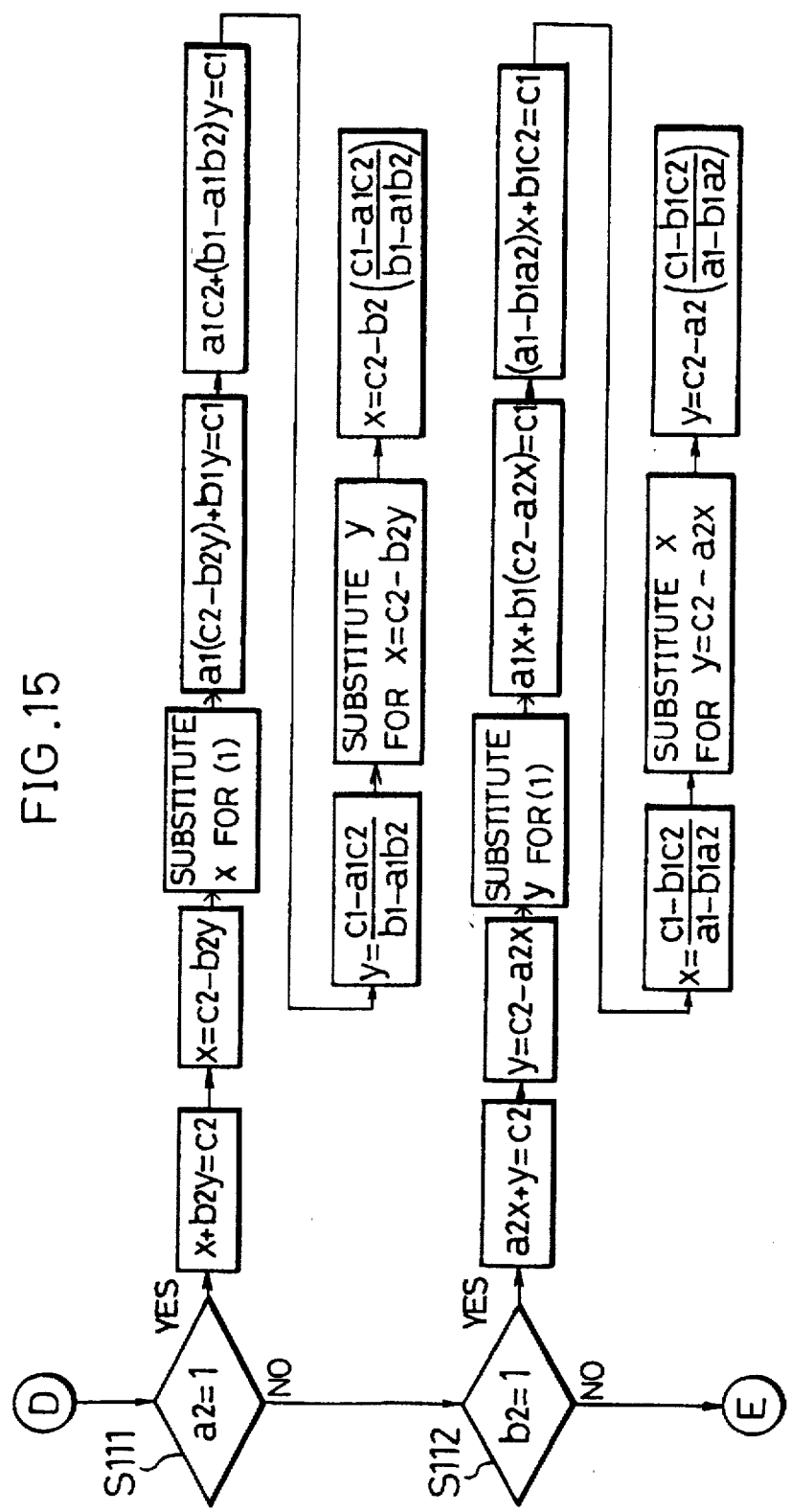
FIG. 15 is a flow chart showing one part of a sequence of controlling processes that follows the sequence of controlling processes shown in FIG. 14.

If $b_1$ is not equal to 1, either, at S110, a judgement is made as to whether or not the coefficient $a_2$ of x of equation (2) is equal to 1 at S111, as shown in FIG. 15. If $a_2$ is equal to 1, the same processes as those in S102 through S109 are carried out with respect to equation (2).

If $a_2$ is not equal to 1, either, at S111, a judgement is made as to whether or not the coefficient $b_2$ of y of equation (2) is equal to 1 at S112. If $b_2$ is equal to 1, the answer of y is found after finding the answer of x, by using the same processes as those in S102 through S109 with respect to equation (2).

If $b_2$ is not equal to 1, either, at S112, equation (1) is transformed so as to have only x in its left term, and by substituting the x-value into equation (2), equation (2) is transformed into an equation having only y as its variable. Thereafter, if it is necessary to cancel the denominator in order to find the answer of y, a display is made so as to indicate that both terms of the equation including only y should be multiplied by the same value as the denominator. Thus, after finding the answer of y, the answer of x is found, and these answers are displayed.

(10) Process displays using the equivalence method

The following description will discuss a sequence of controlling processes for displaying process equations that have been transformed by using the equivalence method. In this case also, after finding conditions under which equations can be transformed most easily, process equations are formed and displayed.

Figure 17:
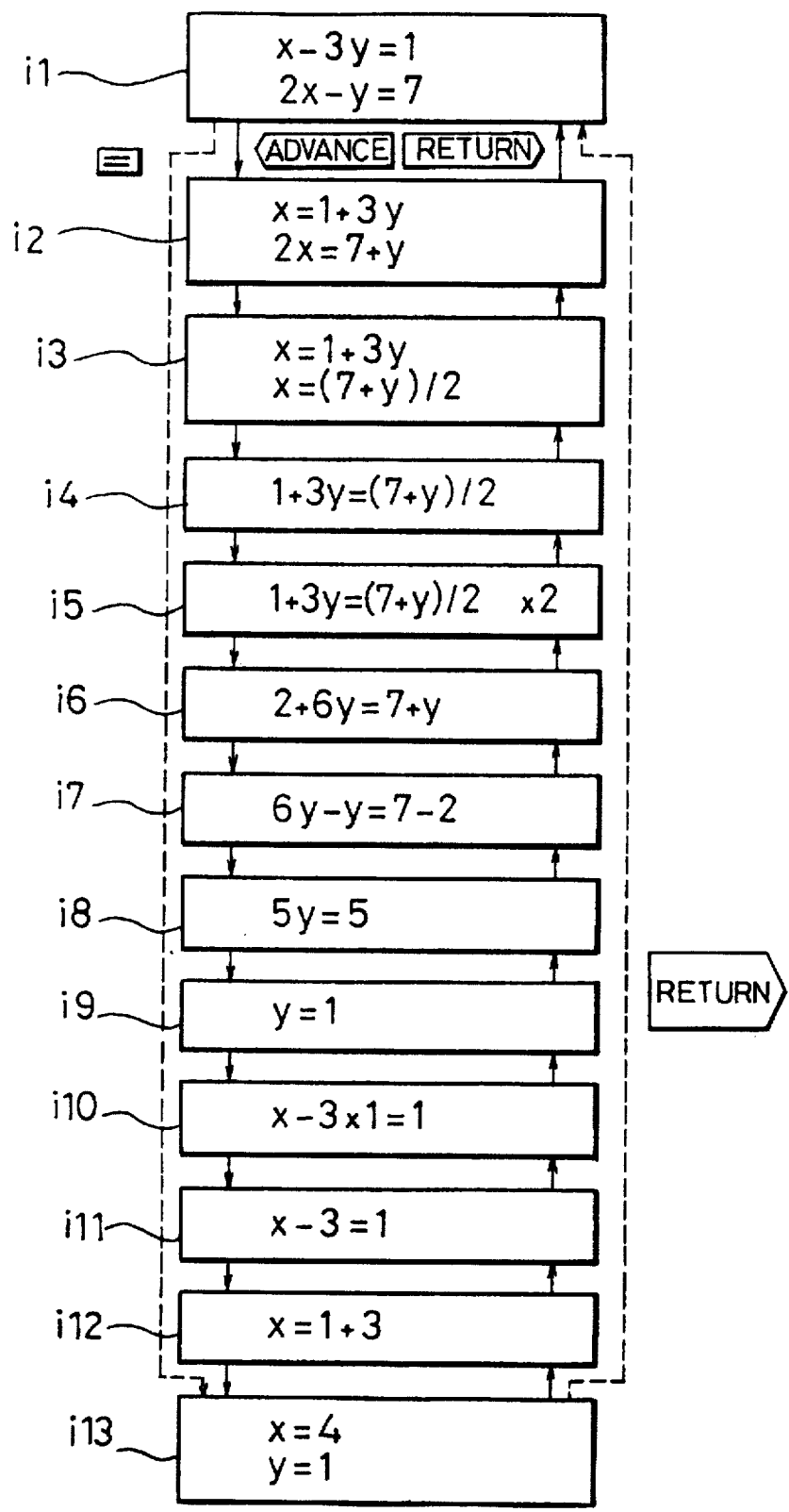
FIG. 17 is an explanatory drawing that shows sequential displays of process equations that are obtained by transforming equations step by step using the equivalence method.
Figure 18:
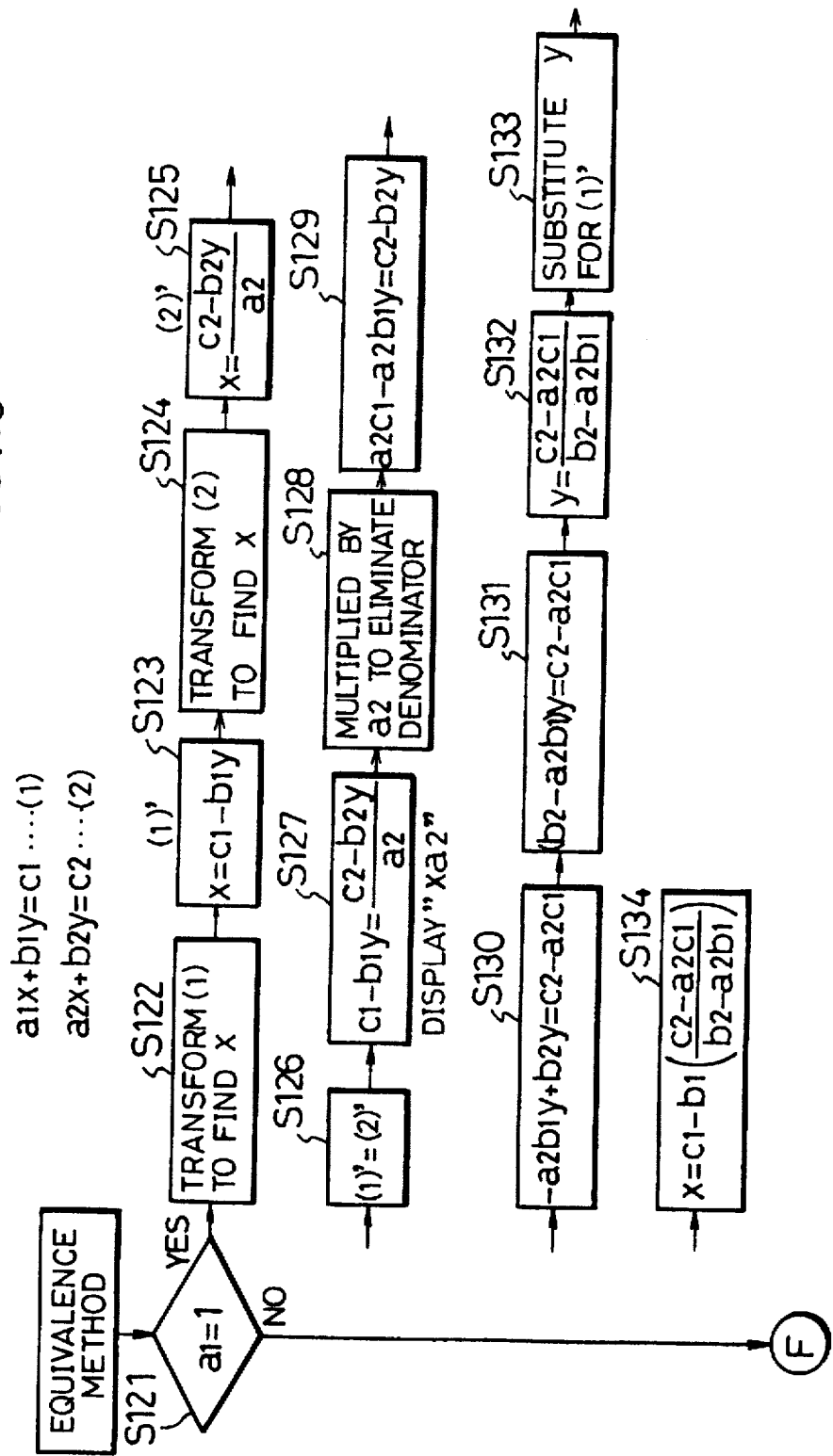
FIG. 18 is a flow chart showing respective parts of a sequence of controlling processes by which, when the equivalence method has been specified as the problem-solving method, a check is made to find the conditions with which the equations are transformed in the simplest manner and a sequence of controlling processes by which, when the conditions with which the equations are transformed in the simplest manner have been found, the corresponding operation processes are carried out.

As shown in FIG. 18, let us suppose that general equations (1) and (2) of simultaneous linear equations with two variables are the same as those used in the aforementioned case of the addition and subtraction method, and as shown in i1 in FIG. 17, let us also suppose that equations, entered by the user, are the same as those used in the case of the addition and subtraction method. The user may enter the equations again, or may call for the displays of the original equations at S80 in FIG. 7, after confirming the process equations of the addition and subtraction method or the substitution method. Then the user may make the sequence return to S58 through S69, and may select the display mode for the equivalence method successively by depressing the solution key 3b.

First, at S121, a judgement is made as to whether or not the coefficient $a_1$ of equation (1) is 1. With reference to a specific example shown in FIG. 17, the following description will discuss in detail the processes that are carried out when $a_1$ is equal to 1. If $a_1$ equal to 1 at S121, the condition for providing the simplest transformation has already been found so that at S122, y of equation (1) is shifted to its right term. Then, equation (1)', obtained after the transformation at S123, is displayed as shown in i2 of FIG. 17, and at S124, an equation, obtained by shifting y of equation (2) to its right term, is displayed.

Next, as S125, equation (2)', obtained by shifting the coefficient as of x of equation (2) to the denominator of its right term, is displayed. Thus, in both equation (1) and equation (2), the transformation have been made so that equations (1)' and (2)' include only x in their left terms. Therefore, at S126, the right term of (1)' is placed equal to the right term of (2)', and at S127, an equation including only y is displayed as shown in i4 of FIG. 17. In this equation, since the coefficient $a_2$ exists as the denominator, the display of $\times a_2$ is given so as to inform the user that the denominator should be cancelled, as shown in i5 of FIG. 17.

Successively, at S128 and S129, the equation in which the denominator has been cancelled is displayed as shown in i6 of FIG. 17. At S130, an equation in which y's are collected in the left term and figures are collected in the right term is displayed as shown in i7 of FIG. 17, and at S131, y's in the left term are added as shown in i8 of FIG. 17. Then, at S132, the answer of y is found and displayed, as shown in i9 of FIG. 17. Successively, at S133, the answer of y is substituted into equation (1)', as shown in i10 of FIG. 17, and at S134, operations are carried out to find the answer of x, as shown in i11 and i12 of FIG. 17. Thus, the answers of x and y are displayed as shown in i13 of FIG. 17.

Figure 19:
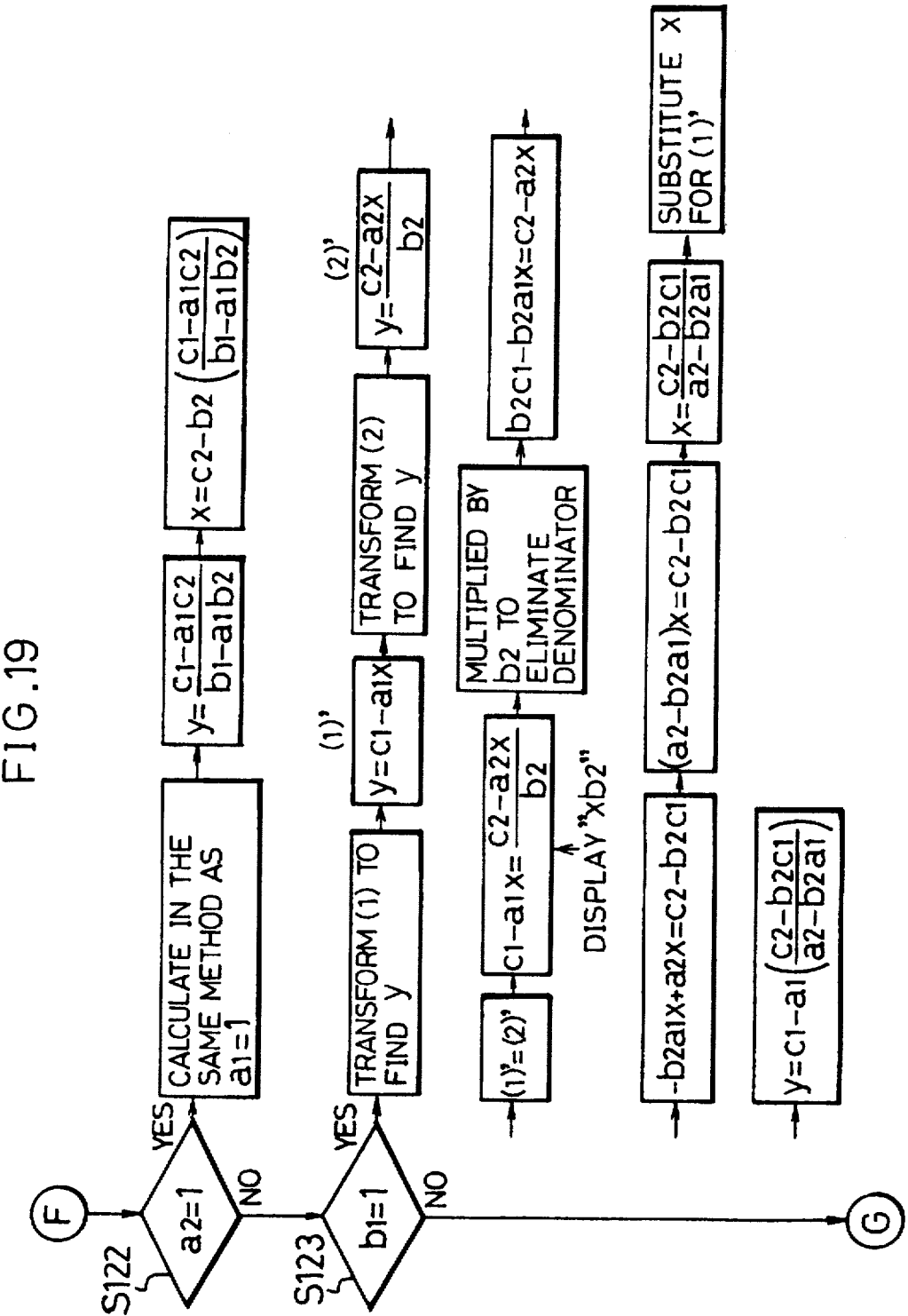
FIG. 19 is a flow chart showing one part of a sequence of controlling processes that follows the sequence of controlling processes shown in FIG. 18.

Next, if $a_1$ is not equal to 1 at S121, a judgement is made as to whether or not the coefficient $a_2$ of x of equation (2) is equal to 1 at S122 as shown in FIG. 19. If $a_2$ is equal to 1, the answers of x and y are found, by using the same processes as those in S122 through S134.

If $a_2$ is not equal to 1, either, at S122, a judgement is made as to whether or not the coefficient $b_1$ of y of equation (1) is equal to 1 at S123. If $b_1$ is equal to 1, the same processes as those in S122 through S134 are carried out so as to leave only y in its left term, and the answer of y is found after finding the answer of x.

Figure 20:
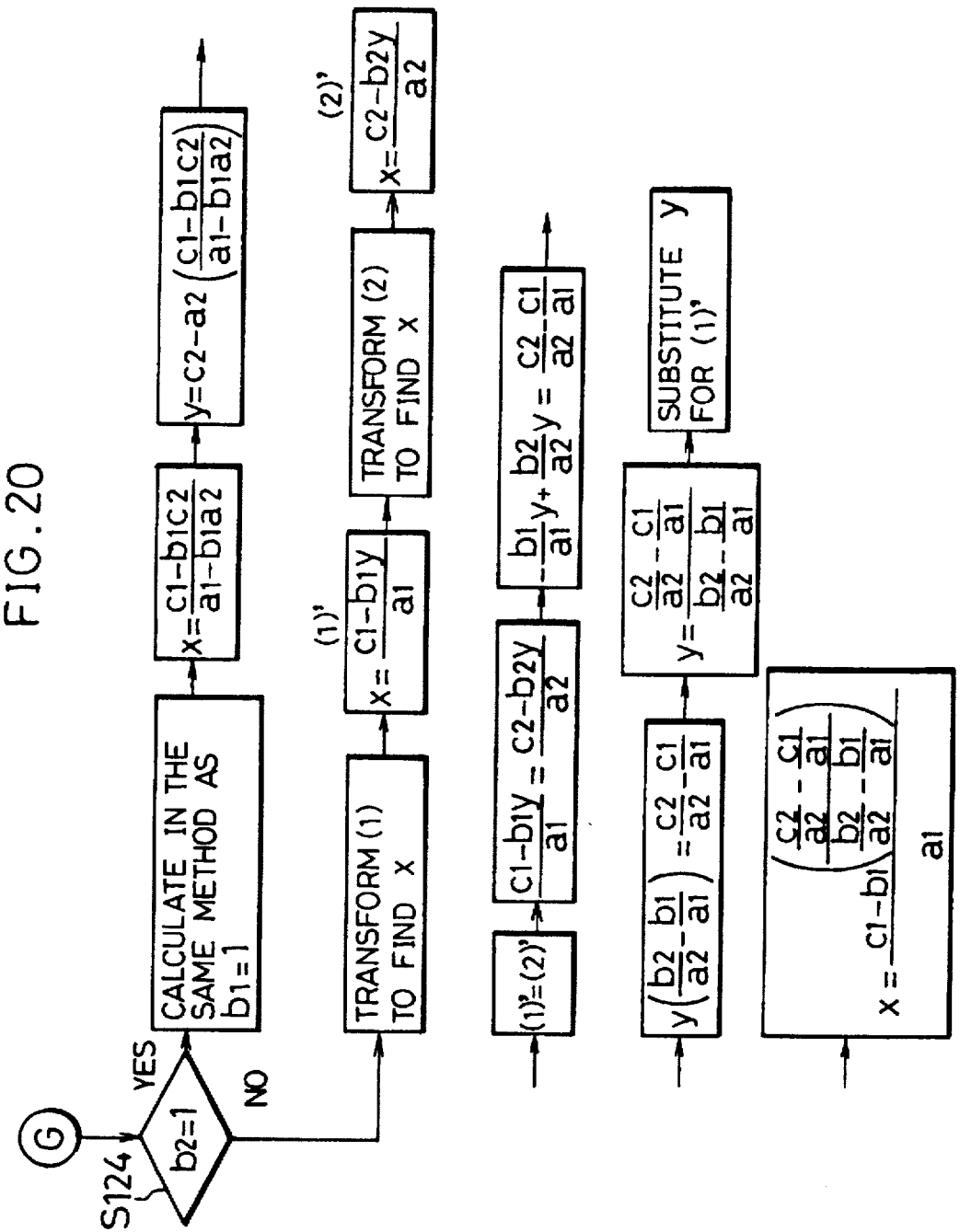
FIG. 20 is a flow chart showing the last part of a sequence of controlling processes that follows the sequence of controlling processes shown in FIG. 19.

If $b_1$ is not equal to 1, either, at S123, a judgement is made as to whether or not the coefficient $b_2$ of y of equation (2) is equal to 1 at S124 as shown in FIG. 20. If $b_2$ is equal to 1, the answer of y is found after finding the answer of x, by using the same processes as those in the case when $b_1$ is equal to 1.

If $b_2$ is not equal to 1, either, at S124, equation (1)', obtained by transforming equation (1) so as to include only x in its left term, is displayed, while equation (2)', obtained by transforming equation (2) so as to include only x in its left term, is displayed, and an equation that is obtained by connecting the right terms of equations (1)' and (2)' with an equal sign is displayed. Thereafter, operations are carried out to find the answer of y, and the display is updated each time the transformation advances step by step. After finding the answer of y, the answer of y is substituted into equation (1)' so as to find the answer of x, and the answers of x and y are displayed.

As described above, the electronic desktop calculator 1 of the present embodiment is provided with: an operation means in the CPU 10 which carries out operations to find answers by transforming equations step by step in accordance with one of various problem-solving methods; process buffers 13d which temporarily store process equations, each of which is obtained each time the operation means makes each transformation step by step; an advance key 3f through which an instruction is given to make and display each of step-wise transformations from equations to their answers; a return key 3g through which an instruction is entered to make and display each of step-wise transformations from the answers to the equations; and a control means in the CPU 10 which controls operations in the operation means and readout of the process equations from the process buffers 13d so as to update the contents of display each time the advance key 3f or the return key 3g is operated.

With this arrangement, by operating the advance key 3f, the user can confirm processes of the problem-solving method for finding answers of equations step by step while taking these processes into consideration. This makes it possible to improve the effects of learning. Further, by operating the return key 3g, the user can confirm the preceding process equation before having been subjected to the current transformation. This makes it possible for the user to learn processes of the solution more firmly by allowing him to compare steps before and after the transformation. Moreover, in the case when the user has found that the answer derived from his own calculations is incorrect, he can check it out to see at which step of the processes of the problem-solving method he has erred, by operating the advance key 3f.

In addition, the electronic desktop calculator 1 of the present embodiment is provided with a solution key 3b through which an instruction for selecting one of the various problem-solving methods is entered, and the control means controls the operation means so that in response to the instruction given through the solution key 3b, equations are transformed step by step in accordance with the selected problem-solving method.

This arrangement makes it possible for the user to learn the processes of the problem-solving method that he has selected among the various problem-solving methods by the entry through the solution key 3b. Therefore, it is possible to provide educational equipment that further improves the effects of learning.

Moreover, the electronic desktop calculator 1 of the present embodiment is provided with a counting buffer 13a which temporarily stores the number of times that step-wise transformations are carried out to reach the answers from equations. The control means increases or reduces the number of transformations stored in the counting buffer 13a one by one, each time the advance key 3f or the return key 3g is operated, and controls the reading of process equations from the process buffer 13d and the operations in the operation means so that process equations corresponding to the number of transformations stored in the counting buffer 13a can be displayed.

In accordance with the above-mentioned arrangement, if, for example, equations are transformed once to produce the first process equations, the number 1 is stored in the counting buffer 13a. If the process equations are transformed once again to produce the second process equations, the number 2 is stored in the counting buffer 13a. Thus, the respective process equations correlate with the numerical number of transformations stored in the counting buffer 13a on a one-to-one basis. Further, the numerical number of transformations stored in the counting buffer 13a also correlates with the number of entering operations of the advance key 3f and the return key 3g. For example, if the numerical number of transformations, stored in the counting buffer 13a, becomes 2 after an entering operation through the return key 3g, the control means recognizes that the display of the second process equations is called for.

Therefore, the installation of the counting buffer 13a allows the control means to control the reading of process equations from the process buffer 13d and the operations in the operation means more easily.

Consequently, even in the case when, for example, the storage capacity of the process buffer 13d is not sufficient to store all the process equations and some of the process equations have to be cleared, starting with the first one, the control means can recognize how many transformations the process equations, currently being called for, have been subjected to before they were created beginning from the original equations, by reference to the number of times stored in the counting buffer 13a.

With this arrangement, even if the process equations, currently being called for, have been cleared from the process buffer 13d, it is possible to form the desired process equations again by transforming the equations as many times as the recognized numerical number of transformations and also to display them. This also results in the effect for miniaturizing the storage capacity of the process buffer 13d.

Moreover, the electronic desktop calculator 1 of the present embodiment is provided with a numeric-value buffer 13e for temporarily storing respective coefficients while identifying the positions of the coefficients in the process equations or the equations. The control means finds the conditions with which the equations are transformed in the simplest manner by reference to the contents of storage of the numeric-value buffer 13e, and controls the operations of the operation means based on the resulting conditions thus found.

In the above-mentioned arrangement, the installation of the numeric-value buffer 13e allows the control means to recognize the positions and values of the coefficients in the process equations or the equations, by reference to the contents of storage of the numeric-value buffer 13e; this makes it possible to easily make comparisons between the values of the respective coefficients. For example, if the equations are given as simultaneous linear equations with two variables, the control means compares the value of the coefficient x of the first equation and the coefficient x of the second equation in order to examine the relationship thereof, for example, as to whether they are equal to each other or as to whether they are multiples of 2.

Consequently, the control means finds the conditions with which the equations are transformed in the simplest manner, and controls the operations of the operation means based on the resulting conditions thus found.

Therefore, when the advance key 3f is depressed once with equations being displayed, the clue for the operation processes that solve the equations most effectively is given to the user, thereby further improving the effects of learning.

Furthermore, the electronic desktop calculator 1 of the present embodiment is provided with an LCD driving circuit 14 and an LCD 15 that displays the selected problem-solving method in a distinguishable manner in response to an entry through the solution key 3b.

In accordance with the above-mentioned arrangement, upon entering through the solution key 3b, the LCD driving circuit 14 and the LCD 15 displays the selected problem-solving method in a distinguishable manner. More specifically, for example, a mark may be provided so as to indicate one of various problem-solving methods that are printed on the peripheral of the frame of LCD 15, or the selected problem-solving method may be displayed as a corresponding character. These arrangements eliminate the necessity of having to provide solution keys 3b for the number of existent problem-solving methods, and the user can select one of the problem-solving methods by using only one solution key 3b. These arrangements also contribute to the compactness of the electronic desktop calculator 1.

Furthermore, in the electronic desktop calculator 1 of the present embodiment, the control means controls the operations in the operation means by reference to the contents of storage in the numeric-value buffer 13e so that information, which gives a suggestion concerning transformation to the user, is included in the process equations.

The above-mentioned arrangement makes it possible for the control means to easily make comparisons between the values of the respective coefficients, as described earlier. Therefore, for example, in operation processes of simultaneous linear equations using the addition and subtraction method, the control means is allowed to easily make a recognition as to which equation should be multiplied by how many times in order to set the coefficients of x at the same value, or as to other factors. In such a case, the control means controls the operations in the operation means so that information such as "×2", which gives a suggestion concerning transformation to the user, is included in the process equations.

Therefore, it is possible to provide the user with a clue for the idea that is used for transforming the equations or process equations, currently being displayed, into their next stage, thereby further improving the effects of learning.

Moreover, the various problem-solving methods of the electronic desktop calculator 1 of the present embodiment include, at least, the addition and subtraction method, the substitution method and the equivalence method that are provided as problem-solving methods for simultaneous linear equations.

In this arrangement, the problem-solving methods are limited to the addition and subtraction method, the substitution method and the equivalence method as the problem-solving methods for simultaneous linear equations; therefore, the above-mentioned functions and effects are well achieved for use as educational equipment for simultaneous linear equations intended, especially, for junior-high students.

[EMBODIMENT 2]

Figure 22:
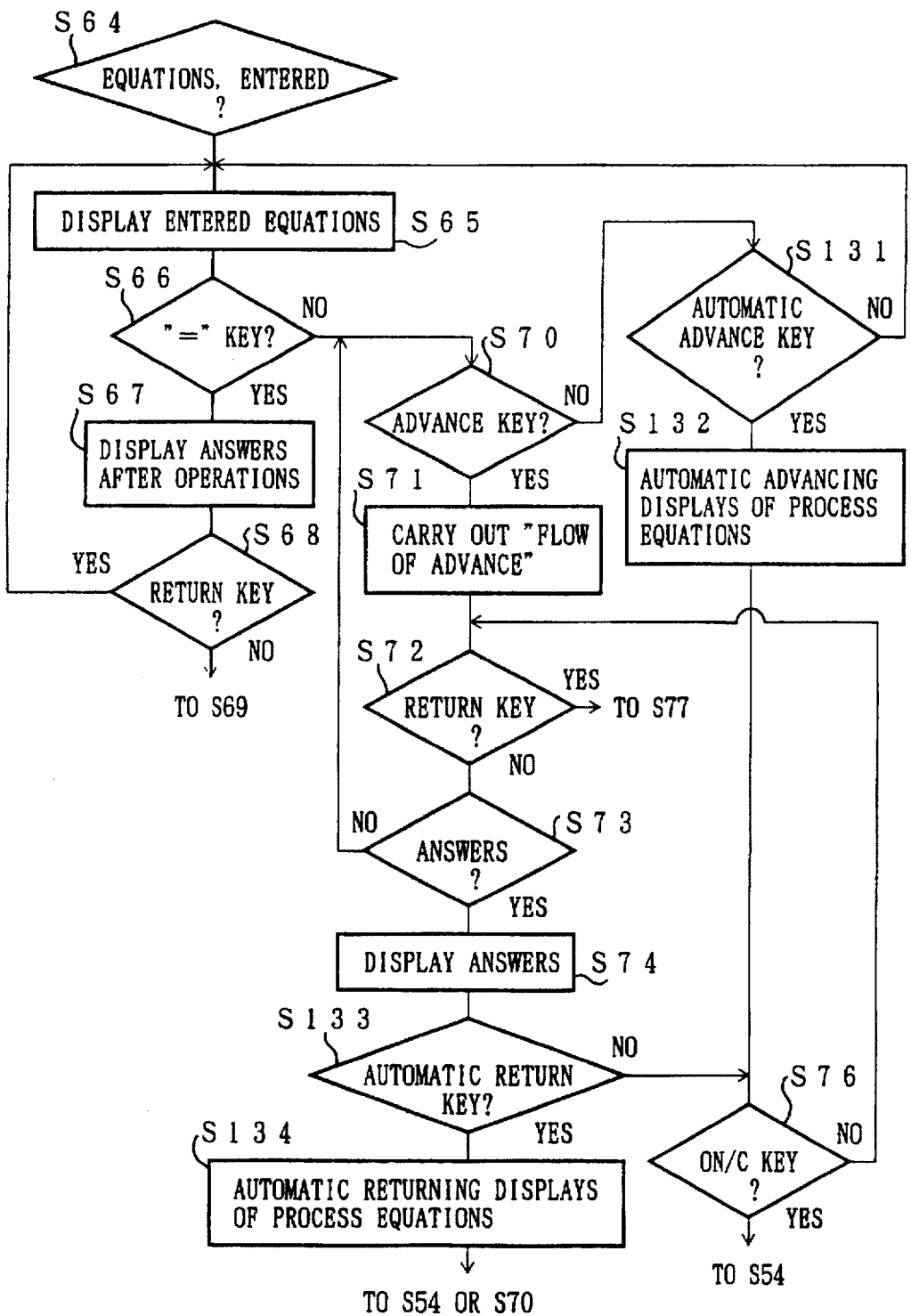
FIG. 22 is a flow chart that shows a sequence of controlling processes for successively displaying process equations with predetermined time intervals.

Referring to FIG. 22 and FIGS. 23(a) and 23(b), the following description will discuss another embodiment of the present invention. Here, for convenience of explanation, those members that have the same functions and that are described in Embodiment 1 With reference to its drawings are indicated by the same reference numerals and the description thereof is omitted.

In Embodiment 1, the explanation has been given on a case where the advance key 3f is repeatedly depressed so as to display process equations successively. However, the present invention is not intended to be limited to this arrangement; another arrangement may be proposed, wherein respective process equations are successively displayed on the liquid-crystal display screen 2 with predetermined intervals by merely giving the instruction once. In this arrangement, the contents of the display may be scrolled on the liquid-crystal display screen 2.

For this arrangement, an automatic advance key, which gives the instruction that process equations be automatically displayed beginning from the original equations to the answers, and an automatic return key, which gives the instruction that process equations be automatically displayed beginning from the answers to the original equations, may be newly added to the group of function keys 3. Instead, one of the group of function keys 3 may be designed as a function-expanding key 3m, and the instructions for the respective automatic sequential displays are entered by depressing the function-expanding key 3m and the advance key 3f, or the return key 3g, at the same time.

The sequence of the controlling processes for the automatic sequential displays is achieved by partially modifying the sequence of the controlling processes for specifying the problem-solving method that has been explained by reference to FIG. 7. In FIG. 22, controlling processes of S64 through 68, S70 through S74, and S76 have already been explained.

After the original equations have been displayed at S65, the sequence proceeds to S131 through S66 and S70, and when the instruction for the automatic-advancing display is entered at S131, the automatic-advancing display of process equations is carried out until the answers are displayed at S132. After the process at S132, the sequence may be returned to S72 through S76, or may be returned to S54 in response to the depression of the "ON/C" key at S76. If the sequence returns to S54, the instruction for the problem-solving method may be changed. Further, the processes may be modified so that, if the "ON/C" key is depressed during the process at S132, the process is interrupted and the sequence returns to S54.

If the instruction for the automatic-returning display is entered at S133 with the answers currently being displayed at S74, the automatic-returning display is carried out until the original equations are displayed at S134. After the process of S134, the sequence may be returned to S70, or may be returned to S54. In the case of returning the sequence to S70, the user is allowed to review the process equations that have been carried out to reach the answers one by one again by entering through the advance key 3f, and also to confirm the process equations through the automatic-advancing display by entering through the automatic advance key.

Additionally, in the automatic sequential display, the time during which one process equation is displayed may be predeterminately set to, for example, 2 to 3 seconds in terms of the apparatus, or may be designed so that the user can freely set the display time depending on his learning ability.

In the case of the freely settable display time, when the automatic advance key or the automatic return key is depressed at S141 or S151 as shown in FIGS. 23(a) and 23(b), a message saying "Set scroll time" is displayed on the liquid-crystal display 2 at S142 or S152. When the scroll time (or the display time) is entered, for example, through the group of numeric-value keys 4 at S143 or S153, the corresponding automatic sequential display is carried out at S144 or S154.

As described above, in the electronic desktop calculator 1 of the present embodiment, the control means in the CPU 10 controls the writing of process equations to the process buffer 13d, the reading of process equations from the process buffer 13d and the operations in the operation means in the CPU 10 such that the process equations, each obtained through each step-wise transformation, can be successively displayed with predetermined time intervals.

In the above-mentioned arrangement, when all the process equations starting from the equations to reach the answers are stored in the process buffer 13d, the control means controls the reading of process equations from the process buffer 13d so that the process equations are successively displayed with predetermined time intervals. This sequential display may be provided in terms of either transformations proceeding from the equations to the answers, or transformations returning from the answers back to the equations. Further, if the above-mentioned sequential display is carried out in the case when no process equations are stored in the process buffer 13d, the control means in the CPU 10 controls the writing of process equations to the process buffer 13d, the reading of process equations from the process buffer 13d and the operations in the operation means such that process equations, which are to be formed, can be successively displayed with predetermined time intervals.

Moreover, in the case when the electronic desktop calculator 1 of the present embodiment is provided with the counting buffer 13a, even if a process equation, which is to be displayed, has been cleared from the process buffer 13d due to an insufficient storage capacity of the process buffer 13d, it is possible to form the desired process equation again by transforming the equations as many times as the recognized number of transformations. Therefore, the control means controls the writing of process equations to the process buffer 13d, the reading of process equations from the process buffer 13d and the operations in the operation means such that the respective process equations can be successively displayed with predetermined time intervals.

Consequently, this arrangement eliminates the necessity for the user to enter through the advance key 3f or the return key 3g one by one when he wants to confirm the operation processes, thereby making the apparatus more convenient when the user wants to review the whole operation processes in a brief manner. Further, the installation of the counting buffer 13a allows the above-mentioned effects to be obtainable in the same manner even if the storage capacity of the process buffer 13d is small.

[EMBODIMENT 3]

Figure 25:
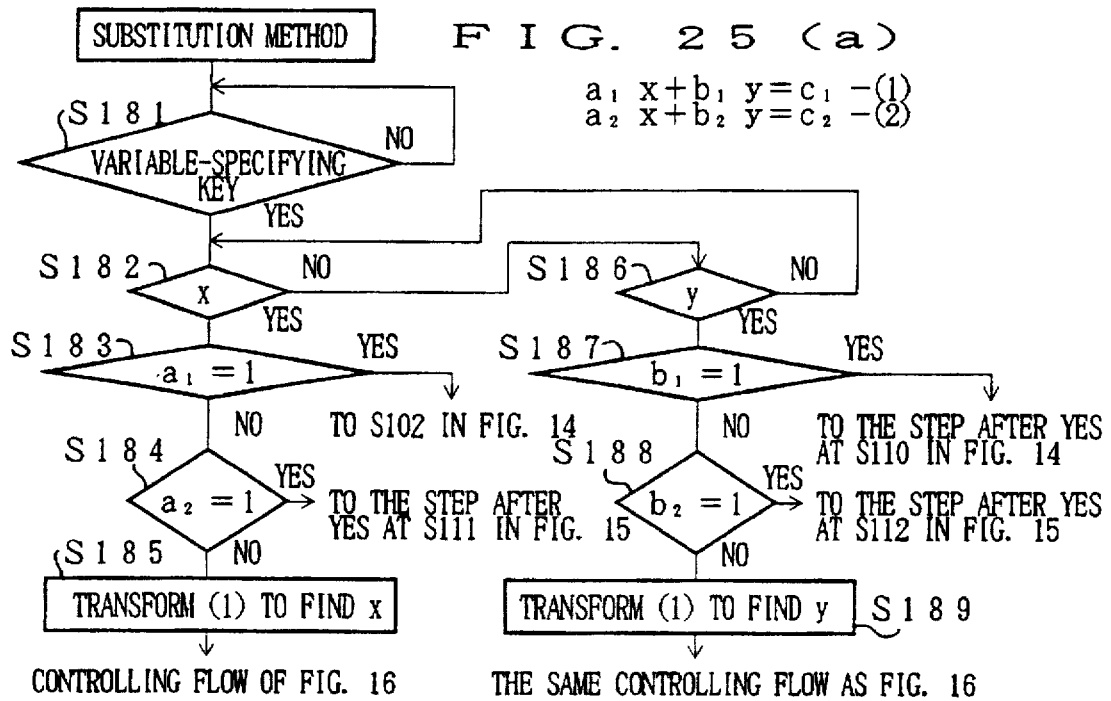
FIG. 25(a) and FIG. 25(b) are flow charts, each of which shows a sequence of controlling processes which, when the substitution method (or the equivalence method) has been specified as the problem-solving method, allows the user to specify a variable whose answer is to be preferentially found and which makes a check to find the conditions with which the equations are transformed in the simplest manner with respect to the specified variable.
Figure 25:
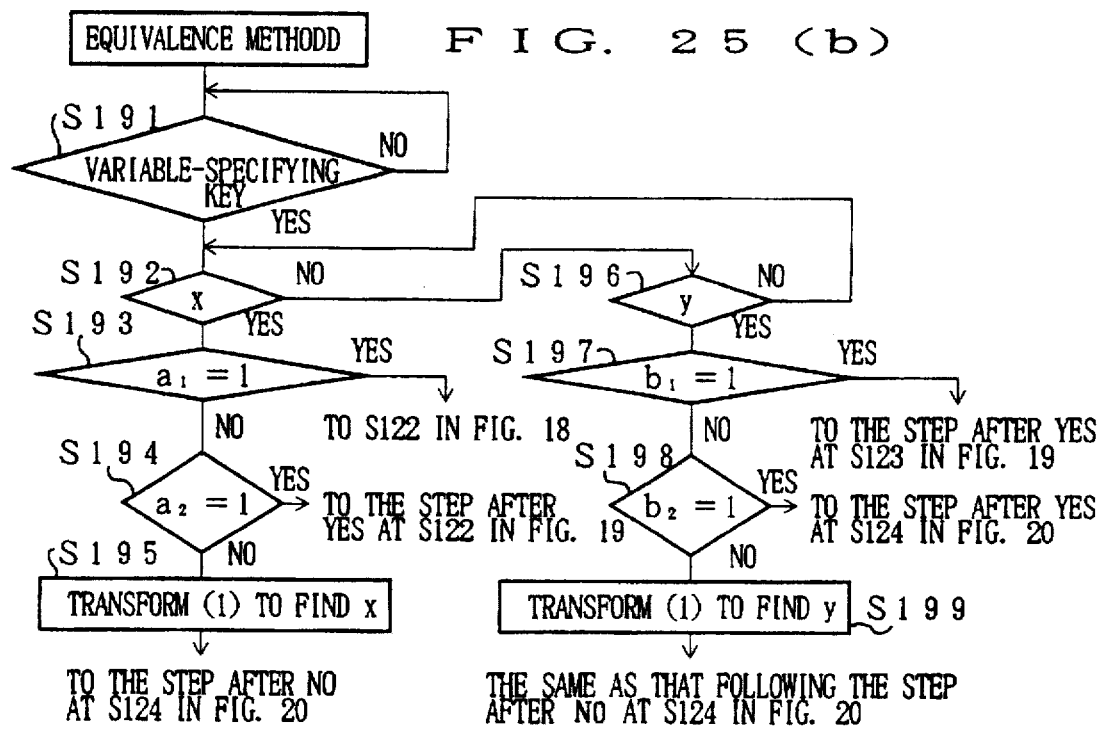

Referring to FIGS. 24(a) and 24(b) as well as FIGS. 25(a) and 25(b), the following description will discuss another embodiment of the present invention. Here, for convenience of explanation, those members that have the same functions and that are described in Embodiment 1 with reference to its drawings are indicated by the same reference numerals and the description thereof is omitted.

In Embodiment 1, as for the sequence of controlling processes for displaying process equations in accordance with the respective problem-solving methods, the explanation has been given on an example where the conditions with which the equations can be transformed in the simplest manner are automatically found. However, the present invention is not intended to be limited to this arrangement; another arrangement may be proposed, wherein the user can select and learn another problem-solving method. For example, the arrangement may be designed so that the user is allowed to specify which answer to be first found, the answer of x or that of y. This arrangement makes it possible for the user to learn another problem-solving method in addition to the method for providing the simplest transformation, thereby improving the understanding of problem-solving methods.

For this arrangement, a variable-specifying key may be newly added to the group of function keys 3, or the function-expanding key 3m and the x-key 3c, or the y-key 3d, may be depressed at the same time. For the sequence of the controlling processes for the arrangement, after entering equations, the instruction for specifying the variable is entered at S171 as shown in FIG. 24(b), and if the x-key 3c is depressed at S172, the sequence proceeds to S161, which will be described later, and the controlling processes for finding the answer of x beforehand are carried out. Further, the instruction for specifying the variable is entered at S171, and if the y-key 3d is depressed at S173, the sequence proceeds to S174 and the controlling processes for dealing with the coefficients $b_1$ and $b_2$, that is, the controlling processes for finding the answer of y beforehand are carried out.

Figure 11:
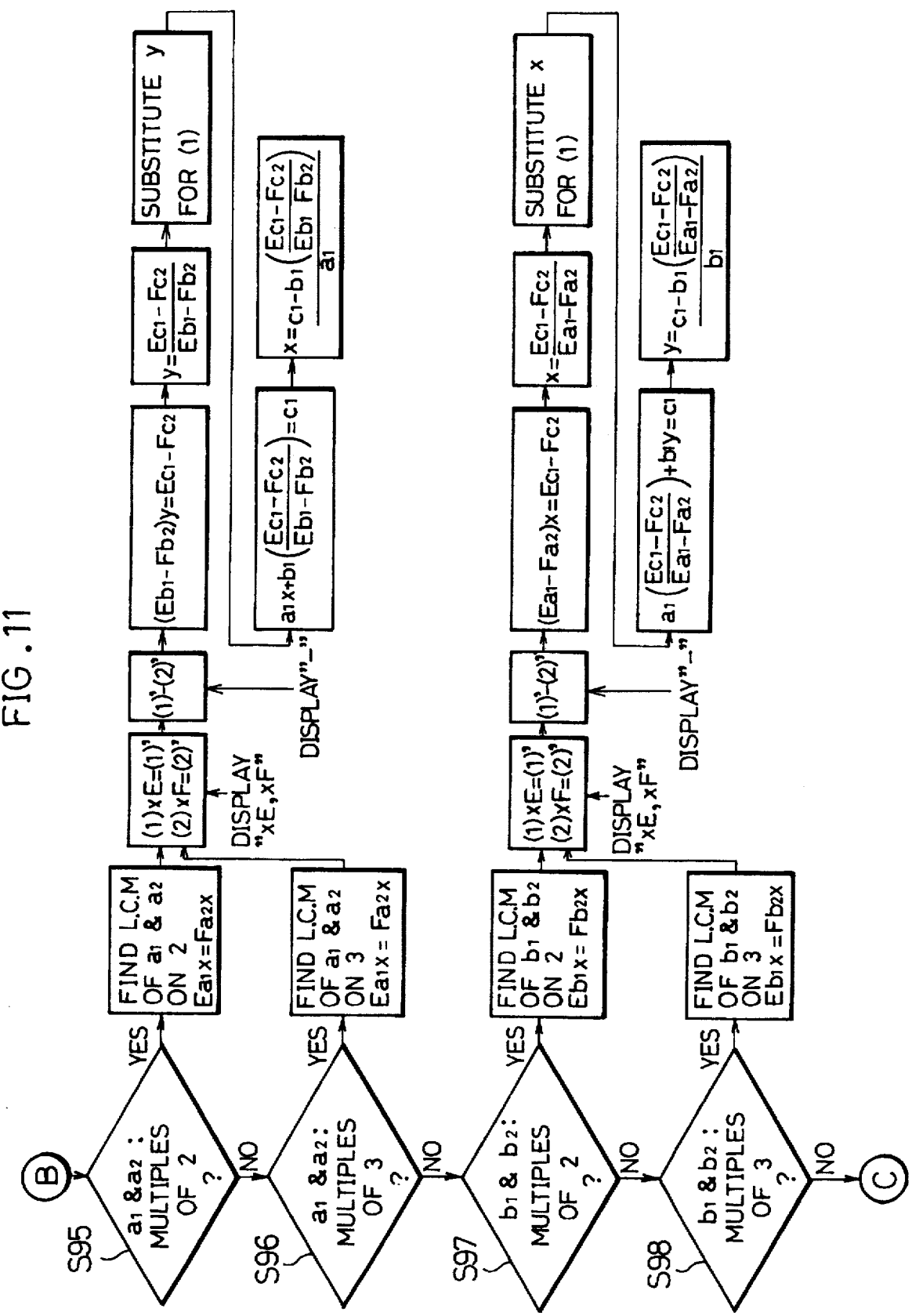
FIG. 11 is a flow chart showing the last part of a sequence of controlling processes that follows the sequence of controlling processes shown in FIG. 10.

For example, in the case of controlling processes for finding the answer of x beforehand by the using the addition and subtraction method, as shown in FIG. 24(a), judgements are successively made as to whether or not the coefficients $a_1$ and $a_2$ of x are equal to each other (S161; in the same manner as S81 in FIG. 9), as to whether or not the coefficient $a_1$ is an integral multiple of $a_2$ (S162; in the same manner as S83 in FIG. 9), as to whether or not both $a_1$ and $a_2$ are multiples of 2 (S163; in the same manner as S95 in FIG. 11), and as to whether or not both $a_1$ and $a_2$ are multiples of 3 (S164; in the same manner as S96 in FIG. 11). If the entered equations are fit to any of the steps S161 through S164, this means that the condition with which the simplest transformations can be made so as to find the answer of x by using the addition and subtraction method has already been found, and the processes, explained by reference to FIGS. 9 through 11, are carried out. Further, if the entered equations are not fit to any of the steps S161 through S164, the processes, described in YES of S99 and thereafter in FIG. 12, are carried out.

Figure 16:
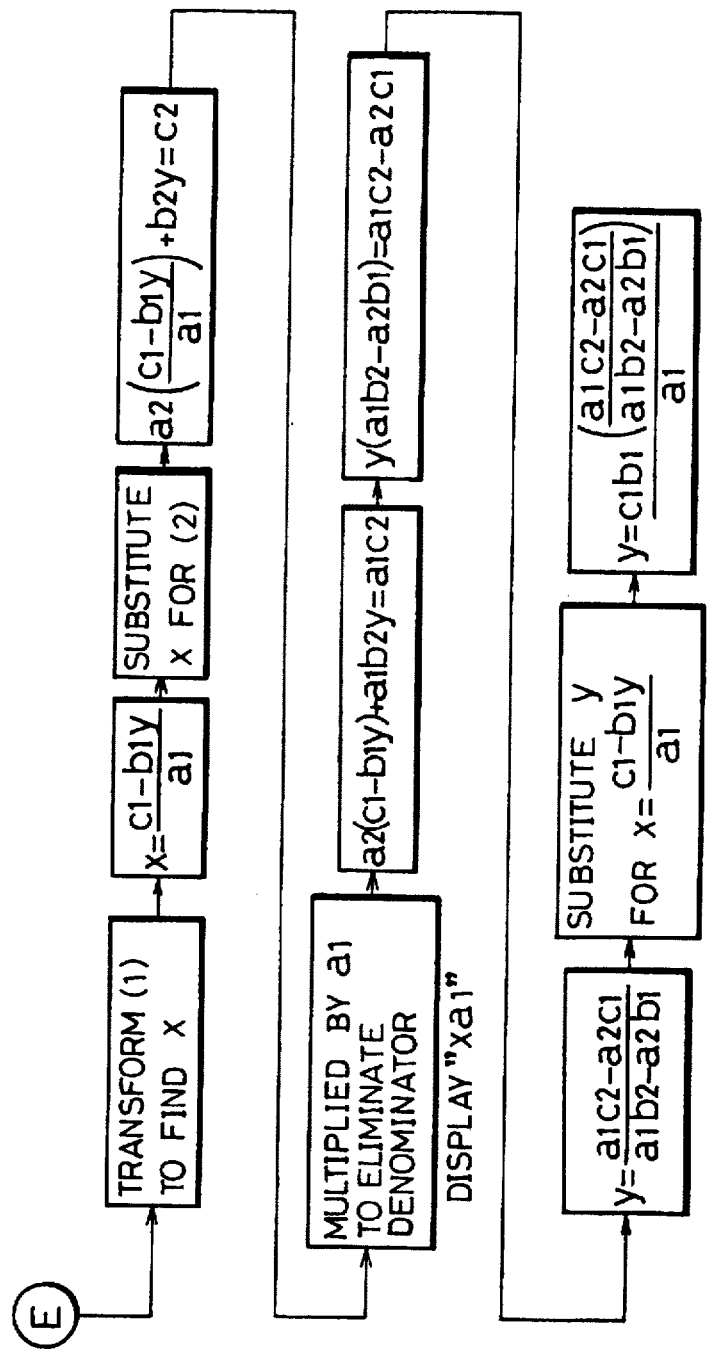
FIG. 16 is a flow chart showing the last part of a sequence of controlling processes that follows the sequence of controlling processes shown in FIG. 15.

For example, as shown in FIG. 25(a), in the case of controlling processes for finding the answer of x beforehand by using the substitution method, the instruction for specifying the variable is entered at S181, and when the x-key 3c is depressed at S182, judgements are made as to whether or not the coefficient $a_1$ of x is 1 (S183; in the same manner as S101 in FIG. 14) and as to whether or not the coefficient $a_2$ of x is 1 (S184; in the same manner as S111 in FIG. 15). If at least one of the entered equations is fit to either S183 or S184, this means that the condition with which the simplest transformations can be made so as to find the answer of x by using the substitution method, and the respective processes, which have been described with reference to FIG. 14 and FIG. 15, are carried out. Further, if none of the entered equations is fit to either S183 or S184, the sequence proceeds to S185, and the controlling processes, which have been described with reference to FIG. 16, are carried out.

Meanwhile, the instruction for specifying the variable is entered at S181, and when the y-key 3d is depressed at S186, judgements are made as to whether or not the coefficient $b_1$ of y is 1 (S187; in the same manner as S110 in FIG. 14) and as to whether or not the coefficient $b_2$ of y is 1 (S188; in the same manner as S112 in FIG. 15). If at least one of the entered equations is fit to either S187 or S188, this means that the condition with which the simplest transformations can be made so as to find the answer of y by using the substitution method, and the respective processes, which have been described with reference to FIG. 14 and FIG. 15, are carried out. Further, if none of the entered equations is fit to either S187 or S188, the sequence proceeds to S189, and the controlling processes, which have been described with reference to FIG. 16, are carried out.

Moreover, for example, as shown in FIG. 25(b), in the case of controlling processes for finding the answer of x beforehand by using the equivalence method, the instruction for specifying the variable is entered at S191, and when the x-key 3c is depressed at S192, judgements are made as to whether or not the coefficient $a_1$ of x is 1 (S193; in the same manner as S121 in FIG. 18) and as to whether or not the coefficient as of x is 1 (S194; in the same manner as S122 in FIG. 19). If at least one of the entered equations is fit to either S193 or S194, this means that the condition with which the simplest transformations can be made so as to find the answer of x by using the equivalence method, and the respective processes, which have been described with reference to FIG. 18 and FIG. 19, are carried out. Further, if none of the entered equations is fit to either S193 or S194, the sequence proceeds to S195, and the controlling processes following the step "NO" at S124, which have been described with reference to FIG. 20, are carried out.

Meanwhile, the instruction for specifying the variable is entered at S191, and when the y-key 3d is depressed at S196, judgements are made as to whether or not the coefficient $b_1$ of y is 1 (S197; in the same manner as S123 in FIG. 19) and as to whether or not the coefficient $b_2$ of y is 1 (S198; in the same manner as S124 in FIG. 20). If at least one of the entered equations is fit to either S197 or S198, this means that the condition with which the simplest transformations can be made so as to find the answer of y by using the equivalence method, and the respective processes, which have been described with reference to FIG. 19 and FIG. 20, are carried out. Further, if none of the entered equations is fit to either S197 or S198, the sequence proceeds to S199, and the controlling processes following the step "NO" at S124, which have been described with reference to FIG. 20, are carried out.

As described above, the electronic desktop calculator 1 of the present embodiment is provided with the variable-specifying key for entering an instruction that specifies a variable among a plurality of variables contained in the entered equations so that process equations are preferentially formed with respect to the variable and the corresponding displays are made. The control means in the CPU 10 finds the conditions with which the equations are transformed in the simplest manner by reference to the contents of storage of the numeric-value buffer 13e, and controls the operations of the operation means in the CPU 10 based on the resulting conditions thus found.

In accordance with the above-mentioned arrangement, the user can specify the variable on which process equations are preferentially formed and the corresponding displays are made, by the use of the variable-specifying key. The arrangement of Embodiment 1 only provides process equations to be displayed that satisfy the conditions with which the equations are transformed in the simplest manner, and has nothing to do with the variables. Since the sequence of operation processes to be displayed is limited to one way, the user cannot learn another problem-solving method. However, the arrangement of the present embodiment makes it possible to select any variable and to display the corresponding operation processes. This provides a plurality of ways of learning, and it becomes possible to provide educational equipment that has better effects of learning than the arrangement of Embodiment 1.

[EMBODIMENT 4]

Referring to FIGS. 27 through 50, the following description will discuss another embodiment of the present invention. Here, for convenience of explanation, those members that have the same functions and that are described in the aforementioned embodiments with reference to their drawings are indicated by the same reference numerals and the description thereof is omitted.

(1) Appearance of the electronic desktop calculator

Figure 27:
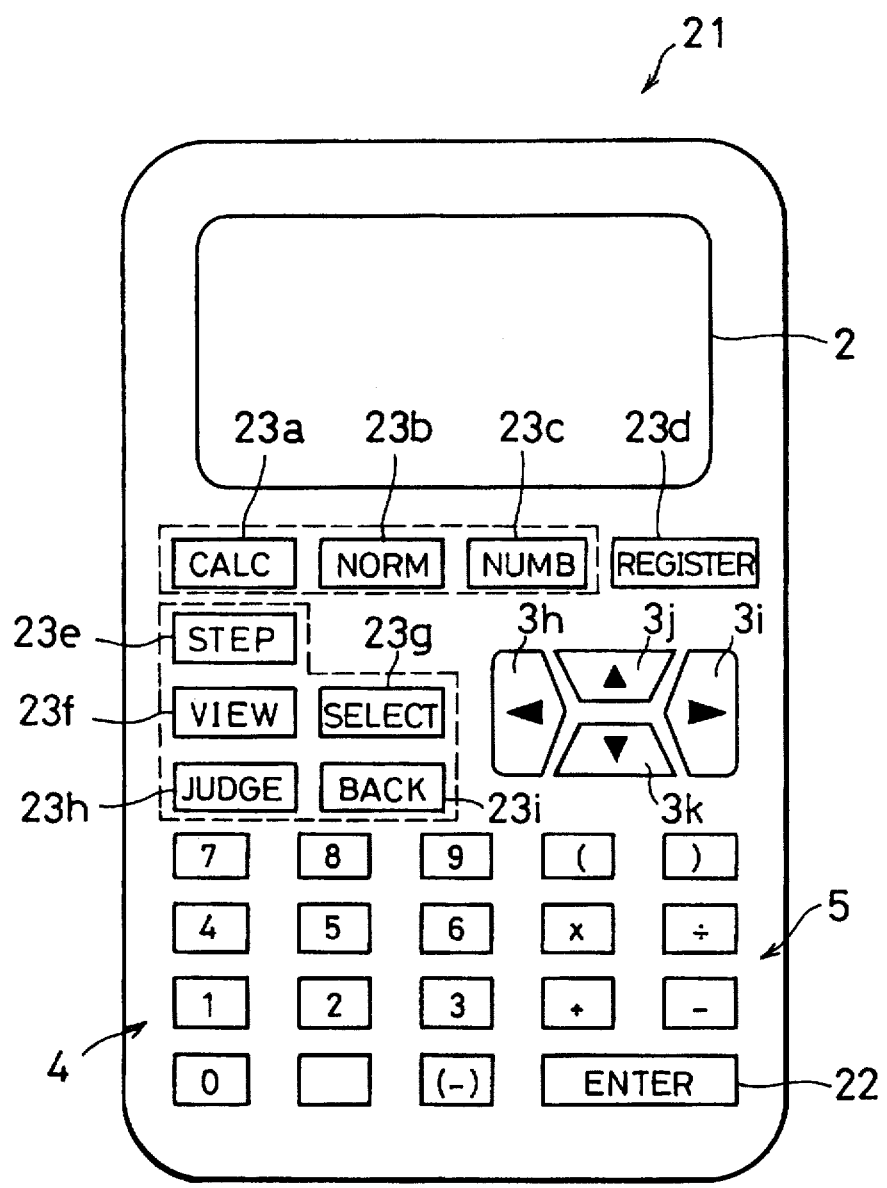
FIG. 27 is a schematic plan view that shows an appearance of an electronic desktop calculator in accordance with another embodiment of the present invention.

An electronic desktop calculator 21 of the present invention, which is shown in FIG. 27 in its appearance, is provided with a liquid-crystal display screen 2, a group of numeric value keys 4, and a group of operation keys 5 for the basic four calculations, all of which have the same functions as those described in Embodiment 1. In other words, the liquid-crystal display screen 2 displays the processes and the results of operations and other items. Figures, operators and other factors, which are used for carrying out operations, are entered through the group of numeric value keys 4 and the group of operation keys 5 for the basic four calculations.

The electronic desktop calculator 21 is further provided with a group of mode keys, a group of function keys, a register key 23d, and a group of cursor keys.

The group of mode keys, which are used for setting modes, include CALC key 23a, NORM key 23b and NUMB key 23c. CALC key 23a specifies modes in which normal calculations are carried out and an expressions is entered. Each time an operator of the entered expression is specified independently, NORM key 23b specifies a mode in which operations with respect to the operator are carried out. NUMB key 23c specifies a mode in which operations are carried out in the order of numbers that are allocated to the operators in the entered expression.

The group of function keys, which include the features of the present invention, consist of STEP key 23e, VIEW key 23f, SELECT key 23g, JUDGE key 23h, and BACK key 23i. In expressions including a plurality of operators, STEP key 23e, in the NORM mode, is used for carrying out calculations with respect to each operator in accordance with the order of preference, while STEP key 23e, in the NUMB mode, is used for allocating numbers to the operators one by one. Further, in expressions including a plurality of operators, VIEW key 23f, in the NORM mode, is used for displaying in a listed form the processes and the results of calculations that have been carried out in accordance with the order of preference, while VIEW key 23f, in the NUMB mode, is used for displaying in an entirely listed form all the operators, each having a number indicating the order of preference. SELECT key 23g is used for specifying an operator on which the user wants to carry out calculations. JUDGE key 23h is used for judging whether or not the order of calculations that the user has specified is correct, and for displaying the results of the judgement. BACK key 23i is used for displaying an erroneous portion when the user has erred in specifying the order of calculations.

The register key 23d is used for specifying a desired expression to be processed so that it is registered. ENTER key 22 is used for terminating calculations, and for making decisions as to various processes. The group of cursor keys are used for shifting a cursor on the liquid-crystal display screen 2, and include a left shift key 3h, a right shift key 3i, an upward shift key 3j, and a downward shift key 3k, in the same manner as described in Embodiment 1.

Additionally, NORM key 23b, or NUMB key 23c, and SELECT key 23g correspond to order-specifying keys, which are described in claim 13. Further, JUDGE key 23h corresponds to an error-specifying key, which is described in claim 17, and BACK key 23i corresponds a to re-specifying key, which is described in claim 18.

(2) Arrangements of control system

Figure 28:
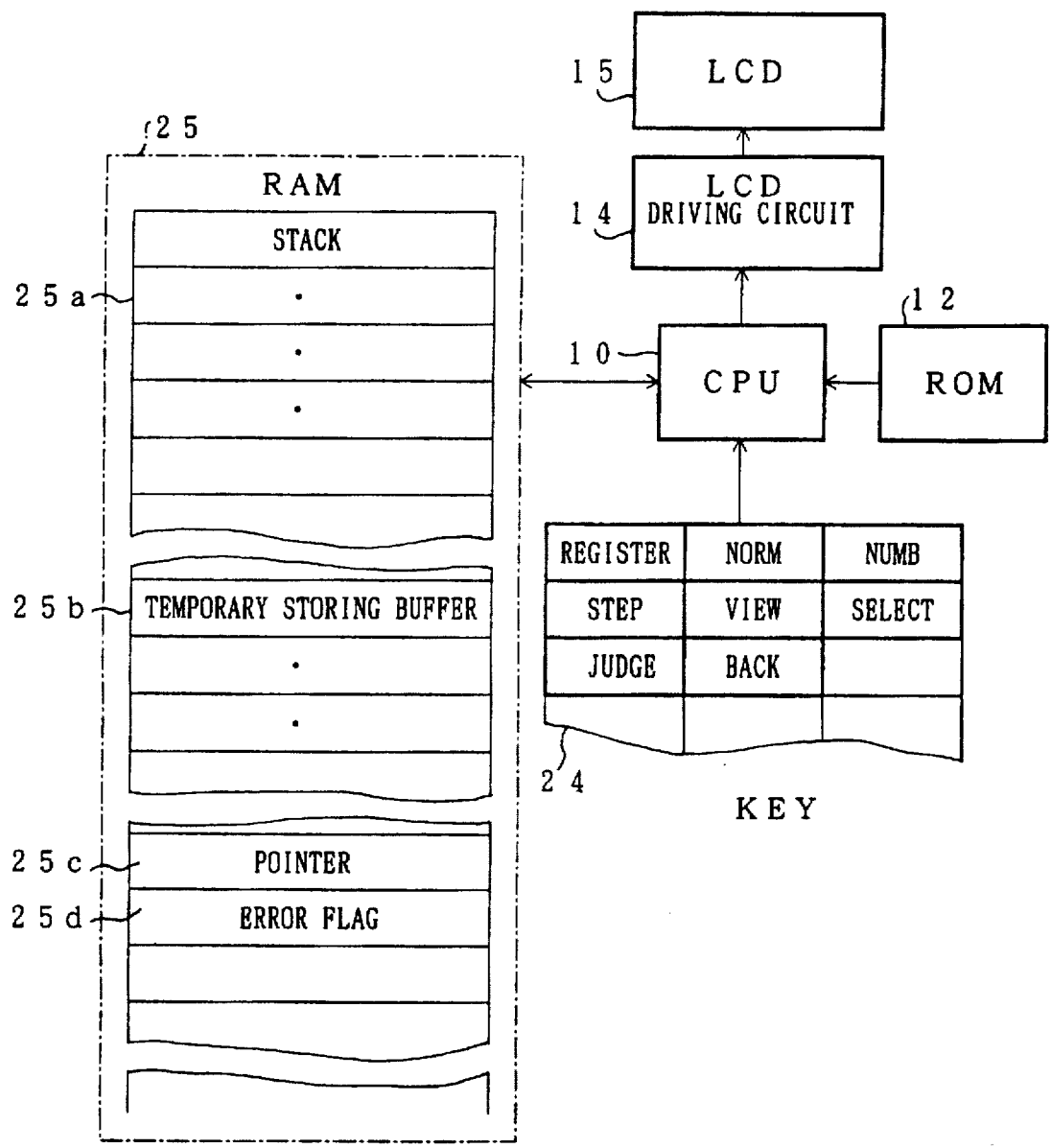
FIG. 28 is a block diagram showing main parts of a control system in the electronic desktop calculator.

As shown in the schematic block diagram of FIG. 28, the control system of the electronic desktop calculator 21 is constituted of a CPU 10, a ROM 12, an LCD driving circuit 14 and an LCD 15, which are the same as those of Embodiment 1, as well as a group of keys 24 and a RAM 25, which are provided in place of the group of keys 11 and the RAM 13 in Embodiment 1.

The CPU 10 (operation means, comparison means, and judging means) carries out controlling processes, such as reading processes of key entries, various operation processes, and displaying processes for inputted information and results of various operations. The ROM 12 stores programs that are used for carrying out the controlling processes, such as reading processes of key entries, various operation processes, and displaying processes for inputted information and results of various operations. Further, the LCD 15 (display means) displays inputted information and results of various operations. The LCD driving circuit 14 carries out controlling processes for displaying display information, given from the CPU 10, on the LCD 15.

The group of keys 24 of the present embodiment are constituted of the group of various keys shown in the aforementioned FIG. 27, through which information is entered so as to carry out various operation processes. The RAM 25 stores information entered through keys, information derived from various operation processes, and information used for carrying out and controlling displays of the entered information and the results of the various operations, as well as storing numeric values as a memory. The RAM 25 is provided with a stack 25a, a temporary storing buffer 25b, a pointer 25c, and an error flag 25d. The stack 25a (operator-registering means) is a memory for storing the operators individually after having allocated to them respective orders of preference. In the present embodiment, the order of preference in the stack 25a increases successively from the first area toward the last area. The temporary storing buffer 25b (temporary storing means) is a memory for storing necessary information temporarily. The pointer 25c is a memory for storing values that indicate addresses. The error flag 25d is a flag for indicating an error in a calculation.

(3) Processes in which the register key is used

Figure 29:
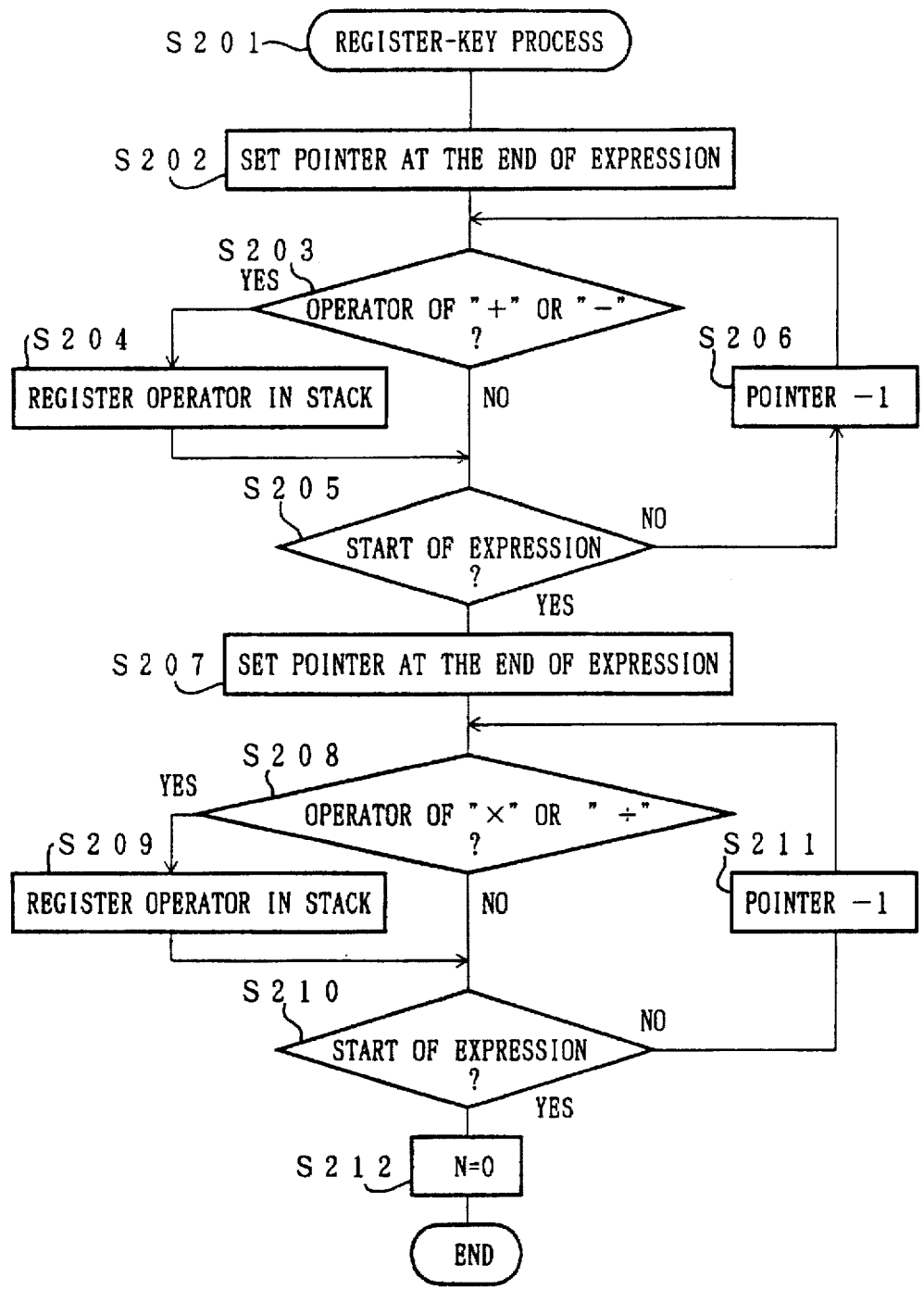
FIG. 29 is a flow chart that shows controlling processes of a register key for registering operators.

In the above-mentioned arrangement, an explanation will be given on processes for registering an entered expression. As shown in FIG. 29, when the register key 23d is depressed (S201) after entering an expression, the pointer 25c is set to the last position of the expression (S202). Then, a judgement is made as to whether the place indicated by the pointer 25c is an operator "+" or "−" (S203). If the operator is "+" or "−" at S203, the operator is registered in the stack 25a (S204), and the sequence proceeds to S205. In contrast, if the operator is neither "+" nor "−" at S203, the sequence proceeds to S205, as it is. At 205, a judgement is made as to whether or not the pointer 25c is located at the leading position of the expression, and if the pointer 25c is not located at the leading position, the pointer 25c is returned by one (S206), and the sequence returns to S203. If the pointer 25c is located at the leading position at S205, the pointer 25c is again set to the last position of the expression (S207), and the sequence proceeds to S208.

Next, a judgement is made as to whether the place indicated by the pointer 25c is an operator "×" or "+" (S208). If the operator is "×" or "+" at S208, the operator is registered in the stack 25a (S209), and the sequence proceeds to S210. In contrast, if the operator is neither "×" nor "+" at S208, the sequence proceeds to S210, as it is. At S210, a judgement is made as to whether or not the pointer 25c is located at the leading position of the expression, and if the pointer 25c is not located at the leading position, the pointer 25c is returned by one (S211), and the sequence returns to S207. If the pointer 25c is located at the leading position at S210, the value of N, which is used in a process for allocating numbers, is set to 0 (S212), and the sequence of the processes is completed.

(4) Processes in which the group of function keys are used

Figure 30:
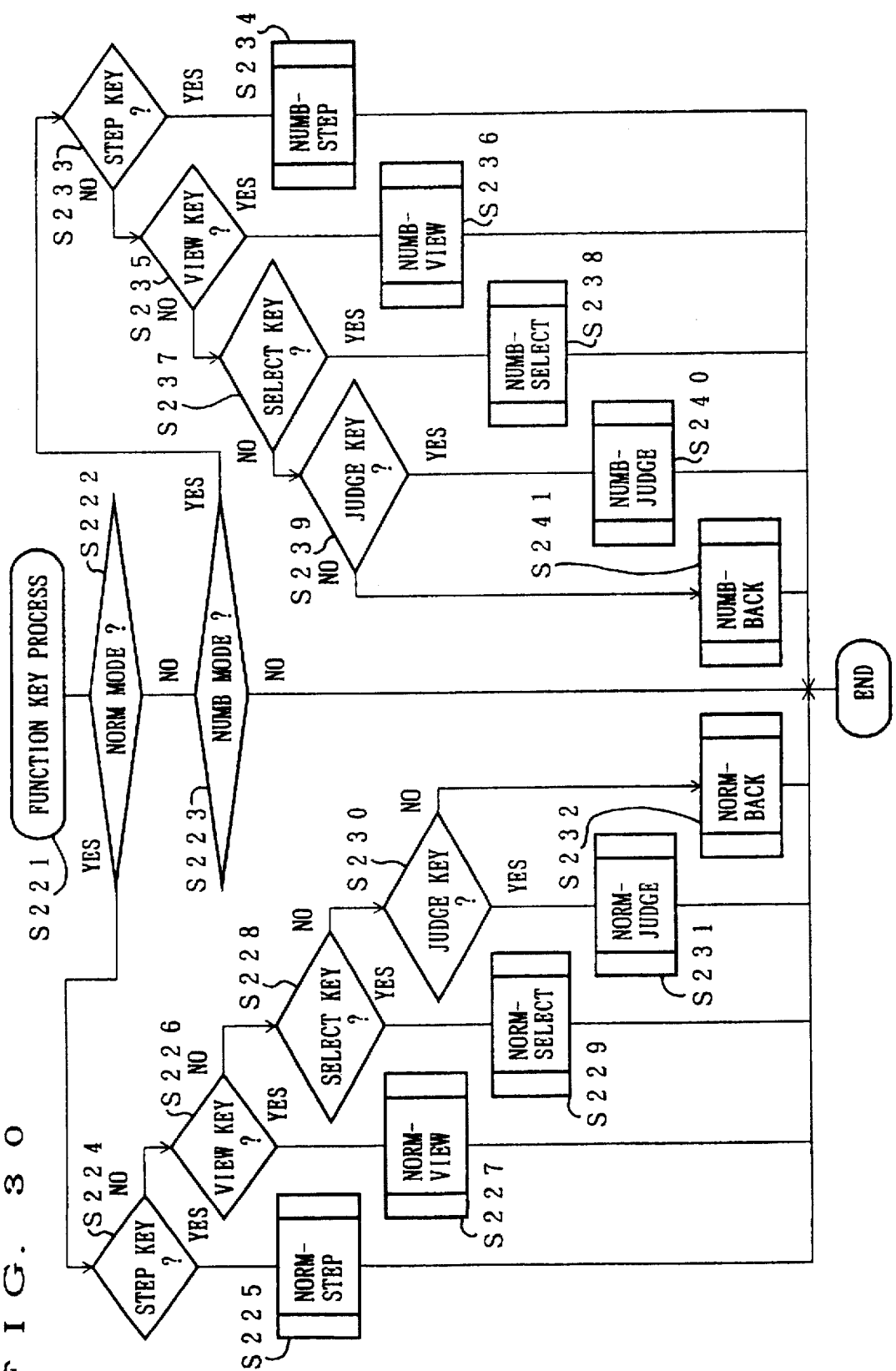
FIG. 30 is a flow chart that shows controlling processes of function keys.

As shown in FIG. 30, when one of the group of function keys is depressed (S221), a judgement is made as to whether or not the NORM mode is on (S222), and if the NORM mode is not on, the sequence proceeds to S223. Further, a judgement is made as to whether or not the NUMB mode is on at S223, and if the NUMB mode is not on, the mode is identified as the CALC mode, and the processes are completed.

In contrast, if the NORM mode is on at S222, a judgement is made as to whether or not STEP key 23e has been successively depressed (S224). If STEP key 23e has been depressed at S224, a NORM-STEP process is carried out (S225).

Figure 31:
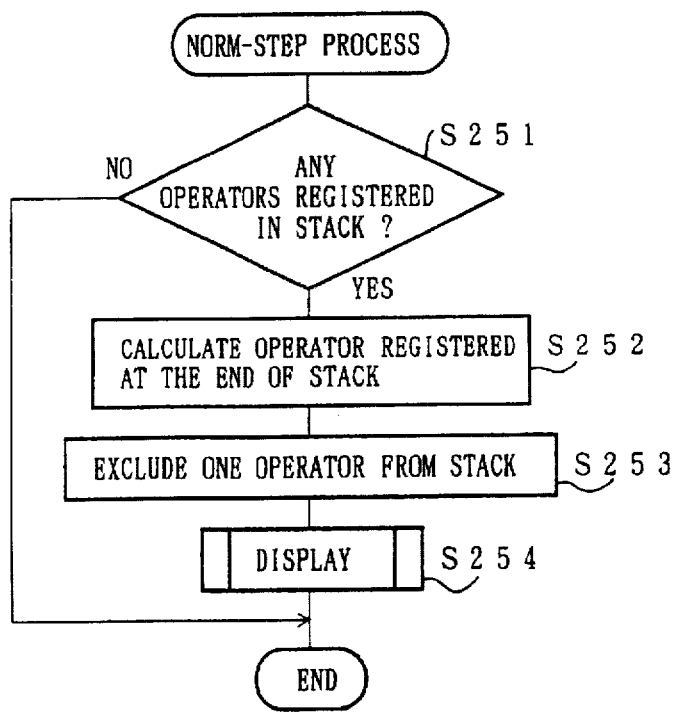
FIG. 31 is a flow chart that shows processes which are taken when STEP key is depressed in the NORM mode.

Referring to a flow chart in FIG. 31, an explanation will be given on the NORM-STEP process. The NORM-STEP process is a process in which each time STEP key 23e is depressed, a calculation is carried out with respect to one operator after another in accordance with the order of preference, and the expression (hereinafter, referred to as process expression) and the result of the calculation are displayed each time calculation has been carried out with respect to each operator.

At S251, a judgement is made as to whether or not any operator has been registered in the stack 25a, and if no operator has been registered, the process is completed. In contrast, if any operator is registered, a calculation is carried out with respect to the operator that was registered lastly in the stack 25a (S252). The operator, which has been subjected to the calculation, is excluded from the stack 25a (S253), and the process expression and the result of the calculation are displayed (S254), and then the process is completed.

FIG. 41 shows one example of storage states of the stack 25a and the corresponding displays on the screen during the NORM-STEP process. There is an expression displayed on the screen in j1. Here, operators are stored in the stack 25a in accordance with the order of calculations. For example, let us suppose that the operators are stored in the order, "−", "+", "+" and "×". When STEP key 23e is depressed, the operator "×" is brought from the last position of the stack 25a, and a multiplication is carried out, thereby displaying a resulting process expression having the multiplied portion (j2). Successively, when STEP key 23e is depressed, a division is carried out, and the resulting process expressions are displayed as shown in j3. When STEP KEY 23e is further depressed, an addition is carried out, and the resulting process expressions are displayed as shown in j4.

Next, when STEP key 23e is not depressed at S224 in FIG. 30, a judgement is made as to whether or not VIEW key 23f has been depressed (S226). If VIEW key 23f is depressed at S226, a NORM-VIEW process is carried out (S227).

Figure 32:
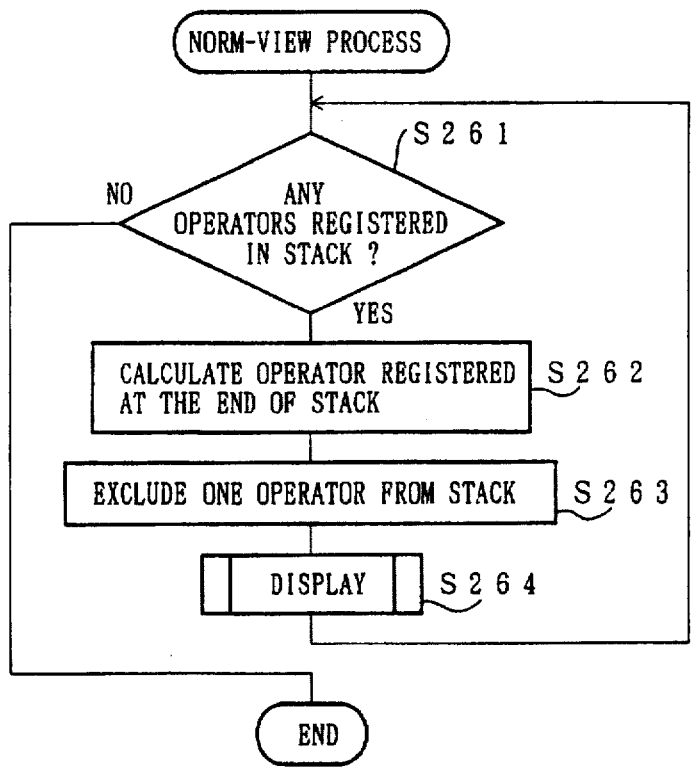
FIG. 32 is a flow chart that shows processes which are taken when VIEW key is depressed in the NORM mode.

Referring to a flow chart in FIG. 32, an explanation will be given on the NORM-VIEW process. The NORM-VIEW process is a process wherein calculations are automatically carried out in accordance with the order of preference, and the resulting process expressions and the results are displayed in a listed form.

At S261, a judgement is made as to whether or not any operator is registered in the stack 25a, and if no operator is registered, the process is completed. If any operator is registered, a calculation is carried out with respect to the operator that was lastly registered in the stack 25a (S262). Then, the operator, which has been subjected to the calculation, is excluded from the stack 25a (S263), and the resulting process expression is displayed (S264), and then the sequence returns to S261. The above-mentioned process is repeated until there is no operator left, and the process is completed when the final results of calculations are displayed.

Figure 42:
FIG. 42 is an explanatory drawing that shows storage states of stacks and the corresponding contents of display in the case when VIEW key is depressed in the NORM mode.

FIG. 42 shows one example of displays that are made during the NORM-VIEW process. An expression which has been entered is displayed in k1. When VIEW key 23f is depressed, process expressions and the result of the calculations are displayed all at once as shown in k2.

The above-mentioned NORM-STEP process and NORM-VIEW process have been known to the art.

Next, when VIEW key 23f is not depressed at S226 in FIG. 30, a judgement is made as to whether or not SELECT key 23g has been depressed (S228). If SELECT key 23g has been depressed at S228, a NORM-SELECT process is carried out (S229).

Figure 33:
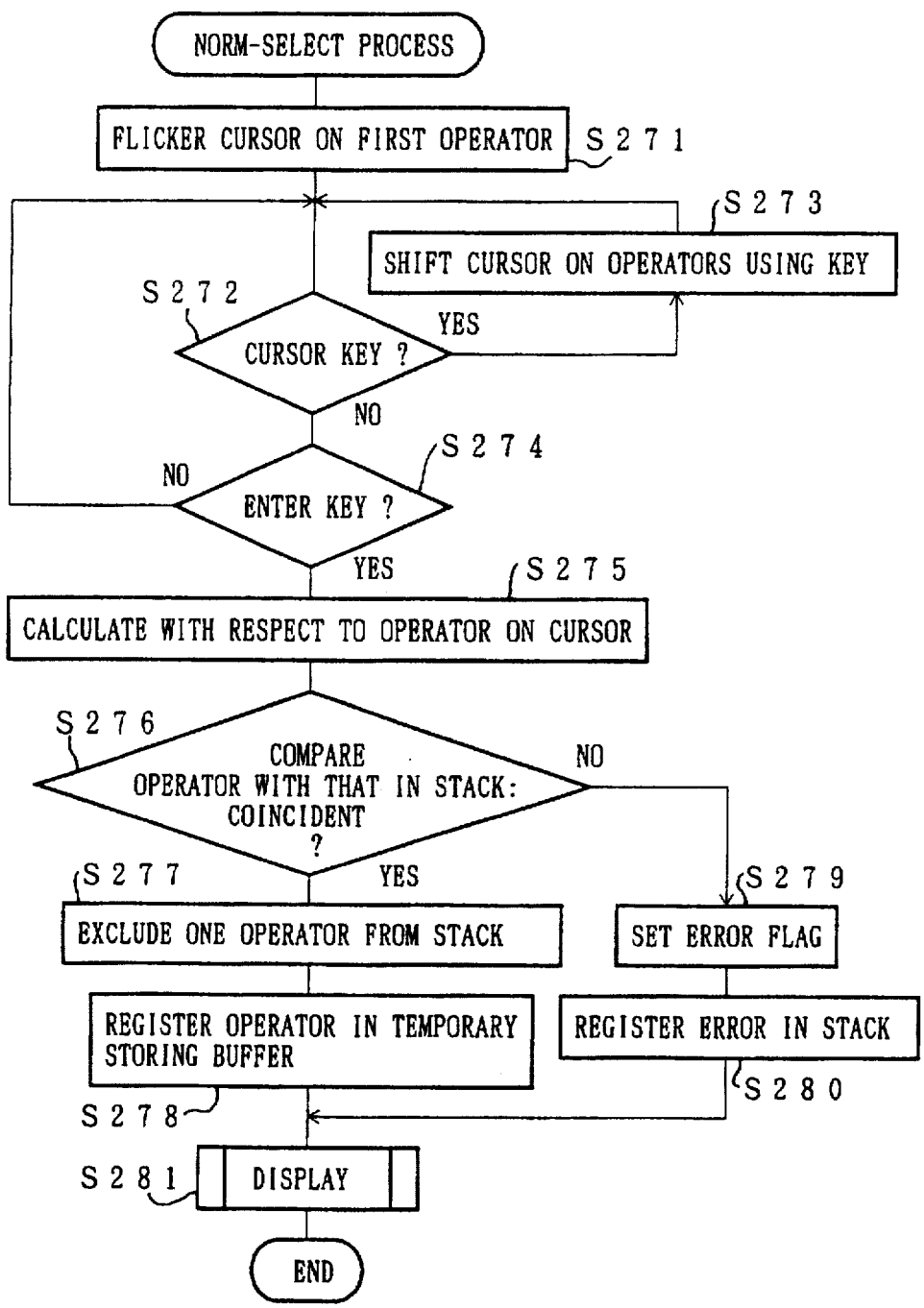
FIG. 33 is a flow chart that shows processes which are taken when SELECT key is depressed in the NORM mode.

Referring to a flow chart in FIG. 33, an explanation will be given on the NORM-SELECT process. The NORM-SELECT process is a process wherein a calculation is carried out with respect to an operator which has been selected by the user and the corresponding display is provided.

While the cursor is flickering on the first operator in an expression (S271), a judgement is made as to whether or not the cursor key has been depressed (S272). If the cursor key has been depressed, the cursor is shifted on the operators in accordance with the entry through the cursor key (S273), and the sequence returns to S272. If the cursor key is not depressed at S272, a judgement is made as to whether or not ENTER key 22 has been depressed (S274). If ENTER key 22 is not depressed, the sequence returns to S271. In contrast, if ENTER key 22 has been depressed, a calculation is carried out with respect to the operator on the cursor (S275).

A judgement is made as to whether or not the operator, which has been subjected to the calculation at S275, coincides with the operator that is registered at the last position in the stack 25a (S276). If the two operators coincide with each other, the operator is excluded from the stack 25a (S277), and the operator is registered in the temporary storing buffer 25b (S278). In contrast, if the two operators do not coincide with each other, the error flag 25d is set (S279), and "ERROR" is registered in the stack 25a (S280). After passing through S278 or S280, the corresponding display is provided on the screen (S281), and the process is completed.

Figure 43:
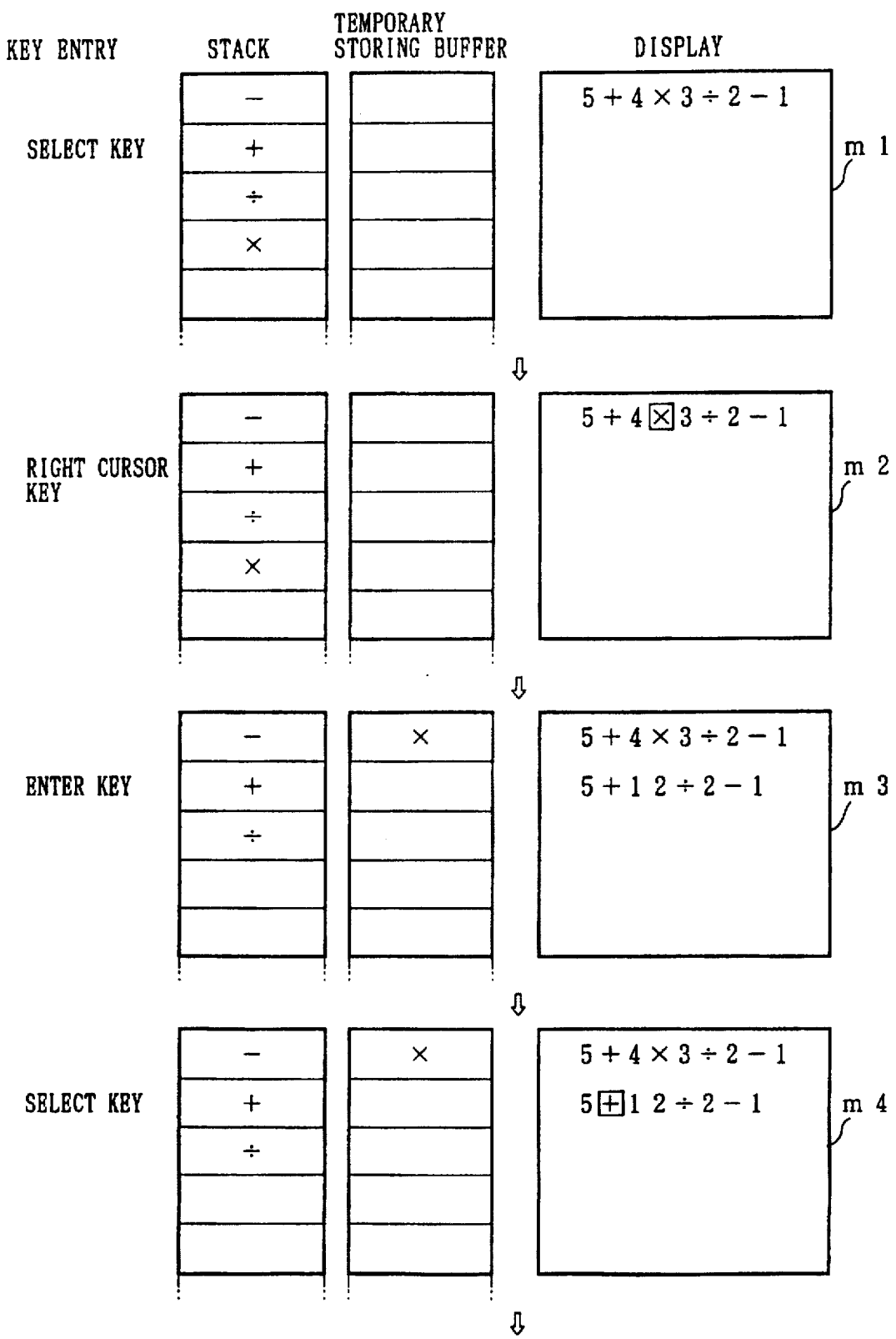
FIG. 43 is an explanatory drawing that shows storage states of stacks and temporary storing buffers, and the corresponding contents of display, in the case when calculations are made by using SELECT key, cursor keys, ENTER key and other keys in the NORM mode.
Figure 44:
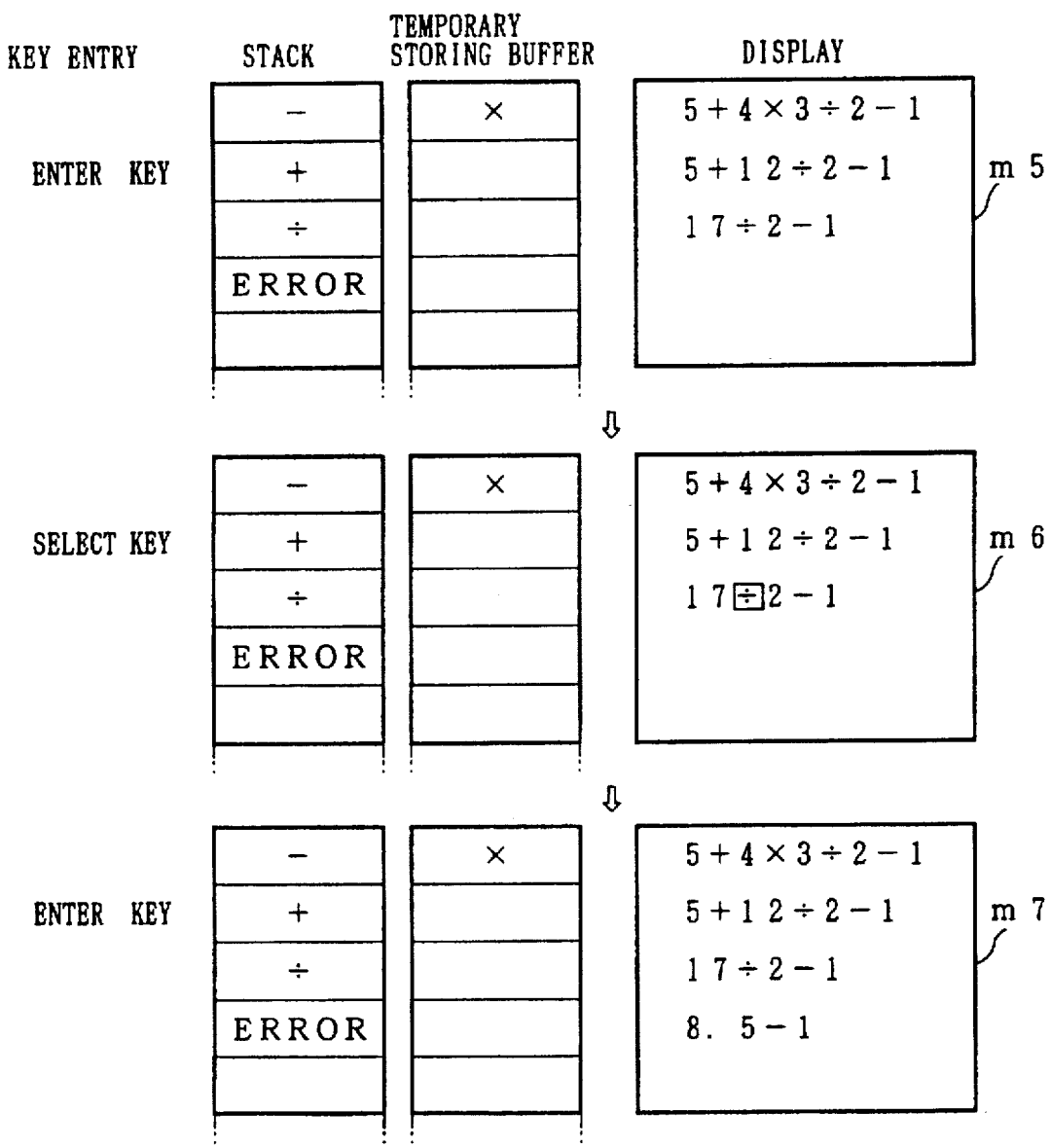
FIG. 44 is an explanatory drawing that shows storage states that follow the states explained by reference to FIG. 43.

FIGS. 43 and 44 show one example of storage states of the stack 25a and the temporary storing buffer 25b and the corresponding displays on the screen during the NORM-SELECT process. First, SELECT key 23g is depressed. Then, the operator "×" is specified by shifting the cursor onto the operator "×" through the cursor key with respect to an expression displayed in m1 (m2). Next, since, upon depression of ENTER key 22, it is recognized that the operator "×", specified by the cursor key, coincides with the operator "×" that is located at the last position in the stack 25a, the operator "×" is stored in the temporary buffer 25b from the stack 25a, and a display is provided as shown in m3.

Similarly, SELECT key 23g is depressed, the operator "+" is specified through the cursor key (m4), and ENTER key 22 is depressed. In this case, since the operator "+", specified by the cursor key, does not coincide with the operator "+" that is located at the last position in the stack 25a, "ERROR" is registered in the stack 25a, and a calculating process with respect to "+" is carried out, thereby providing the corresponding display (m5). Thereafter, calculations are carried out with respect to specified operators in the same manner, and the corresponding process expressions and the results of the calculations are displayed (m6 and m7).

Successively, if SELECT key 23g is not depressed at S228 in FIG. 30, a judgement is made as to whether or not JUDGE key 23h has been depressed (S230). If JUDGE key 23h has been depressed at S230, a NORM-JUDGE process is carried out (S231).

Figure 34:
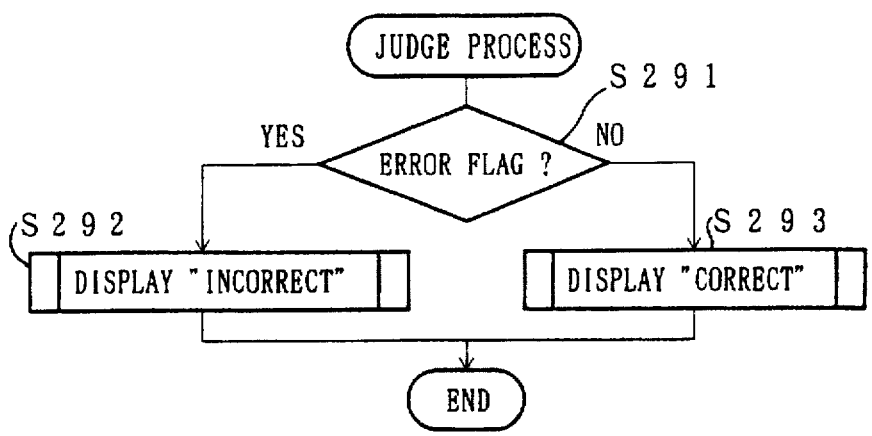
FIG. 34 is a flow chart that shows processes which are taken when JUDGE key is depressed in the NORM mode or the NUMB mode.

Referring to a flow chart in FIG. 34, an explanation will be given on the NORM-JUDGE process. The NORM-JUDGE process is a process wherein a judgement is made as to whether or not the calculations, which have been carried out by the user by specifying operators in the NORM-SELECT process, are correct, and the result of the judgement is displayed.

A judgement is made as to whether or not the error flag 25d has been set (S291), and if the error flag 25d has been set, the display "INCORRECT" is provided (S292), and the process is completed. In contrast, if there is no error flag 25d, the display "CORRECT" is provided (S293), and the process is completed.

Next, if JUDGE key 23h is not depressed at 230 in FIG. 30, this means that BACK key 23i has been depressed; thus, a NORM-BACK process is carried out (S232).

Figure 35:
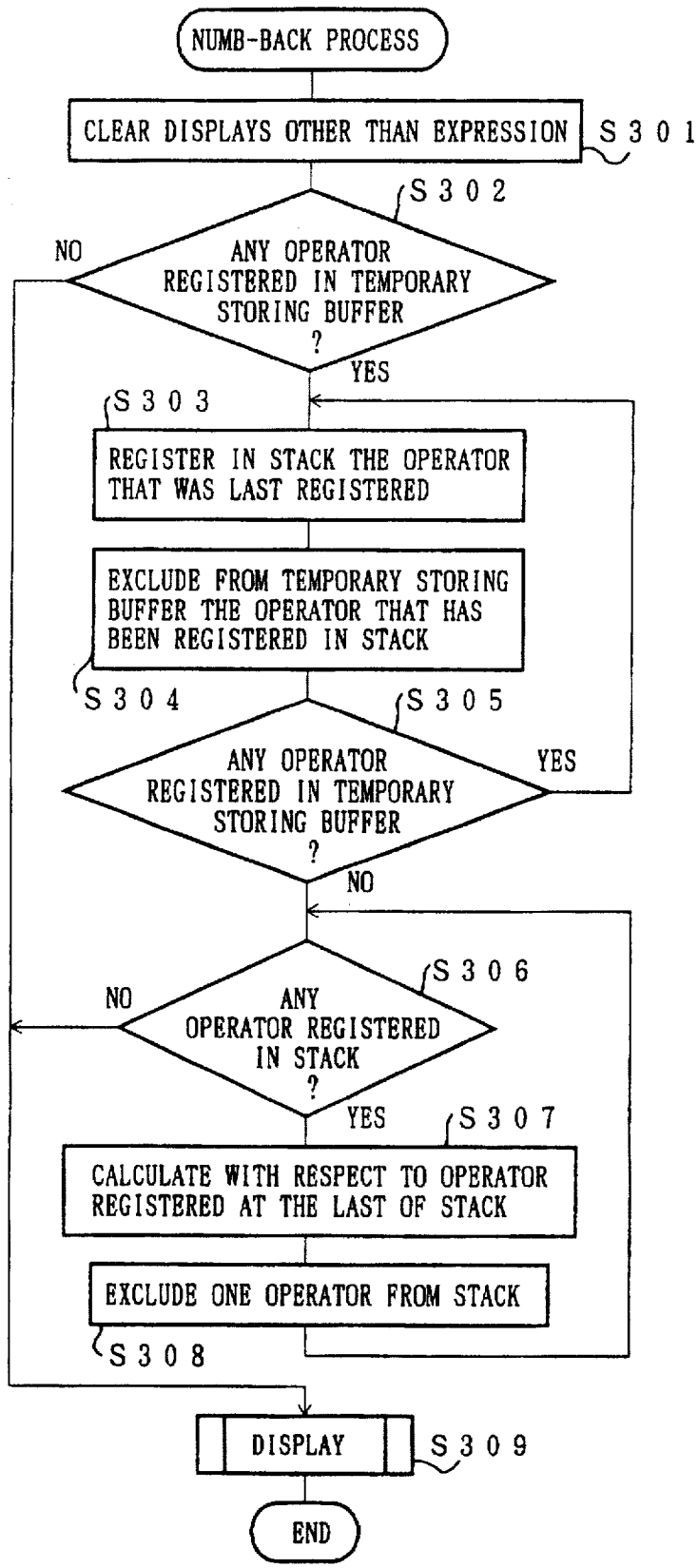
FIG. 35 is a flow chart that shows processes which are taken when BACK key is depressed in the NORM mode.

Referring to a flow chart in FIG. 35, an explanation will be given on the NORM-BACK process. The NORM-BACK process is a process wherein if there is an error in calculations that have been carried out by the user by specifying operators, the erroneous portion is pointed out and the corresponding display is provided.

First, all process expressions other than an entered expression are erased (S301). A judgement is made as to whether or not any operator is registered in the temporary storing buffer 25b (S302), and if no operator is registered, the process is completed (S309) with only the entered expression being displayed (S309). If any operator is registered at S302, the operator that is registered at the last position in the temporary storing buffer 25b is registered in the stack 25a (S303), and the operator is excluded from the temporary storing buffer 25b (S304). Then, a judgement is made as to whether or not any other operator is registered in the temporary storing buffer 25b (S305), and if any other operator is stored in the temporary storing buffer 25b, the sequence returns to S303. In contrast, if no operator is stored at S305, a judgement is made as to whether or not the item that has been registered at the last position in the stack 25a is an operator (S306). If there is an operator registered at the last position in the stack 25a, a calculation is carried out on the operator that is registered at the last position (S307), and the operator is excluded from the stack 25a (S308), and then the sequence returns to S306. In the case when the last item registered is not an operator at S306 or no operator is registered in the stack 25a, the corresponding display is provided (S309), and the process is completed.

Figure 45:
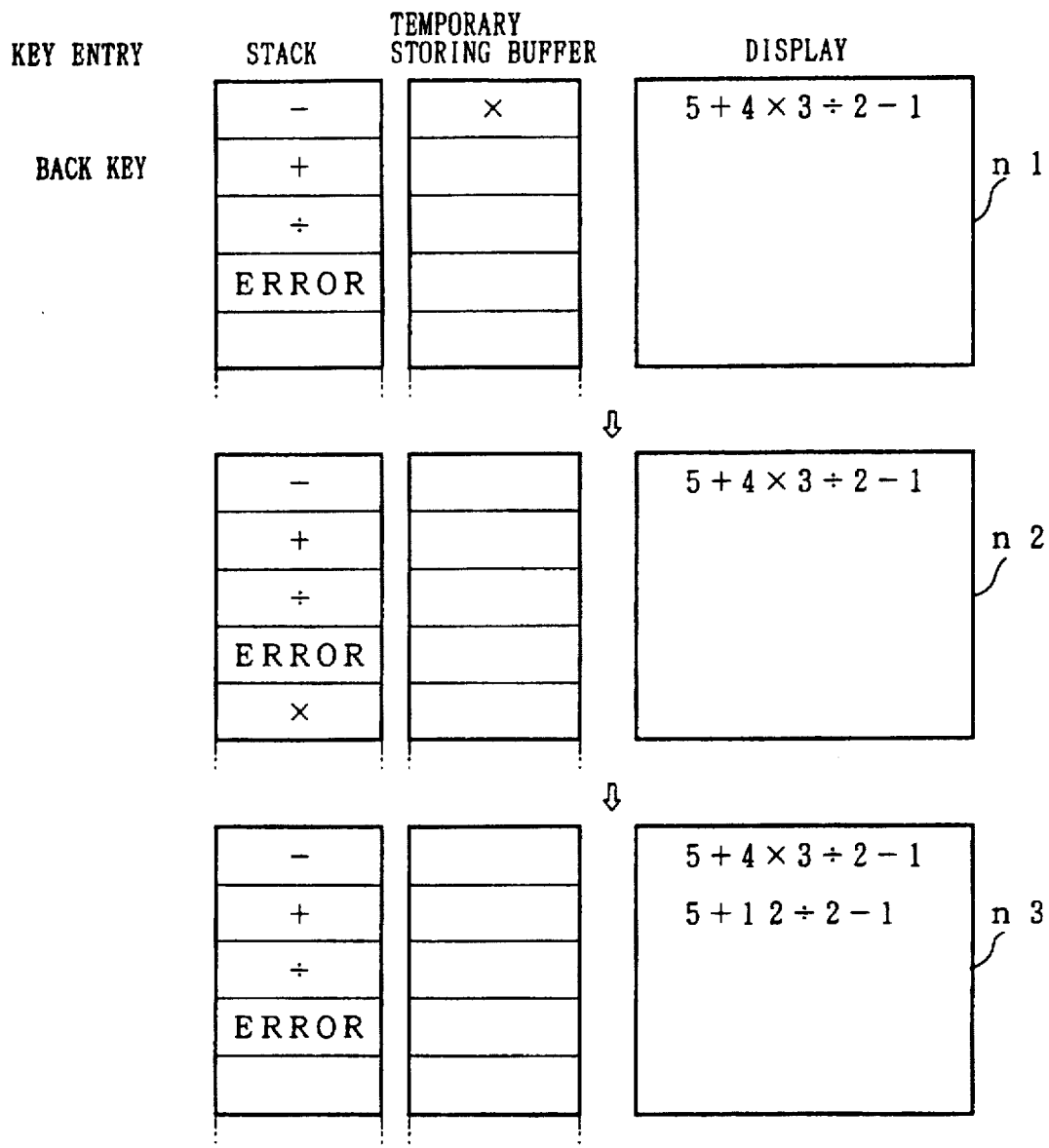
FIG. 45 is an explanatory drawing that shows storage states of stacks and temporary storing buffers, and the corresponding contents of display, in the case when BACK key is depressed in the NORM mode.

FIG. 45 shows one example of storage states of the stack 25a and the temporary storing buffer 25b and the corresponding image displays on the screen during the NORM-BACK process. When BACK key 23i is depressed, only the original expression is displayed as shown in n1. Next, the operator "×", stored in the temporary storing buffer 25b, is stored in the stack 25a (n2). Then, the operator "" is taken from the stack 25a, and is subjected to an operation, and the corresponding display is provided (n3). In other words, the display is returned to a state immediately before the error was made.

Next, an explanation will be given on the NUMB mode. The NUMB mode and the NORM mode have the same storage states of the stack 25a and the temporary storing buffer 25b, but they are different in their ways of displaying.

If the NORM mode is not on at S222 in FIG. 30, a judgement is successively made as to whether or not the NUMB mode is on (S223). If the NUMB mode is on at S223, a judgement is made as to whether or not STEP key 23e has been depressed (S233). If the STEP key 23e has been depressed, a NUMB-STEP process is carried out (S234).

Figure 36:
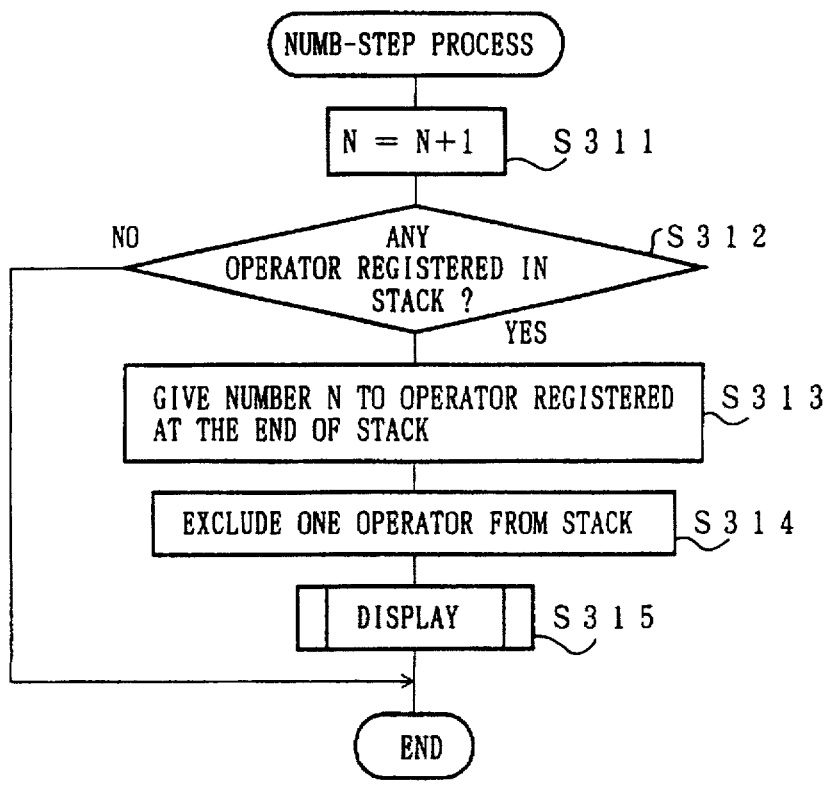
FIG. 36 is a flow chart that shows processes which are taken when STEP key is depressed in the NUMB mode.

Referring to a flow chart in FIG. 36, an explanation will be given on the NUMB-STEP process. The NUMB-STEP process is a process wherein a number is automatically allocated to each operator that is subjected to the next calculation in accordance with the order of preference, and the corresponding displays are provided all at once.

The value of N is incremented by 1 (S311), and a judgement is made as to whether or not any operator is registered in the stack 25a (S312). If no operator is registered, the process is completed, as it is. If any operator is registered, the number N is allocated to the operator that is registered at the last position in the stack 25a (S313), and the operator is excluded from the stack 25a (S314). Then, the expression and the number are displayed (S315), the process is completed.

FIG. 46 shows one example of displays of the NUMB-STEP process. First, an entered expression is displayed (p1). Operators are taken out from the stack 25a in succession beginning from the last one, and each time STEP key 23e is depressed, a number is allocated to each operator in the order taken out (p2 through p4).

If STEP key 23e is not depressed at S233 in FIG. 30, a judgement is made as to whether or not VIEW key 23f has been depressed (S235). If VIEW key 23f is depressed at S235, a NUMB-VIEW process is carried out (S236).

Figure 37:
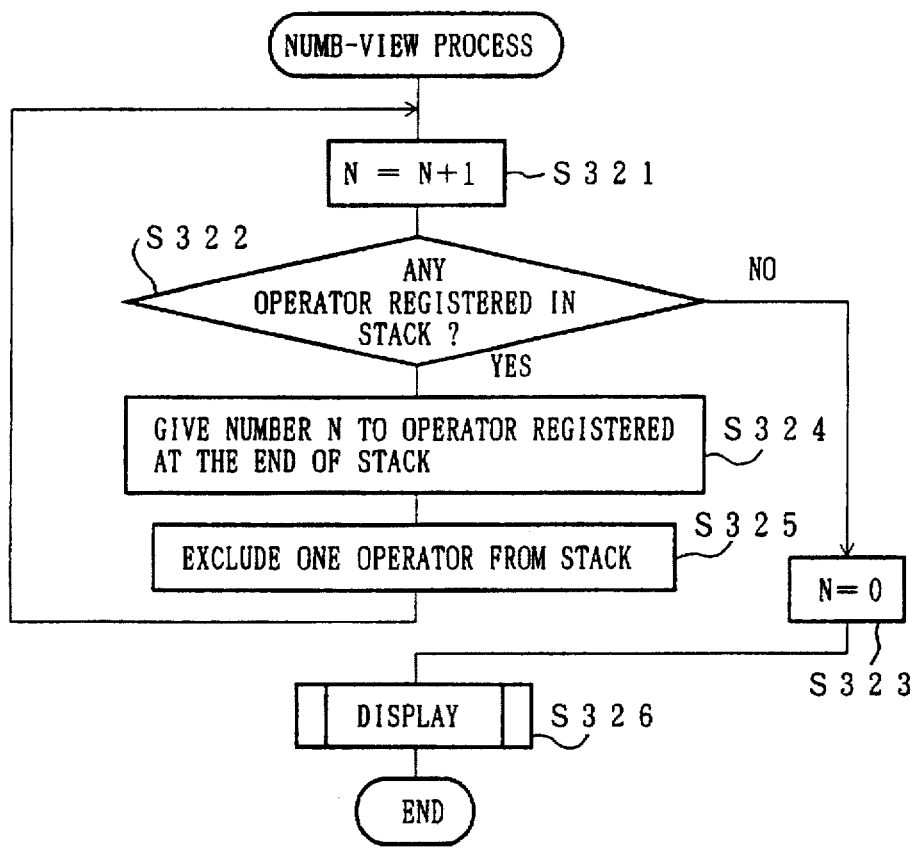
FIG. 37 is a flow chart that shows processes which are taken when VIEW key is depressed in the NUMB mode.

Referring to a flow chart in FIG. 37, an explanation will be given on the NUMB-VIEW process. The NUMB-VIEW process is a process wherein numbers, which indicate the order of calculations, are automatically allocated to an expression in accordance with the order of preference, and the corresponding displays are provided all at once.

The value of N is incremented by 1 (S321), and a judgement is made as to whether or not any operator is registered in the stack 25a (S322). If any operator is registered, the number N is allocated to the operator that is registered at the last position in the stack 25a (S324), and the operator is excluded from the stack 25a (S325), and then the sequence returns to S321. In contrast, if no operator is registered at S322, the value of N is set to 0 (S323), and the corresponding display is provided (S326), and then the process is completed.

FIG. 47 shows one example of displays during the NUMB-VIEW process. An expression entered is displayed as shown in q1. When VIEW key 23f is depressed, operators are taken out from the stack 25a in succession, and numbers are allocated to the operators all at once in the order taken out (q2).

Successively, if VIEW key is not depressed at S235 in FIG. 30, a judgement is made as to whether or not SELECT key 23g has been depressed (S237). If SELECT key 23g has been depressed at S237, a NUMB-SELECT process is carried out (S238).

Figure 38:
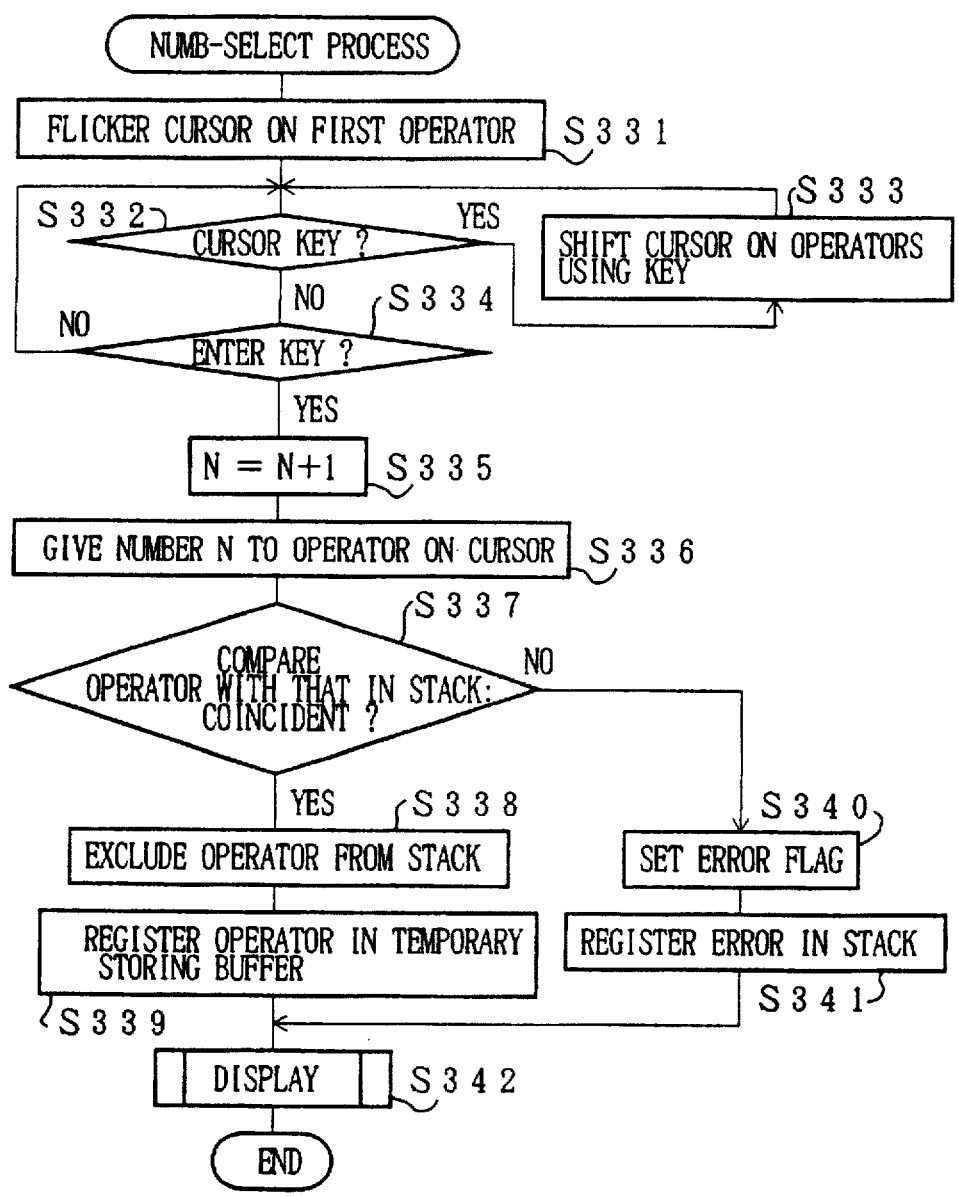
FIG. 38 is a flow chart that shows processes which are taken when SELECT key is depressed in the NUMB mode.

Referring to a will chart in FIG. 38, an explanation will be given on the NUMB-SELECT process. The NUMB-SELECT process is a process wherein numbers, which indicate the order of calculations, are allocated to operators that have been specified by the user, and the corresponding displays are provided.

While the cursor is flickering on the first operator in an expression (S331), a judgement is made as to whether or not the cursor key has been depressed (S332). If the cursor key has been depressed, the cursor is shifted on the operators in accordance with the entry through the cursor key (S333), and the sequence returns to S332. If the cursor key is not depressed, a judgement is made as to whether or not ENTER key 22 has been depressed (S334). If ENTER key 22 is not depressed, the sequence returns to S332. In contrast, if ENTER key 22 has been depressed, the value of N is incremented by 1 (S335), and the number N is allocated to the operator on the cursor (S336). A judgement is made as to whether or not the operator, which has been numbered at S336, coincides with the operator that is registered at the last position in the stack 25a (S337). If the two operators coincide with each other, the operator is excluded from the stack 25a (S338), and the operator is registered in the temporary storing buffer 25b (S339). If the two operators do not coincide with each other, the error flag 25d is set (S340), and "ERROR" is registered in the stack 25a (S341). After having the process at S339 or S341, the corresponding displays are provided (S342), and the process is completed.

FIGS. 48 and 49 show one example of storage states of the stack 25a and the temporary storing buffer 25b and the corresponding image displays on the screen during the NUMB-SELECT process. An expression entered is displayed as shown in r1. When the operator "×" is specified (r2) through the cursor key and ENTER key 22 is depressed, a number is given under the operator "×" on the screen (r3). In the same manner, as the user selects operators, numbers are allocated to the operators in the order selected (r4 through r8).

Successively, if SELECT key 23g is not depressed at S237 in FIG. 30, a judgement is made as to whether or not JUDGE key 23h has been depressed (S239). If JUDGE key 23h has been depressed at S239, a NUMB-JUDGE process is carried out (S240).

The NUMB-JUDGE process is a process wherein a judgement is made as to whether or not the calculations, which have been specified by the user, are correct, and the result of the judgement is displayed. This process is the same as the aforementioned NORM-JUDGE process.

Next, if JUDGE key 23h is not depressed at 239 in FIG. 30, this means that BACK key 23i has been depressed; thus, a NUMB-BACK process is carried out (S241).

Figure 39:
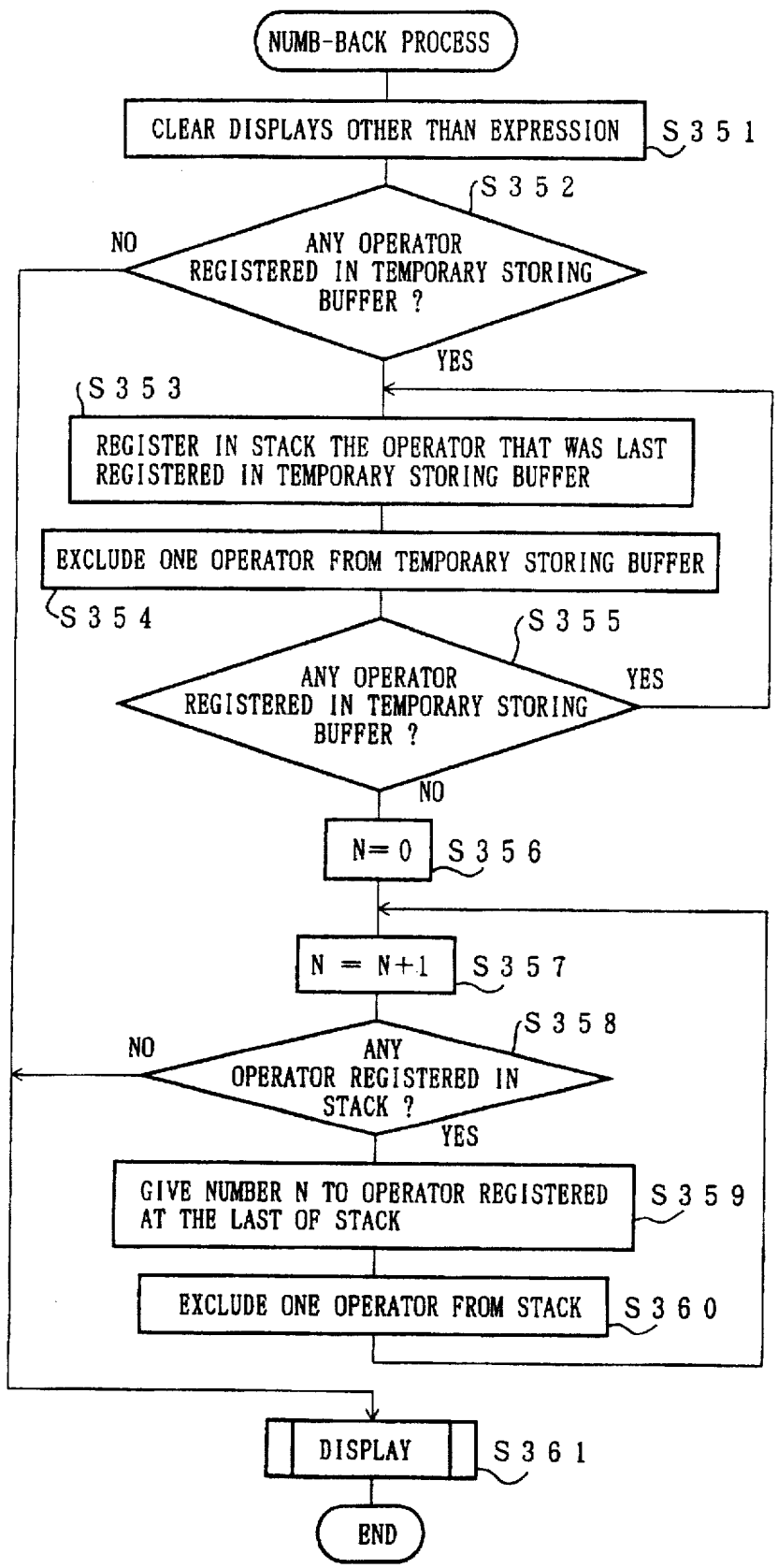
FIG. 39 is a flow chart that shows processes which are taken when BACK key is depressed in the NUMB mode.
Figure 40:
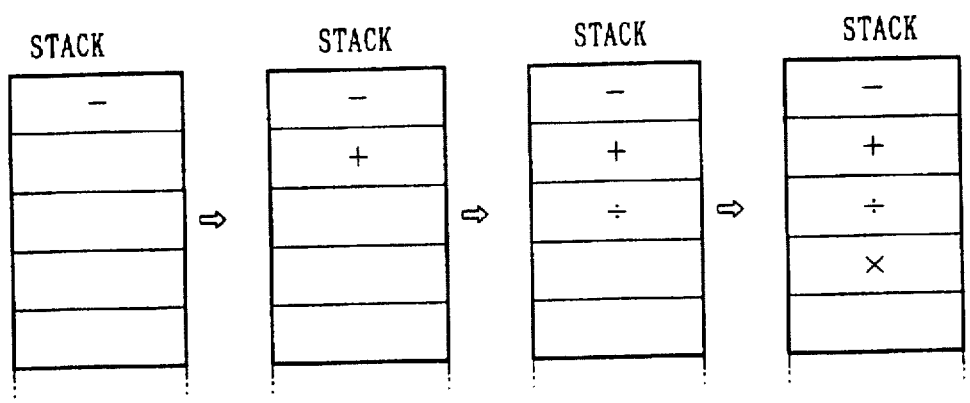
FIG. 40 is an explanatory drawing that shows storage states of stacks in the case when the register key is depressed.

Referring to a flow chart in FIG. 39, an explanation will be given on the NUMB-BACK process. The NUMB-BACK process is a process wherein if there is an error in the order of operators which has been selected by the user, the erroneous portion is pointed out and the corresponding display is provided.

First, all process expressions other than a basic expression are erased (S351). A judgement is made as to whether or not any operator is registered in the temporary storing buffer 25b (S352), and if no operator is registered, the process is completed (S361) after providing the corresponding display. If any operator is registered, the operator that is registered at the last position in the temporary storing buffer 25b is registered in the stack 25a (S353), and the operator is excluded from the temporary storing buffer 25b (S354). Then, a judgement is made as to whether or not any other operator is registered in the temporary storing buffer 25b (S355), and if any other operator is stored in the temporary storing buffer 25b, the sequence returns to S353. In contrast, if no operator is stored, the value of N is set to 0 (S356), and the value of N is incremented by 1 (S357). Then, a judgement is made as to whether or not the item registered at the last position in the stack 25a is an operator (S358), and if the item registered at the last position in the stack 25a is not an operator, or if no operator is registered in the stack 25a, the corresponding display is provided (S361), and the process is completed. If any operator is registered at the last position in the stack 25a, the number N is allocated to the operator that is stored at the last position in the stack 25a (S359), and the operator is excluded from the stack 25a (S360), and then the sequence returns to S357.

Figure 50:
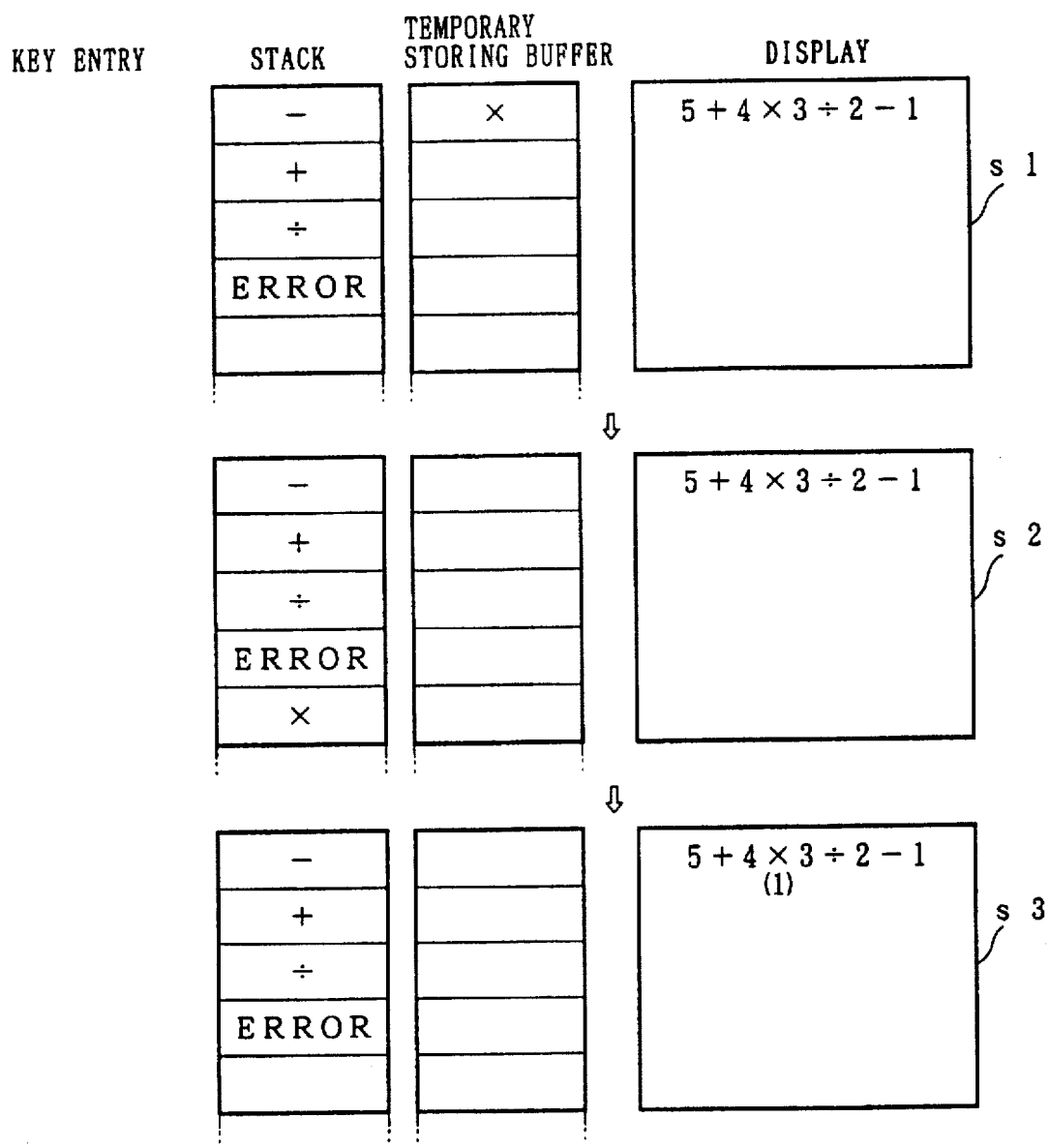
FIG. 50 is an explanatory drawing that shows storage states of stacks and temporary storing buffers, and the corresponding contents of display, in the case when BACK key is depressed in the NUMB mode.
Figure 51:
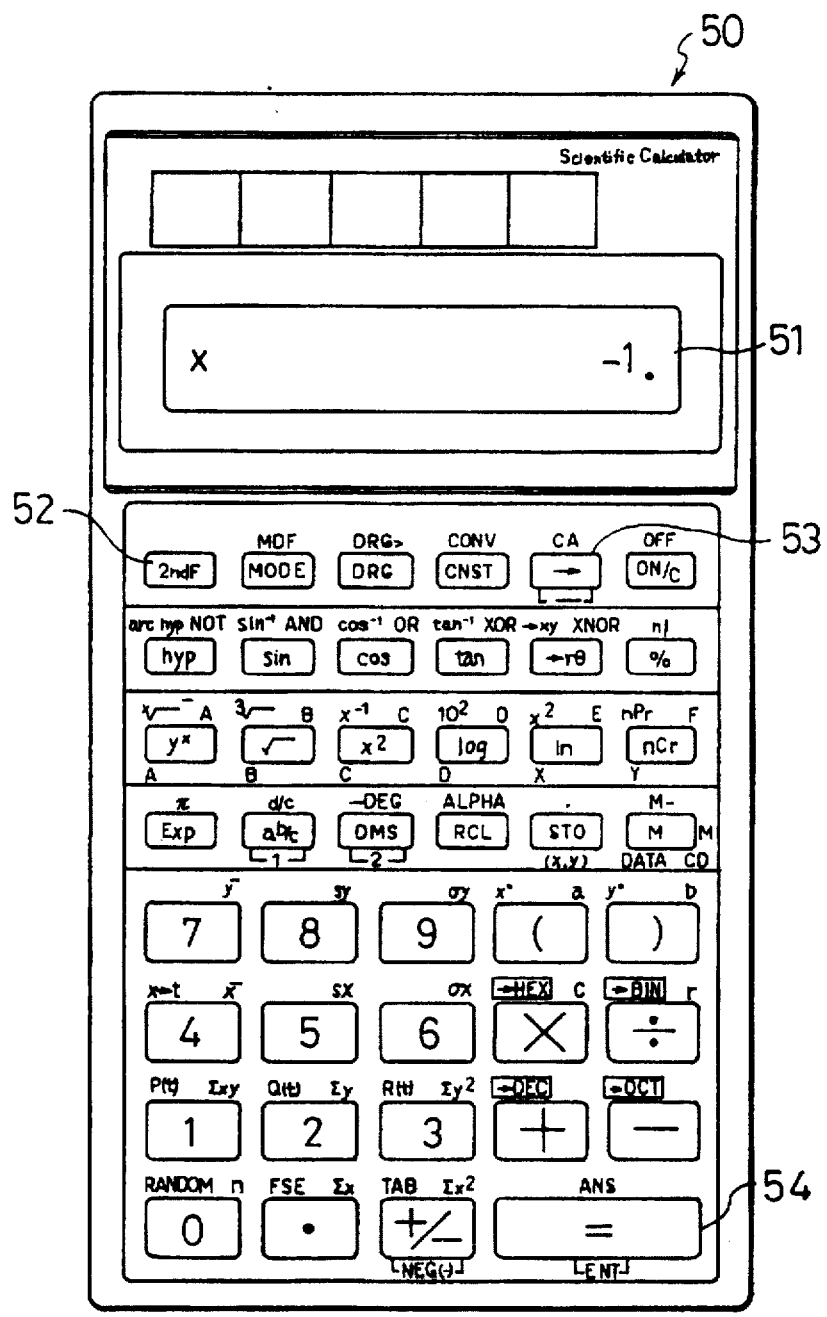
FIG. 51 is a plan view showing an appearance of a conventional electronic desktop calculator.

FIG. 50 shows one example of storage states of the stack 25a and the temporary storing buffer 25b and the corresponding image displays on the screen during the NUMB-BACK process. When BACK key 23i is depressed, the sequence returns to a state where the numbers immediately before the number at which the error was made are allocated (s1 through s3).

As described above, the electronic desktop calculator 21 of the present embodiment is provided with the group of keys 24 through which an expression including a plurality of operators is entered, the order-specifying keys (NORM key 23b or NUMB key 23c, and SELECT key 23g) for specifying the order of operations of the expression that has been entered through the group of keys 24, the operation means in the CPU 10 which carries out the calculations of the expression in accordance with the order of calculations that has been specified through the order-specifying keys, and the LCD 15 for displaying the results of the calculations. This arrangement makes it possible for the user to preferably specify the order of calculations.

Further, the electronic desktop calculator 21 of the present embodiment has an arrangement wherein operators in the expression entered can be specified independently by NORM key 23b and SELECT key 23g, and each time an operator is specified by SELECT key 23g, the operation means carries out a calculation with respect to the specified operator.

With this arrangement, when the user specifies a desired operator for the next calculation by using SELECT key 23g, the operation means carries out the corresponding calculation with respect to the operator. Thus, it is possible to carry out the calculation with respect to only the desired operator. Further, in response to the specification of the operator, only the corresponding portion is subjected to the calculation, and the portion in the expression is replaced by the result of the calculation. As a result, the same process that the user is carrying out in his mental calculation can be displayed on the screen; therefore, this arrangement is very effective in learning the order of calculations in an expression including a plurality of operators.

Further, the electronic desktop calculator 21 of the present embodiment has an arrangement wherein numbers are allocated to the respective operators of an entered expression by using NUMB key 23c and SELECT key 23g, and the operation means carries out calculations in the order of the allocated numbers.

In this arrangement, when the user allocates the numbers in the order in which calculations should be carried out by specifying operators through SELECT key 23g, the operation means carries out the calculations in accordance with the numbers. This arrangement, which makes it easier to confirm the order of calculations, is very effective in learning the order of calculations in an expression including a plurality of operators.

Moreover, the electronic desktop calculator 21 of the present embodiment is provided with: JUDGE key 23h through which an instruction for displaying a judgement as to whether the order of calculations that has been specified through the order-specifying keys is correct or not, and the judging means in the CPU 10 for making a judgement as to whether or not the order of calculations is correct.

With this arrangement, if the order, specified by the user, contains an error, the user is informed of the fact that he has erred in specifying the order of calculations by depressing JUDGE key 23h. Thus, the user can obtain a correct knowledge as to the order of calculations by comparing the order that he has entered with correct rules for the basic four calculations.

Furthermore, the electronic desktop calculator 21 of the present embodiment is provided with BACK key 23i through which, when the judging means has made a judgement that there is an error in the order of calculations that has been specified through the order-specifying keys, the order of calculations is again specified after returning to the operator prior to the erroneous calculation.

In this arrangement, when there is an error in the order of calculations that the user has specified, process expressions that have been obtained prior to the erroneous calculation can be displayed upon depression of BACK key 23i. Therefore, it is possible to specify the order of calculations again by using the order-specifying keys, starting from the erroneous portion. This arrangement, which makes it easier to confirm the order of calculations, is very effective in learning the order of calculations in an expression including a plurality of operators.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electronic desktop calculator comprising:
   a display;
   operation means for carrying out operations to find answers by transforming simultaneous linear equations, including known quantities and unknown quantities step by step in accordance with one of a plurality of methods of solving simultaneous linear equations including an addition and subtraction method, a substitution method and an equivalence methods, and for indicating on said display which of said plurality of methods is currently selected;
   process equation storage means for temporarily storing process equations each of which is obtained each time the operation means makes each transformation step by step;
   an advance key for entering an instruction to make and to display each of step-wise transformations starting from the equations to reach their answers, thereby providing a step-by-step display of any progress toward a solution;
   a return key for entering an instruction to make and display each of step-wise transformations starting from the answers and stepping backward to reach the equations; and control means, for controlling operations in the operation means, and read-out of the process equations from the process equation storage means, so as to update the contents of said display each time that the advance key or the return key is operated.

2. The electronic desktop calculator as defined in claim 1, further comprising:
   a solution-specifying key for entering an instruction for selecting one of the various problem-solving methods,
   wherein the control means controls the operation means so that the equations are transformed step by step in accordance with the problem-solving method that has been selected by the instruction given through the solution-specifying key.

3. The electronic desktop calculator as defined in claim 1, further comprising:
   storage means for the number of transformations for temporarily storing the number of times that step-wise transformations are carried out to reach the answers from the equations,
   wherein the control means increases or reduces the number of transformations stored in the storage means for the number of transformations one by one, each time the advance key or the return key is operated, and controls the readout of the process equations from the process equation storage means and the operations in the operation means so that at least one process equation corresponding to the number of transformations stored in the storage means for the number of transformations is displayed.

4. The electronic desktop calculator as defined in claim 1, further comprising:
   numeric-value storage means for temporarily storing respective coefficients while identifying the position s of the coefficients in the process equations or the equations,
   wherein the control means finds the conditions under which the equations are transformed in the simplest manner, by reference to the contents of storage in the numeric-value storage means, and controls the operations of the operation means, based on the resulting conditions thus found.

5. The electronic desktop calculator as defined in claim 2, further comprising:
   display-controlling means for displaying the selected problem-solving method in a distinguishable manner in response to an entry through the solution-specifying key.

6. The electronic desktop calculator as defined in claim 4, wherein the control means controls the operations in the operation means by reference to the contents of storage in the numeric-value storage means so that when the process equations are displayed, information, which gives a suggestion concerning transformation of said process equations to the user, is included.

7. The electronic desktop calculator as defined in claim 1, wherein the control means controls the writing of process equations to the process equation storage means, the reading of process equations from the process equation storage means, and the operations in the operation means such that the process equations, each obtained through each step-wise transformation, as successively displayed at time intervals whose magnitude is predetermined.

8. The electronic desktop calculator as defined in claim 4, further comprising:

a variable-specifying key for entering an instruction that specifies a variable among a plurality of variables contained in the entered equations so that process equations are preferentially formed with respect to the variable and the corresponding displays are made, wherein the control means finds the conditions with which the equations are transformed in the simplest manner by reference to the contents of storage of the numeric-value storage means, and controls the operations of the operation means based on the resulting conditions thus found.

9. The electronic desktop calculator as defined in claim 1, wherein the process equation storage means is designed so that process equations are cleared in succession in the order of their age upon filled state of a storage capacity that is maintained for the process equation storage means, in order to allow new process equation to be stored.

10. The electronic desktop calculator as defined in claim 7, further comprising user-actuated means for setting said magnitude of said time intervals.

11. An operation method for equations comprising the steps of:

entering desired simultaneous linear equations consisting of known quantities and unknown quantities;

operative each time an advance key, used for entering an instruction to make and display each of step-wise transformations starting from the equations to reach their answers, thereby providing a step-by-step display of any progress toward a solution, is operated, forming process equations that indicate processes from the equations to their answers in accordance with one of a plurality of methods of solving simultaneous linear equations including an addition and subtraction method, a substitution method and an equivalence method, as well as displaying which of said plurality of methods is currently selected and displaying the process equations until the answers are found; and operative each time that a return key, used for entering an instruction to make and display each of step-wise transformations starting from the answers to reach the equations, thereby stepping backward, is operated, displaying process equations that indicate processes from the answers to the equations.

12. An electronic desktop calculator, comprising:

input means for entering an expression including a plurality of operators;

order-specifying keys for specifying an operation sequence to seek a solution for the expression that has been entered through the input means;

operation means for carrying out, by step-wise transformations, the operations of the expression in accordance with the expression that has been specified by the order-specifying keys and in accordance with one of a plurality of methods of solving the simultaneous linear equation, including an addition and subtraction method a substitution method and an equivalence method; and display means displaying which one of said plurality of methods is currently selected providing a step-by-step display of any progress toward a solution of said expression, or stepping backward through said step-wise transformations, as commanded by a user via said keys and displaying the result of the operations.

13. The electronic desktop calculator as defined in claim 12, wherein the order-specifying key individually specifies the operators in the entered expression and, each time an operator is specified by the order-specifying key, the operation means carries out calculations with respect to the specified operator.

14. The electronic desktop calculator as defined in claim 12, wherein the order-specifying key allocates numbers to the respective operators of the entered expression and the operation means carries out calculations in the order of the numbers allocated by said order-specifying key.

15. The electronic desktop calculator as defined in claim 12, further comprising:

operator-registering means for individually registering the operators in the expression in the order of preference;

comparison means for comparing the operator specified through the order-specifying key with the operator having the highest preference among the operators that have been registered in the operator-registering means; and temporary storing means for taking out an operator from the operator-registering means and temporarily storing the operator, wherein, when the comparison means has determined that the two operators are equal to each other, it takes out the operator from the operator-registering means, and stores the operator in the temporary storing means temporarily, and, when the comparison means has determined that the two operators are different from each other, it registers an error display in the operator-registering means.

16. The electronic desktop calculator as defined in claim 15, further comprising:

an error-specifying key for instructing a display as to whether or not the specified order of calculations is correct; and a judging means for making a judgement as to whether or not the specified order of calculations is correct.

17. The electronic desktop calculator as defined in claim 15, further comprising:

a re-specifying key for giving instructions so that the operators, stored in the temporary storage means, are re-registered in the operator-registering means in an order reversed to the order in which the operators were stored, the operators are again taken out from the operator-registering means in the order of preference, and the operations are carried out until the error display is detected.

18. An operation method, which uses four basic calculations, composing the steps of:

entering an expression including a plurality of operators;

selecting the operators one by one so as to specify the operators, selecting one of a plurality of methods of solving simultaneous linear equations, including an addition and subtraction method, a substitution method and an equivalence method and displaying which method is currently selected; and operative each time one of the operators is specified, carrying out a calculation with respect to the operator and displaying step-rise calculations starting from the expression to reach a solution, thereby providing a step-by-step display of any progress toward a solution of said expression.

19. An operation method, which uses four basic calculations, comprising the steps of:

entering an expression including a plurality of operators;

selecting the operators one by one so as to specify the operators, selecting one of a plurality of methods of solving simultaneous linear equations, including an addition and subtraction method a substitution method and an equivalence method, and displaying which method is currently selected;

and operative each time one of the operators is specified, displaying a number with respect to the operator, carrying out step-wise calculations in accordance with the numbers and displaying step-wise calculations starting from the expression to reach a solution, thereby providing a step-by-step display of any progress toward a solution of said expression.

20. An electronic desktop calculator comprising:

operation means for carrying out operations to find answers by transforming equations step by step in accordance with one of a plurality of methods of solving simultaneous linear equations including an addition and subtraction method a substitution method and an equivalence method, and for indicating which of said plurality of methods is currently selected;

process equation storage means for temporarily storing process equations each of which is obtained each tulle the operation means makes each transformation step by step;

numeric-value storage means for temporarily storing respective coefficients while identifying the positions of the coefficients in the process equations or the equations;

an advance key for entering an instruction to make and to display each of step-wise transformations starting from the equations to reach their answers, thereby providing a step-by-step display of any progress toward a solution;

a return key for entering an instruction to make and display each of step-wise transformations starting from the answers and stepping backward to reach the equations; and control means, for controlling operations in the operation means, and read-out of the process equations from the process equation storage means, so as to update the contents of the display each time that the advance key or the return key is operated;

and wherein the control means finds tile conditions under which the equations are transformed in the simplest manner by reference to the contents of storage in the numeric-value storage means, and controls the operations of the operation means, based on the resulting conditions thus found.

21. The electronic desktop calculator as defined in claim 20, wherein:

said equations are simultaneous linear equations constituted by a first equation and a second equation that include known quantities and unknown quantities;

the conditions with which the equations are transformed in the simplest manner are found by comparing coefficients of the same unknown quantity between the first equation and the second equation, in the case when the problem-solving method is the addition and subtraction method.

22. The electronic desktop calculator as defined in claim 20, wherein:

said equations are simultaneous linear equations constituted by a first equation and a second equation that include known quantities and unknown quantities;

the conditions with which the equations are transformed in the simplest manner are found by judging whether or not there is an unknown quantity whose coefficient is 1, in the case when the problem-solving method is the substitution method or the equivalence method.

* * * * *